United States Patent
DeWitt, Jr. et al.

(10) Patent No.: US 7,225,309 B2
(45) Date of Patent: May 29, 2007

(54) METHOD AND SYSTEM FOR AUTONOMIC PERFORMANCE IMPROVEMENTS IN AN APPLICATION VIA MEMORY RELOCATION

(75) Inventors: Jimmie Earl DeWitt, Jr., Georgetown, TX (US); Frank Eliot Levine, Austin, TX (US); Christopher Michael Richardson, Austin, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 10/682,436

(22) Filed: Oct. 9, 2003

(65) Prior Publication Data

US 2005/0081010 A1    Apr. 14, 2005

(51) Int. Cl.
*G06F 12/00* (2006.01)
(52) U.S. Cl. ..................................... 711/165
(58) Field of Classification Search ............... 711/165; 712/227
See application file for complete search history.

(56) References Cited

U.S. PATENT DOCUMENTS

| | | | |
|---|---|---|---|
| 4,291,371 A | 9/1981 | Holtey | |
| 5,103,394 A | 4/1992 | Blasciak | |
| 5,212,794 A | 5/1993 | Pettis et al. | |
| 5,689,712 A | 11/1997 | Heisch | |
| 5,691,920 A | 11/1997 | Levine et al. | |
| 5,774,724 A | 6/1998 | Heisch | |
| 5,930,508 A | 7/1999 | Faraboschi et al. | |
| 5,937,437 A | 8/1999 | Roth et al. ................... | 711/202 |
| 5,938,778 A | 8/1999 | John, Jr. et al. .............. | 714/45 |
| 5,966,537 A | 10/1999 | Ravichandran | |
| 5,987,250 A | 11/1999 | Subrahmanyam | |
| 6,070,009 A | 5/2000 | Dean et al. | |
| 6,101,524 A | 8/2000 | Choi et al. ................... | 709/102 |

(Continued)

FOREIGN PATENT DOCUMENTS

JP    2000-29731 A    12/1999

(Continued)

OTHER PUBLICATIONS

"Enable debuggers as an objective performance measurement tool for software development cost reduction", #444188, *Research Disclosure*, p. 686, Apr. 2001.

(Continued)

*Primary Examiner*—Hiep T. Nguyen
(74) *Attorney, Agent, or Firm*—Herman Rodriguez; Diana L. Roberts; Joseph R. Burwell

(57) ABSTRACT

A method, an apparatus, and a computer program product in a data processing system are presented for using hardware assistance for gathering performance information that significantly reduces the overhead in gathering such information. Performance indicators are associated with instructions or memory locations, and processing of the performance indicators enables counting of events associated with execution of those instructions or events associated with accesses to those memory locations. The performance information that has been dynamically gathered from the assisting hardware is available to the software application during runtime in order to autonomically affect the behavior of the software application, particularly to enhance its performance. For example, the counted events may be used to autonomically improve the performance of the execution of an application by relocating code segments and data areas.

18 Claims, 25 Drawing Sheets

U.S. PATENT DOCUMENTS

| | | | |
|---|---|---|---|
| 6,134,676 A | 10/2000 | VanHuben et al. | 714/39 |
| 6,189,141 B1 | 2/2001 | Benitez et al. | 717/4 |
| 6,192,513 B1 | 2/2001 | Subrahmanyam | 717/5 |
| 6,206,584 B1 | 3/2001 | Hastings | |
| 6,223,338 B1 | 4/2001 | Smolders | 717/4 |
| 6,243,804 B1 | 6/2001 | Cheng | 712/228 |
| 6,256,775 B1 | 7/2001 | Flynn | 717/4 |
| 6,286,132 B1 | 9/2001 | Tanaka et al. | 717/4 |
| 6,324,689 B1 | 11/2001 | Lowney et al. | 717/9 |
| 6,330,662 B1 | 12/2001 | Patel et al. | 712/236 |
| 6,351,844 B1 | 2/2002 | Bala | 717/4 |
| 6,374,364 B1 | 4/2002 | McElroy et al. | 714/10 |
| 6,430,741 B1 | 8/2002 | Mattson, Jr. et al. | 717/154 |
| 6,442,585 B1 | 8/2002 | Dean et al. | 709/108 |
| 6,446,029 B1 | 9/2002 | Davidson et al. | 702/186 |
| 6,480,938 B2 | 11/2002 | Vondran, Jr. | 711/125 |
| 6,574,727 B1 | 6/2003 | Davidson et al. | 712/227 |
| 2001/0032305 A1 | 10/2001 | Barry | 712/34 |
| 2002/0019976 A1 | 2/2002 | Patel et al. | 717/137 |
| 2002/0124237 A1 | 9/2002 | Sprunt et al. | 717/127 |
| 2002/0129309 A1 | 9/2002 | Floyd et al. | 714/724 |
| 2002/0147965 A1 | 10/2002 | Swaine et al. | 717/124 |
| 2002/0199179 A1 | 12/2002 | Lavery et al. | 717/158 |

FOREIGN PATENT DOCUMENTS

| | | |
|---|---|---|
| JP | 2000-347863 A | 12/2000 |

OTHER PUBLICATIONS

Kikuchi, "Parallelization Assist System", *Transactions of Information Processing Society of Japan*, v. 34, n. 9, pp. 1158-1169, Sep. 1993.

Cohen et al., "Hardware-Assisted Characterization of NAS Benchmarks", *Cluster Computing*, v. 4, n. 3, pp. 189-196, Jul. 2001.

Talla et al., "Evaluating Signal Processing and Multimedia Applications on SIMD, VLIW and Superscalar Architectures", *Proceedings of 2000 International Conference on Computer Design*, pp. 163-172, Sep. 2000.

Iwasawa et al., "Parallelization Method of Fortran DO Loops by Parallelizing Assist System", *Transactions of Information Processing Society of Japan*, v. 36, n. 8, pp. 1995-2006, Aug. 1995.

Talla et al., "Execution Characteristics of Multimedia Applications on a Pentium II Processor", 19th IEEE International Performance, Computing, and Communications Conference, pp. 516-524, Feb. 2000.

*Intel Architecture Software Developer's Manual, vol. 3: System Programming*, Appendix A: Performance-Monitoring Events, pp. A1-A22, Jan. 1999.

3502 ~ Subroutine ProcessData {

3530 ~ ##PerfMon CACHE_MISS, CACHE_HIT;

3504 ~ call GetData(dataStructure, numberDataItems);

3506 ~ call PerfMon_Read(valueA, CACHE_MISS, ~ 3508
         valueB, CACHE_HIT); ~ 3510
     3512  3514

3516 ~ if (valueA > valueB) then   3520

3518 ~ call ModifyDataStructure(ADJUST, dataStructure);

3522 ~ else if (valueA > (SCALE_CACHE_MISS*numberDataItems)) then

3524 ~ call ModifyDataStructure(RENEW, dataStructure);

3528 ~ call SortNewData(dataStructure)   3526

Subroutine ProcessData {

3610 ~ ##PerfMon CACHE_MISS, CACHE_HIT;

3602 ~ call GetData(dataStructure, numberDataItems);

3612 ~ ##PerfMon {
  3614 ~ if (CACHE_MISS > CACHE_HIT) then
    3604 ~ call ModifyDataStructure(ADJUST, dataStructure);
  3616 ~ else if (CACHE_MISS > (SCALE_CACHE_MISS*numberDataItems)) then
    3606 ~ call ModifyDataStructure(RENEW, dataStructure);
  }
3608 ~ call SortNewData(dataStructure)

Figure 36

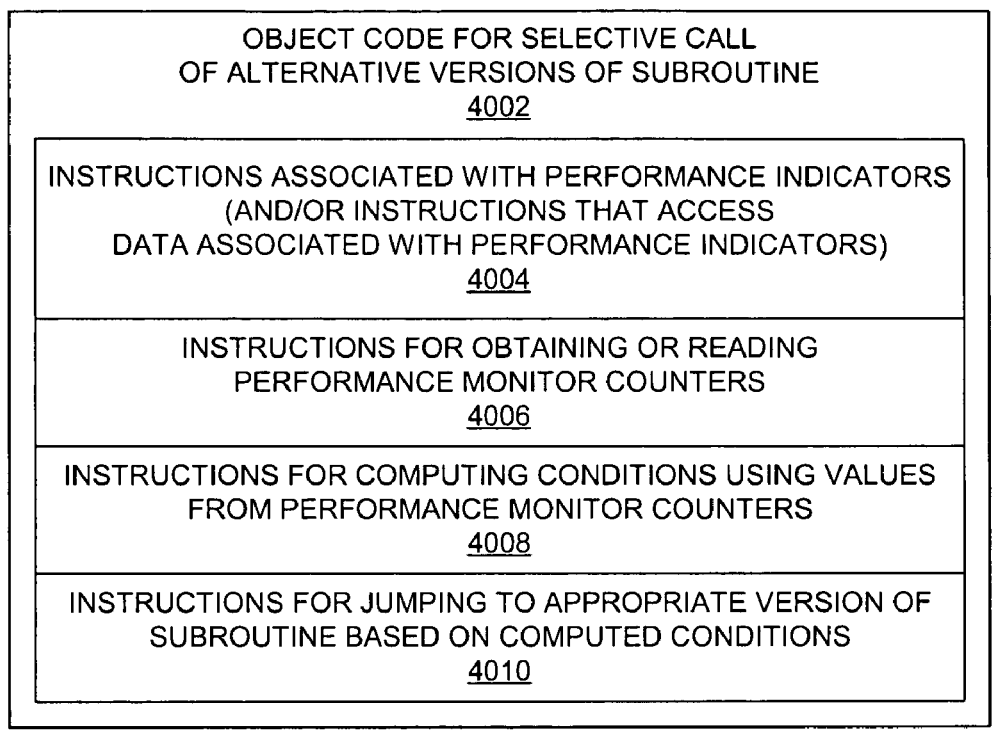

```
OBJECT CODE FOR SELECTIVE CALL
OF ALTERNATIVE VERSIONS OF SUBROUTINE
4002

INSTRUCTIONS ASSOCIATED WITH PERFORMANCE INDICATORS
(AND/OR INSTRUCTIONS THAT ACCESS
DATA ASSOCIATED WITH PERFORMANCE INDICATORS)
4004

INSTRUCTIONS FOR OBTAINING OR READING
PERFORMANCE MONITOR COUNTERS
4006

INSTRUCTIONS FOR COMPUTING CONDITIONS USING VALUES
FROM PERFORMANCE MONITOR COUNTERS
4008

INSTRUCTIONS FOR JUMPING TO APPROPRIATE VERSION OF
SUBROUTINE BASED ON COMPUTED CONDITIONS
4010
```

Figure 40

```
4102    ##PerfMon CACHE_MISS on Array_XYZ;

4104    Temp := Array_XYZ[ MAX_ARRAY_SIZE ];

4106    call PerfMon_Read(valueA, CACHE_MISS);

4108    if (valueA = 0) then
            4110    call XYZ_1;
          else
            4112    call XYZ_2;
```

Figure 41

METHOD AND SYSTEM FOR AUTONOMIC PERFORMANCE IMPROVEMENTS IN AN APPLICATION VIA MEMORY RELOCATION

CROSS REFERENCE TO RELATED APPLICATIONS

The present invention is related to the following applications: "Method and Apparatus for Selectively Counting Instructions and Data Accesses", Ser. No. 10/674,604, "Method and Apparatus for Generating Interrupts Upon Execution of Marked Instructions and Upon Access to Marked Memory Locations", Ser. No. 10/675,831, "Method and Apparatus for Counting Data Accesses and Instruction Executions that Exceed a Threshold", Ser. No. 10/675,778, "Method and Apparatus for Counting Execution of Specific Instructions and Accesses to Specific Data Locations", Ser. No. 10/675,776, "Method and Apparatus for Debug Support for Individual Instructions and Memory Locations", Ser. No. 10/675,751, "Method and Apparatus to Autonomically Select Instructions for Selective Counting", Ser. No. 10/675,721, "Method and Apparatus to Autonomically Count Instruction Execution for Applications", Ser. No. 10/674,642, "Method and Apparatus to Autonomically Take an Exception on Specified Tnstructions", Ser. No. 10/674,606, "Method and Apparatus to Autonomically Profile Applications", Ser. No. 10/675,783, "Method and Apparatus for Counting Instruction and Memory Location Ranges", Ser. No. 10/675,872, "Method and System for Antonomic Execution Path Selection in an Application", Ser. No. 10/682,385, "Method and System for Autonomic Monitoring of Semaphore Operations in an Application", Ser. No. 10/682,437, all of which are assigned to the same assignee, and incorporated herein by reference.

BACKGROUND OF THE INVENTION

1. Field of the Invention

The present invention relates generally to an improved data processing system. In particular, the present invention provides a method and apparatus for obtaining performance data in a data processing system. Still more particularly, the present invention provides a method and apparatus for hardware assistance to software tools in obtaining performance data in a data processing system.

2. Description of Related Art

In analyzing and enhancing performance of a data processing system and the applications executing within the data processing system, it is helpful to know which software modules within a data processing system are using system resources. Effective management and enhancement of data processing systems requires knowing how and when various system resources are being used. Performance tools are used to monitor and examine a data processing system to determine resource consumption as various software applications are executing within the data processing system. For example, a performance tool may identify the most frequently executed modules and instructions in a data processing system, or may identify those modules which allocate the largest amount of memory or perform the most I/O requests. Hardware performance tools may be built into the system or added at a later point in time.

One known software performance tool is a trace tool. A trace tool may use more than one technique to provide trace information that indicates execution flows for an executing program. One technique keeps track of particular sequences of instructions by logging certain events as they occur, a so-called event-based profiling technique. For example, a trace tool may log every entry into, and every exit from, a module, subroutine, method, function, or system component. Alternately, a trace tool may log the requester and the amounts of memory allocated for each memory allocation request. Typically, a time-stamped record is produced for each such event. Corresponding pairs of records, similar to entry-exit records, also are used to trace execution of arbitrary code segments, starting and completing I/O or data transmission, and for many other events of interest.

In order to improve performance of code generated by various families of computers, it is often necessary to determine where time is being spent by the processor in executing code, such efforts being commonly known in the computer processing arts as locating "hot spots". Ideally, one would like to isolate such hot spots at the instruction and/or source line of code level in order to focus attention on areas which might benefit most from improvements to the code.

Another trace technique involves periodically sampling a program's execution flows to identify certain locations in the program in which the program appears to spend large amounts of time. This technique is based on the idea of periodically interrupting the application or data processing system execution at regular intervals, so-called sample-based profiling. At each interruption, information is recorded for a predetermined length of time or for a predetermined number of events of interest. For example, the program counter of the currently executing thread, which is an executable portion of the larger program being profiled, may be recorded during the intervals. These values may be resolved against a load map and symbol table information for the data processing system at post-processing time, and a profile of where the time is being spent may be obtained from this analysis.

However, creating tools such as these to find answers related to specific situations or problems can take much effort and can be very difficult to calibrate as the software tools themselves affect the system under test. Moreover, the application is modified by a software developer during a post-processing phase in accordance with the insights that have been gained through a post-processing analysis of the information that was gather during the execution of an application.

Therefore, it would be advantageous to have an improved method, apparatus, and computer program product for providing hardware assistance for gathering performance information that significantly reduces the overhead in gathering such information and that significantly reduces the impact on the application that is being profiled. Furthermore, it would be advantageous to allow a software application during a runtime phase to use the information that is dynamically gathered from the assisting hardware in order to autonomically affect the behavior of the software application.

SUMMARY OF THE INVENTION

A method, an apparatus, and a computer program product in a data processing system are presented for using hardware assistance for gathering performance information that significantly reduces the overhead in gathering such information. Performance indicators are associated with instructions or memory locations, and processing of the performance indicators enables counting of events associated with execution of those instructions or events associated with accesses to those memory locations. The performance information that has been dynamically gathered from the assisting hardware is available to the software application during runtime in order to autonomically affect the behavior of the software application, particularly to enhance its performance. For example, the counted events may be used to autonomically improve the performance of the execution of an application by relocating code segments and data areas.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 35 depicts a diagram that represents a set of pseudocode statements that autonomically alter the behavior of a software application through the use of the performance indicators that have previously been described;

FIG. 36 depicts a diagram that represents a set of pseudocode statements that autonomically alter the behavior of a software application through the use of performance indicators that are generated in accordance with compiler directives that are placed into the source code of the software application;

FIG. 40 depicts a block diagram that shows a representation of object code for a selective or conditional call of one of multiple alternative versions of object code for a given subroutine;

FIG. 41 depicts a diagram that represents an example of a set of pseudocode statements that may be used by a compiler to generate the appropriate autonomic alteration in the behavior of a software application for selecting one of multiple alternative versions of object code for a subroutine;

DETAILED DESCRIPTION OF THE INVENTION

Figure 1:
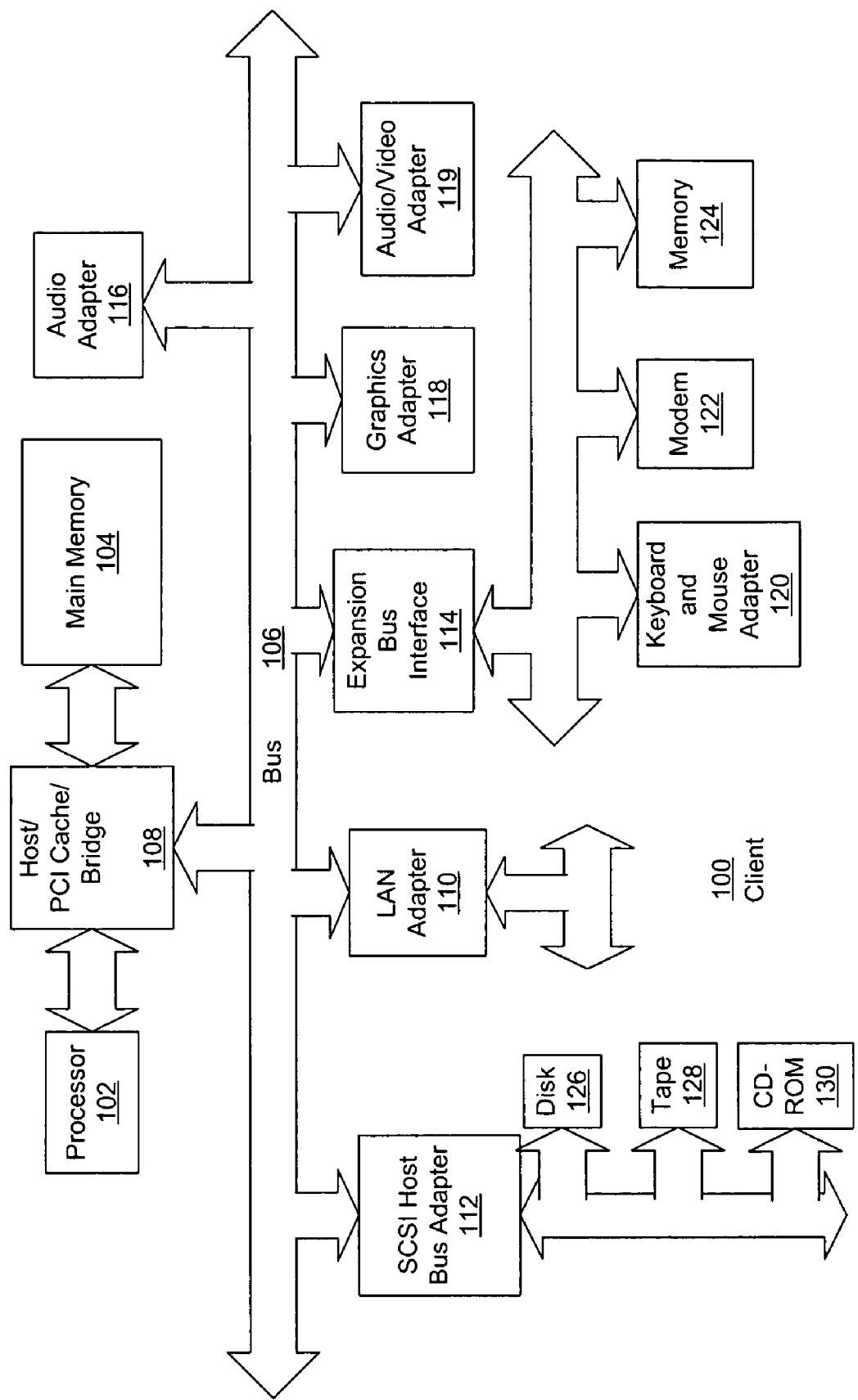
FIG. 1 is a block diagram of a data processing system in which the present invention may be implemented.

With reference now to FIG. 1, a block diagram of a data processing system is shown in which the present invention may be implemented. Client 100 is an example of a computer, in which code or instructions implementing the processes of the present invention may be located. Client 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, small computer system interface SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as Windows XP, which is available from Microsoft Corporation. An object oriented programming system such as Java may run in conjunction with the operating system and provides calls to the operating system from Java programs or applications executing on client 100. "Java" is a trademark of Sun Microsystems, Inc. Instructions for the operating system, the object-oriented programming system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

For example, client 100, if optionally configured as a network computer, may not include SCSI host bus adapter 112, hard disk drive 126, tape drive 128, and CD-ROM 130. In that case, the computer, to be properly called a client computer, includes some type of network communication interface, such as LAN adapter 110, modem 122, or the like. As another example, client 100 may be a stand-alone system configured to be bootable without relying on some type of network communication interface, whether or not client 100 comprises some type of network communication interface. As a further example, client 100 may be a personal digital assistant (PDA), which is configured with ROM and/or flash ROM to provide non-volatile memory for storing operating system files and/or user-generated data. The depicted example in FIG. 1 and above-described examples are not meant to imply architectural limitations.

The processes of the present invention are performed by processor 102 using computer implemented instructions, which may be located in a memory such as, for example, main memory 104, memory 124, or in one or more peripheral devices 124–130.

Figure 2:
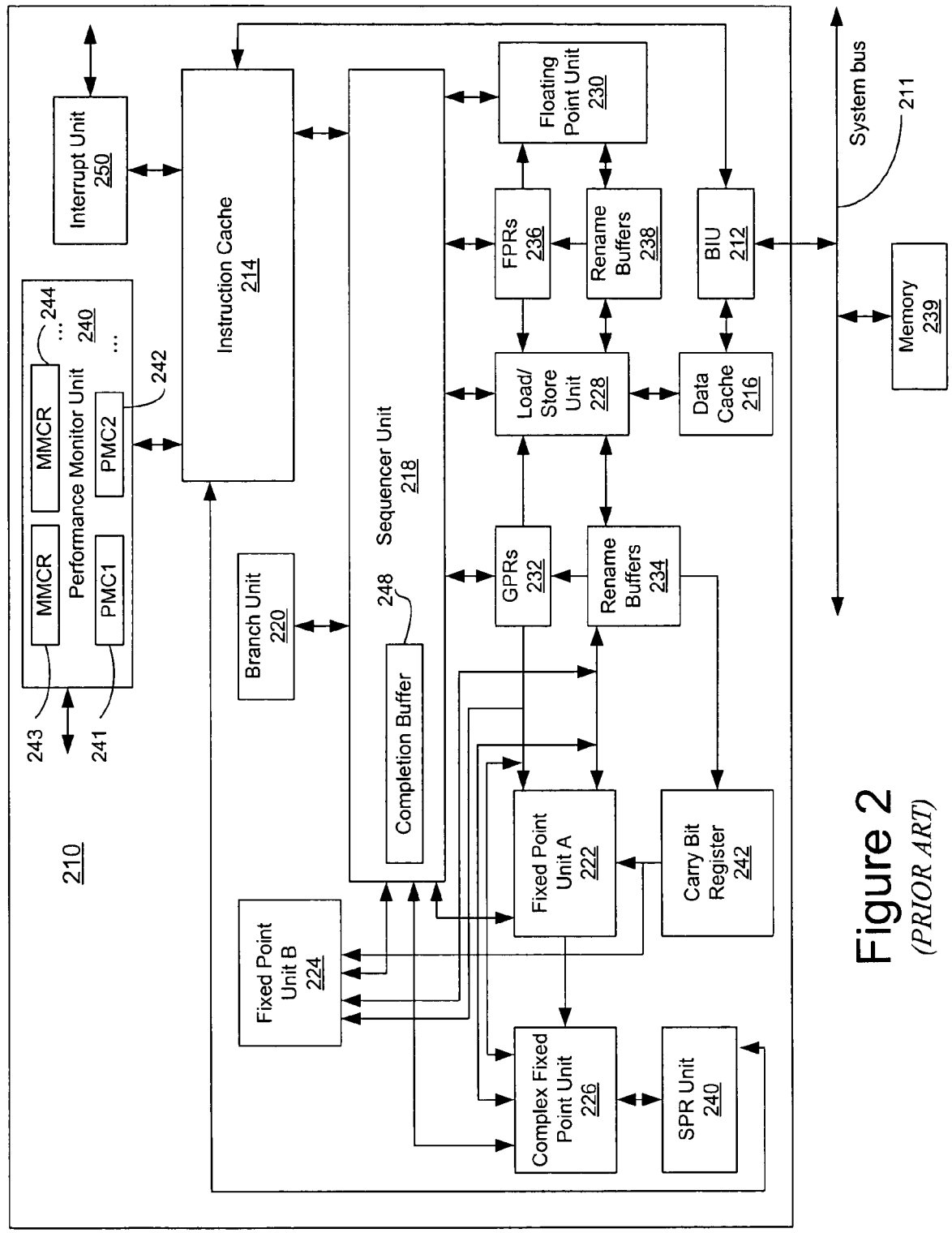
FIG. 2 is a block diagram of a processor system for processing information according to a preferred embodiment of the present invention.

Turning next to FIG. 2, a block diagram of a processor system for processing information is depicted in accordance with a preferred embodiment of the present invention. Processor 210 may be implemented as processor 102 in FIG. 1.

In a preferred embodiment, processor 210 is a single integrated circuit superscalar microprocessor. Accordingly, as discussed further herein below, processor 210 includes various units, registers, buffers, memories, and other sections, all of which are formed by integrated circuitry. Also, in the preferred embodiment, processor 210 operates according to reduced instruction set computer ("RISC") techniques. As shown in FIG. 2, system bus 211 is connected to a bus interface unit ("BIU") 212 of processor 210. BIU 212 controls the transfer of information between processor 210 and system bus 211.

BIU 212 is connected to an instruction cache 214 and to data cache 216 of processor 210. Instruction cache 214 outputs instructions to sequencer unit 218. In response to such instructions from instruction cache 214, sequencer unit 218 selectively outputs instructions to other execution circuitry of processor 210.

In addition to sequencer unit 218, in the preferred embodiment, the execution circuitry of processor 210 includes multiple execution units, namely a branch unit 220, a fixed-point unit A ("FXUA") 222, a fixed-point unit B ("FXUB") 224, a complex fixed-point unit ("CFXU") 226, a load/store unit ("LSU") 228, and a floating-point unit ("FPU") 230. FXUA 222, FXUB 224, CFXU 226, and LSU 228 input their source operand information from general-purpose architectural registers ("GPRs") 232 and fixed-point rename buffers 234. Moreover, FXUA 222 and FXUB 224 input a "carry bit" from a carry bit ("CA") register 239. FXUA 222, FXUB 224, CFXU 226, and LSU 228 output results (destination operand information) of their operations for storage at selected entries in fixed-point rename buffers 234. Also, CFXU 226 inputs and outputs source operand information and destination operand information to and from special-purpose register processing unit ("SPR unit") 237.

FPU 230 inputs its source operand information from floating-point architectural registers ("FPRs") 236 and floating-point rename buffers 238. FPU 230 outputs results (destination operand information) of its operation for storage at selected entries in floating-point rename buffers 238.

In response to a Load instruction, LSU 228 inputs information from data cache 216 and copies such information to selected ones of rename buffers 234 and 238. If such information is not stored in data cache 216, then data cache 216 inputs (through BIU 212 and system bus 211) such information from a system memory 239 connected to system bus 211. Moreover, data cache 216 is able to output (through BIU 212 and system bus 211) information from data cache 216 to system memory 239 connected to system bus 211. In response to a Store instruction, LSU 228 inputs information from a selected one of GPRs 232 and FPRs 236 and copies such information to data cache 216.

Sequencer unit 218 inputs and outputs information to and from GPRs 232 and FPRs 236. From sequencer unit 218, branch unit 220 inputs instructions and signals indicating a present state of processor 210. In response to such instructions and signals, branch unit 220 outputs (to sequencer unit 218) signals indicating suitable memory addresses storing a sequence of instructions for execution by processor 210. In response to such signals from branch unit 220, sequencer unit 218 inputs the indicated sequence of instructions from instruction cache 214. If one or more of the sequence of instructions is not stored in instruction cache 214, then instruction cache 214 inputs (through BIU 212 and system bus 211) such instructions from system memory 239 connected to system bus 211.

In response to the instructions input from instruction cache 214, sequencer unit 218 selectively dispatches the instructions to selected ones of execution units 220, 222, 224, 226, 228, and 230. Each execution unit executes one or more instructions of a particular class of instructions. For example, FXUA 222 and FXUB 224 execute a first class of fixed-point mathematical operations on source operands, such as addition, subtraction, ANDing, ORing and XORing. CFXU 226 executes a second class of fixed-point operations on source operands, such as fixed-point multiplication and division. FPU 230 executes floating-point operations on source operands, such as floating-point multiplication and division.

As information is stored at a selected one of rename buffers 234, such information is associated with a storage location (e.g. one of GPRs 232 or carry bit (CA) register 242) as specified by the instruction for which the selected rename buffer is allocated. Information stored at a selected one of rename buffers 234 is copied to its associated one of GPRs 232 (or CA register 242) in response to signals from sequencer unit 218. Sequencer unit 218 directs such copying of information stored at a selected one of rename buffers 234 in response to "completing" the instruction that generated the information. Such copying is called "writeback."

As information is stored at a selected one of rename buffers 238, such information is associated with one of FPRs 236. Information stored at a selected one of rename buffers 238 is copied to its associated one of FPRs 236 in response to signals from sequencer unit 218. Sequencer unit 218 directs such copying of information stored at a selected one of rename buffers 238 in response to "completing" the instruction that generated the information.

Processor 210 achieves high performance by processing multiple instructions simultaneously at various ones of execution units 220, 222, 224, 226, 228, and 230. Accordingly, each instruction is processed as a sequence of stages, each being executable in parallel with stages of other instructions. Such a technique is called "pipelining." In a significant aspect of the illustrative embodiment, an instruction is normally processed as six stages, namely fetch, decode, dispatch, execute, completion, and writeback.

In the fetch stage, sequencer unit 218 selectively inputs (from instruction cache 214) one or more instructions from one or more memory addresses storing the sequence of instructions discussed further hereinabove in connection with branch unit 220, and sequencer unit 218.

In the decode stage, sequencer unit 218 decodes up to four fetched instructions.

In the dispatch stage, sequencer unit 218 selectively dispatches up to four decoded instructions to selected (in response to the decoding in the decode stage) ones of execution units 220, 222, 224, 226, 228, and 230 after reserving rename buffer entries for the dispatched instructions' results (destination operand information). In the dispatch stage, operand information is supplied to the selected execution units for dispatched instructions. Processor 210 dispatches instructions in order of their programmed sequence.

In the execute stage, execution units execute their dispatched instructions and output results (destination operand information) of their operations for storage at selected entries in rename buffers 234 and rename buffers 238 as discussed further hereinabove. In this manner, processor 210 is able to execute instructions out-of-order relative to their programmed sequence.

In the completion stage, sequencer unit 218 indicates an instruction is "complete." Processor 210 "completes" instructions in order of their programmed sequence.

In the writeback stage, sequencer 218 directs the copying of information from rename buffers 234 and 238 to GPRs 232 and FPRs 236, respectively. Sequencer unit 218 directs such copying of information stored at a selected rename buffer. Likewise, in the writeback stage of a particular instruction, processor 210 updates its architectural states in response to the particular instruction. Processor 210 processes the respective "writeback" stages of instructions in order of their programmed sequence. Processor 210 advantageously merges an instruction's completion stage and writeback stage in specified situations.

In the illustrative embodiment, each instruction requires one machine cycle to complete each of the stages of instruction processing. Nevertheless, some instructions (e.g., complex fixed-point instructions executed by CFXU 226) may require more than one cycle. Accordingly, a variable delay may occur between a particular instruction's execution and completion stages in response to the variation in time required for completion of preceding instructions.

Completion buffer 248 is provided within sequencer 218 to track the completion of the multiple instructions which are being executed within the execution units. Upon an indication that an instruction or a group of instructions have been completed successfully, in an application specified sequential order, completion buffer 248 may be utilized to initiate the transfer of the results of those completed instructions to the associated general-purpose registers.

In addition, processor 210 also includes performance monitor unit 240, which is connected to instruction cache 214 as well as other units in processor 210. Operation of processor 210 can be monitored utilizing performance monitor unit 240, which in this illustrative embodiment is a software-accessible mechanism capable of providing detailed information descriptive of the utilization of instruction execution resources and storage control. Although not illustrated in FIG. 2, performance monitor unit 240 is coupled to each functional unit of processor 210 to permit the monitoring of all aspects of the operation of processor 210, including, for example, reconstructing the relationship between events, identifying false triggering, identifying performance bottlenecks, monitoring pipeline stalls, monitoring idle processor cycles, determining dispatch efficiency, determining branch efficiency, determining the performance penalty of misaligned data accesses, identifying the frequency of execution of serialization instructions, identifying inhibited interrupts, and determining performance efficiency. The events of interest also may include, for example, time for instruction decode, execution of instructions, branch events, cache misses, and cache hits.

Performance monitor unit 240 includes an implementation-dependent number (e.g., 2–8) of counters 241–242, labeled PMC1 and PMC2, which are utilized to count occurrences of selected events. Performance monitor unit 240 further includes at least one monitor mode control register (MMCR). In this example, two control registers, MMCRs 243 and 244 are present that specify the function of counters 241–242. Counters 241–242 and MMCRs 243–244 are preferably implemented as SPRs that are accessible for read or write via MFSPR (move from SPR) and MTSPR (move to SPR) instructions executable by CFXU 226. However, in one alternative embodiment, counters 241–242 and MMCRs 243–244 may be implemented simply as addresses in I/O space. In another alternative embodiment, the control registers and counters may be accessed indirectly via an index register. This embodiment is implemented in the IA-64 architecture in processors from Intel Corporation.

Additionally, processor 210 also includes interrupt unit 250, which is connected to instruction cache 214. Additionally, although not shown in FIG. 2, interrupt unit 250 is connected to other functional units within processor 210. Interrupt unit 250 may receive signals from other functional units and initiate an action, such as starting an error handling or trap process. In these examples, interrupt unit 250 is employed to generate interrupts and exceptions that may occur during execution of a program.

The present invention provides an ability to monitor the execution of specific instructions as well as the access of specific memory locations during the execution of a program. Specifically, a spare field may be used to hold an indicator that identifies the instruction or memory location as one that is to be monitored by a performance monitor unit or by some other unit in a processor. Alternatively, the indicator may be stored in another location in association with the instruction or memory location. In the case in which the indicator is placed in the instruction, a spare field is typically used, but in some cases the instruction may be extended to include the space needed for the indicator. With this case, the architecture of the processor may require changes. For example, a 64 bit architecture may be changed to a 65 bit architecture to accommodate the indicator. With respect to accesses of data, an indicator may be associated with the data or memory locations in which the data is located.

Figure 3:
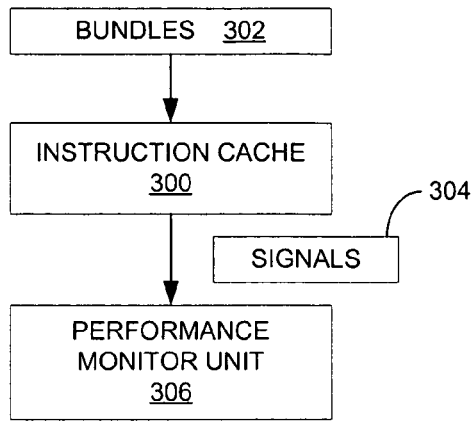
FIG. 3 is a diagram illustrating components used in processing instructions associated with indicators in accordance with a preferred embodiment of the present invention.

Turning now to FIG. 3, a diagram illustrating components used in processing instructions associated with indicators is depicted in accordance with a preferred embodiment of the present invention. Instruction cache 300 receives bundles 302. Instruction cache 300 is an example of instruction cache 214 in FIG. 2. A bundle is a grouping of instructions. This type of grouping of instructions is typically found in an IA-64 processor, which is available from Intel Corporation. Instruction cache 300 processes instructions for execution.

As part of this processing of instructions, instruction cache 300 determines which instructions are associated with indicators. These indicators also are referred to as "performance indicators" in these examples. Signals 304 have been associated with performance indicators. As a result, signals 304 for the instructions are sent to performance monitor unit 306. Performance monitor unit 306 is an example of performance monitor unit 240 in FIG. 2.

When instruction cache 300 determines that an instruction associated with an indicator is present, a signal is sent to indicate that a marked instruction is being executed. In these examples, a marked instruction is an instruction associated with a performance indicator. Alternatively, a performance indicator may indicate that all items or instructions in a bundle are marked to be counted. Additionally, signals for these instructions are sent by instruction cache 300 to the appropriate functional unit. Depending on the particular implementation, a functional unit other than performance monitor unit 306 may count execution of instructions. In the case that the performance indicators are in the instructions, or in the bundles, the cache unit, instruction cache 300, detects the indicators and sends signals to performance monitor unit 306.

When signals for these instructions are received by performance monitor unit 306, performance monitor unit 306 counts events associated with execution of instructions 304. As illustrated, performance monitor unit 306 is programmed only to count events for instructions associated with performance indicators. In other words, an indicator associated with a instruction or memory location is used to enable counting of events associated with the instruction or memory location by performance monitor unit 306. If an instruction is received by instruction cache 300 without a performance indicator, then events associated with that instruction are not counted. In summary, the performance indicators enable the counting on a per instruction or per memory location basis in a processor.

Performance monitor unit 306 counts events for instructions associated with performance indicators, if performance monitor unit 306 is set in a mode to count metrics enabled for these types of marked instructions. In some cases, performance monitor unit 306 may be set to perform some other type of counting, such as counting execution of all instructions, which is a currently available function.

With respect to the accessing of data in memory locations, the data and indicators are processed by a data cache, such as data cache 216 in FIG. 2, rather than by an instruction cache. The data cache sends signals indicating that marked memory locations are being accessed to performance monitor unit 306. Marked memory locations are similar to marked instructions. These types of memory locations are ones associated with a performance indicator.

Figure 4:
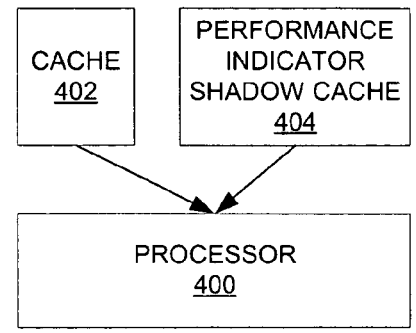
FIG. 4 is a diagram illustrating one mechanism for associating a performance indicator with an instruction or memory location in accordance with a preferred embodiment.

Turning next to FIG. 4, a diagram illustrating one mechanism for associating a performance indicator with an instruction or memory location is depicted in accordance with a preferred embodiment of the present invention. Processor 400 receives instructions from cache 402. In this example, the indicators are not stored with the instructions or in the memory locations in which data is found. Instead, the indicators are stored in a separate area of storage, performance instrumentation shadow cache 404. The storage may be any storage device, such as, for example, a system memory, a flash memory, a cache, or a disk.

When processor 400 receives an instruction from cache 402, processor 400 checks performance instrumentation shadow cache 404 to see whether a performance indicator is associated with the instruction. A similar check is made with respect to accesses of memory locations containing data. In one embodiment, a full shadow word is provided for each corresponding word that does not affect the actual data segments. In other words, processor 400 allows for the architecture or configuration of cache 402 to remain unchanged. In these examples, the mapping described is word for word. However, some other type of mapping may be used, such as a shadow bit per data word in which a bit in performance instrumentation shadow cache 404 corresponds to one word of data.

With respect to this type of architecture, the compilers, using this feature, create the debug information in a separate work area from the data area themselves in a manner similar to debug symbols. When a module is loaded, the extra information, performance indicators, is prepared by the loader so that it will be available to incorporate into performance instrumentation shadow cache 404 when instructions are loaded into cache 402. These cache areas may be intermingled and either marked as such or understood by the mode of operation. Processor 400 uses the performance indicators to determine how the related data accesses and instruction executions are to be counted or made to take exceptions. In these examples, the process is programmed by a debugger or a performance analysis program to know whether to use the shadow information while it is executing instructions.

Figure 5:
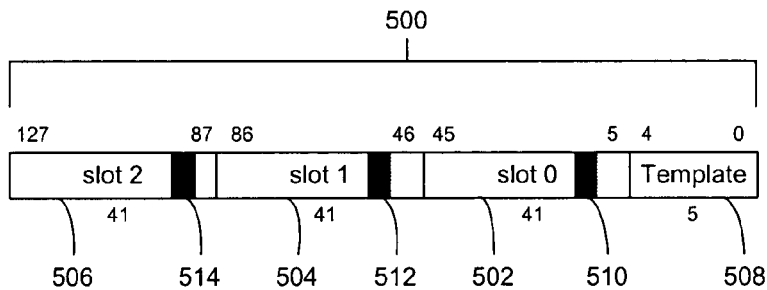
FIG. 5 is a diagram illustrating a bundle in accordance with a preferred embodiment of the present invention.

Turning next to FIG. 5, a diagram illustrating a bundle is depicted in accordance with a preferred embodiment of the present invention. Bundle 500 contains instruction slot 502, instruction slot 504, instruction slot 506 and template 508. As illustrated, bundle 500 contains 128 bits. Each instruction slot contains 41 bits, and template 508 contains 5 bits. Template 508 is used to identify stops within the current bundle and to map instructions within the slots to different types of execution units.

Spare bits within bundle 500 are used to hold indicators of the present invention. For example, indicators 510, 512, and 514 are located within instruction slots 502, 504, and 506, respectively. These indicators may take various forms and may take various sizes depending on the particular implementation. Indicators may use a single bit or may use multiple bits. A single bit may be used to indicate that events are to be counted in response to execution of that instruction. Multiple bits may be used to identify a threshold, such as a number of processor or clock cycles for instruction execution that may pass before events should be counted. Further, these bits may even be used as a counter for a particular instruction. A similar use of fields may be used for indicators that mark data or memory locations.

Alternatively, template 508 may be used to contain a bundle of related indicators, so that one bit is used to identify all of the instructions in a bundle. Also, the bundle itself could be extended to be 256 bits or some other number of bits to contain the extra information for the performance indicators.

Figure 6A:
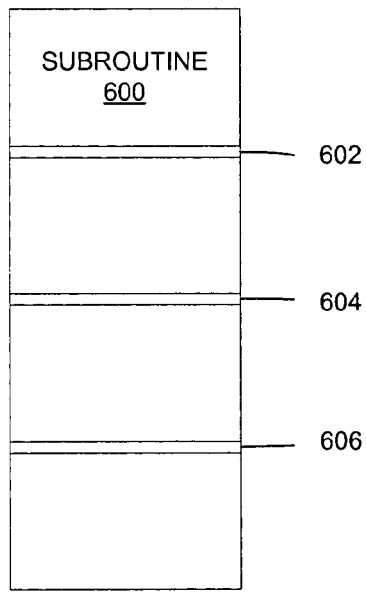
FIG. 6 is a diagram of a subroutine containing performance indicators in accordance with a preferred embodiment of the present invention.
Figure 6B:
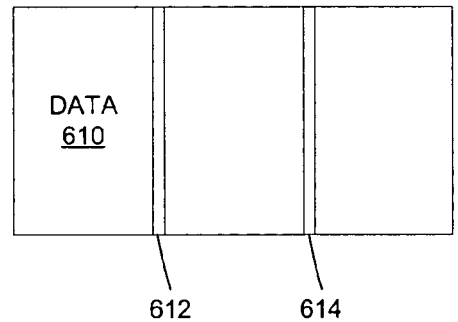

Turning next to FIGS. 6A and 6B, diagrams of a subroutine containing performance indicators and data containing performance indicators are depicted in accordance with a preferred embodiment of the present invention. In this example, subroutine 600 in FIG. 6A includes a number of instructions in which instructions 602, 604, and 606 are associated with performance indicators. These instructions also are referred to as marked instructions. When these instructions are executed, events associated with those instructions are counted to obtain data for software tools to analyze the performance of a data processing system executing a subroutine 600.

Data or memory locations containing data may be marked with indicators in a similar manner. These indicators are used in counting accesses to the data or memory locations in these examples. In FIG. 6B, data 610 includes data associated with performance indicators. Data 612 and data 614 are sections of data 610 that are associated with performance indicators. These sections of data, which are associated with performance indicators, also are referred to as marked data.

Figures 7, 8:
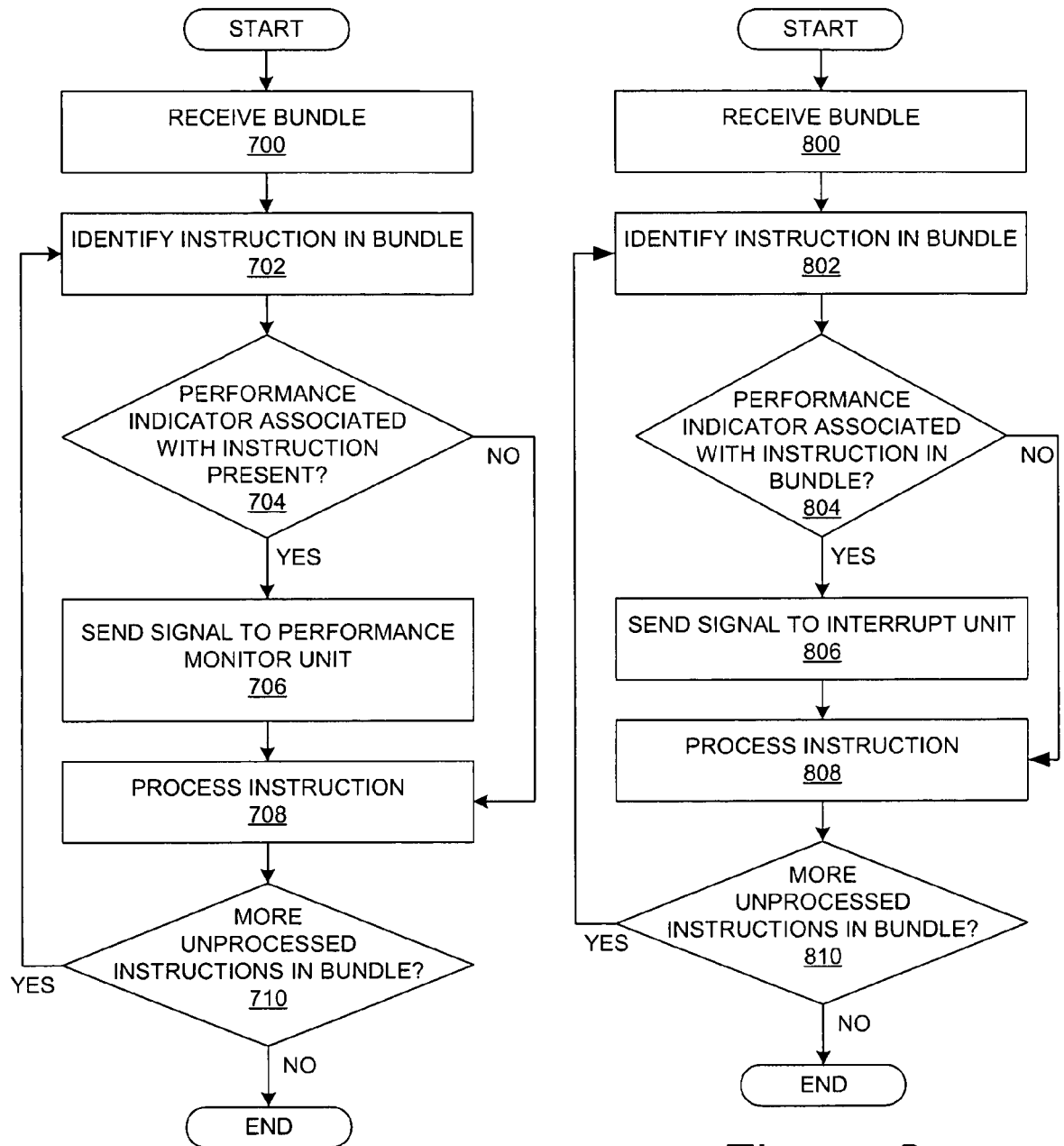
FIG. 7 is a flowchart of a process for processing instructions containing performance indicators in accordance with a preferred embodiment of the present invention.
FIG. 8 is a flowchart of a process for selectively sending instructions to an interrupt unit in accordance with a preferred embodiment of the present invention.

Turning now to FIG. 7, a flowchart of a process for processing instructions containing performance indicators is depicted in accordance with a preferred embodiment of the present invention. The process illustrated in FIG. 7 may be implemented in an instruction cache, such as instruction cache 214 in FIG. 2.

The process begins by receiving a bundle (step 700). In these examples, each bundle has a format similar to bundle 500 in FIG. 5. An instruction in the bundle is identified (step 702). A determination is made as to whether a performance indicator associated with the instruction is present (step 704). This determination may be made by examining an appropriate field in the instruction or bundle. Alternatively, a performance instrumentation shadow cache, such as performance instrumentation shadow cache 404 in FIG. 4 may be checked to see if a performance indicator is associated with the instruction.

If a performance indicator is present, a signal is sent to a performance monitor unit (step 706). Upon receiving this signal, the performance monitor unit will count events associated with the execution of the instruction. Additionally, the instruction is processed (step 708). Processing of the instruction includes, for example, sending the instruction to the appropriate functional unit for execution.

Thereafter, a determination is made as to whether additional unprocessed instructions are present in the bundle (step 710). If additional unprocessed instructions are present in the bundle, the process returns to step 702 as described above. Otherwise, the process terminates. Turning back to step 704, if the performance indicator is not present, the process proceeds directly to step 708.

Turning now to FIG. 8 a flowchart of a process for selectively sending signals to an interrupt unit is depicted in accordance with a preferred embodiment of the present invention. The process illustrated in FIG. 8 may be implemented in an instruction cache, such as instruction cache 242 in FIG. 2. This process is employed in cases in which monitoring events using a performance monitor unit may miss certain events. For example, a performance monitor unit counts events. When a cache miss occurs, a signal is sent to the performance monitor unit. When the meta data for a corresponding cache line is loaded into the cache, the appropriate signal or signals also are raised. If the meta data indicates that an exception is to be raised, then a signal is sent to the interrupt unit in which the signal indicates that an exception is to be raised.

The process begins by receiving a bundle (step 800). An instruction in the bundle is identified (step 802). A determination is made as to whether a performance indicator associated with the instruction is present (step 804). The signal sent to the interrupt unit to indicate an exception is to be raised is different from the signal sent to the performance monitor unit. For example, an instruction may be associated with a specific performance indicator having a first value that causes a signal to be sent to the interrupt unit. A second value for a performance indicator may be used to send a different signal to the performance monitor unit. If a performance indicator having the first value is present, the signal is sent to an interrupt unit (step 806). Upon receiving this signal, the interrupt unit initiates appropriate call flow support to process this interrupt. The call flow support may, for example, record cache misses that may be missed by a functional unit trying to access instructions or data in a cache.

Additionally, the instruction is processed (step 808). Processing of the instruction includes, for example, sending the instruction to the appropriate functional unit for execution.

Thereafter, a determination is made as to whether additional unprocessed instructions are present in the bundle (step 810). If additional unprocessed instructions are present in the bundle, the process returns to step 802 as described above. Otherwise, the process terminates. Turning back to step 804, if the performance indicator is not present, the process proceeds directly to step 808.

Figure 9:
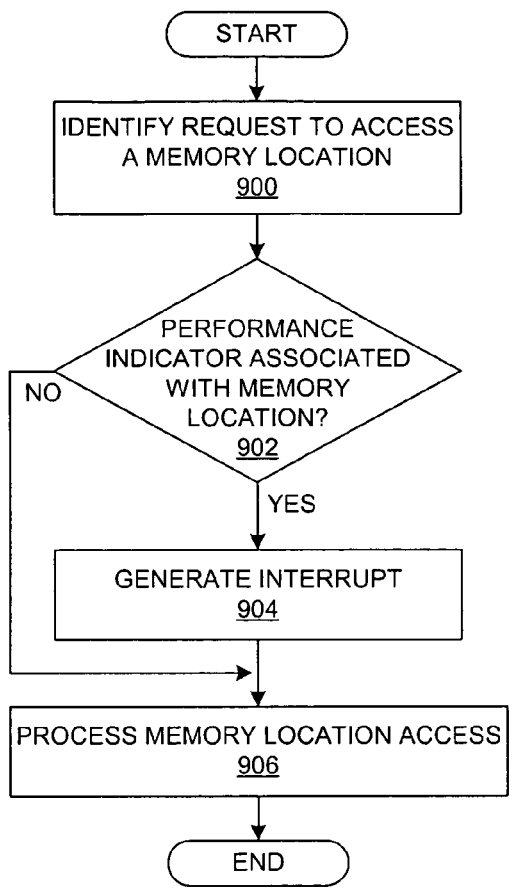
FIG. 9 is a flowchart of a process for generating an interrupt in response to an access of a memory location associated with a performance indicator in accordance with a preferred embodiment of the present invention.

With reference now to FIG. 9, a flowchart of a process for generating an interrupt in response to an access of a memory location associated with a performance indicator is depicted in accordance with a preferred embodiment of the present invention. The process illustrated in FIG. 9 may be implemented in a data cache, such as data cache 246 in FIG. 2.

The process begins by identifying a request to access a memory location (step 900). In response to identifying this request, a determination is made as to whether a performance indicator is associated with the memory location (step 902). If a performance indicator is associated with the memory location, an interrupt is generated by sending a signal to the interrupt unit (step 904). Thereafter, the access to the memory location is processed (step 906) with the process terminating thereafter.

Figure 10:
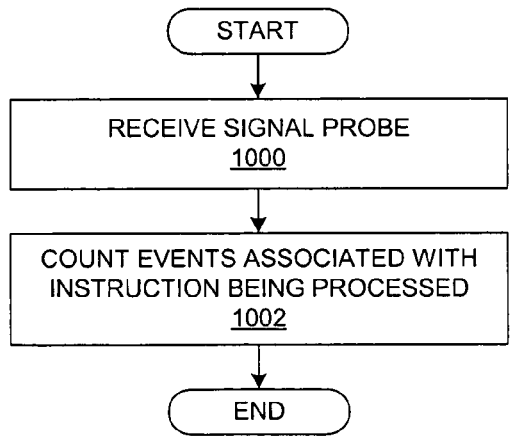
FIG. 10 is a flowchart of a process for counting events in accordance with a preferred embodiment of the present invention.

In FIG. 10, a flowchart of a process for counting events is depicted in accordance with a preferred embodiment of the present invention. The process illustrated in FIG. 10 may be implemented in a performance monitor unit, such as performance monitor unit 240 in FIG. 2.

The process begins by receiving a signal from an instruction cache indicating that an instruction with a performance indicator is being processed (step 1000). Next, events associated with the instruction being processed are counted (step 1002) with the process terminating thereafter. The counting of events may be stored in a counter, such as counter 241 in FIG. 2.

Figure 11:
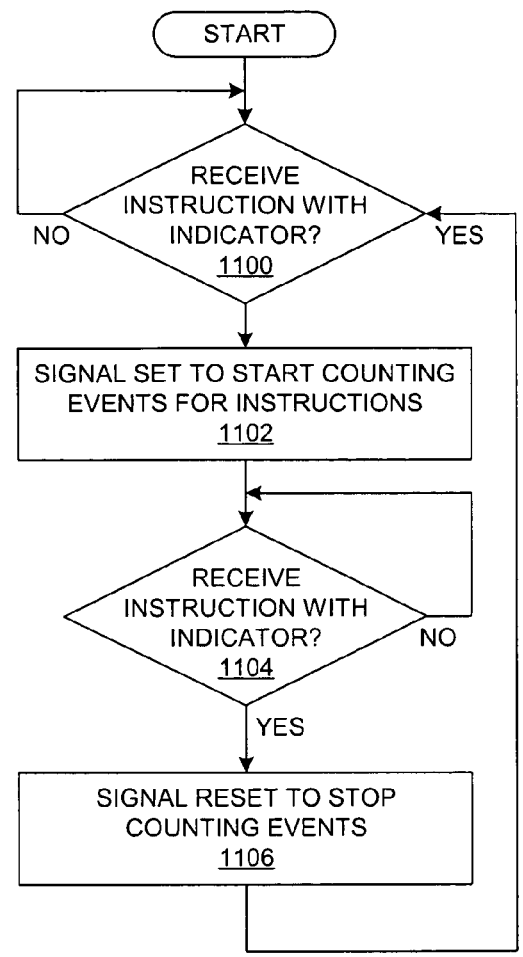
FIG. 11 is a flowchart of a process for selective counting of instructions in accordance with a preferred embodiment of the present invention.

With reference next to FIG. 11, a flowchart of a process for selective counting of instructions is depicted in accordance with a preferred embodiment of the present invention. The process illustrated in FIG. 11 may be implemented in an instruction cache, such as instruction cache 214 in FIG. 2.

The process begins by determining whether an instruction associated with a performance indicator has been received (step 1100). In this example, the indicator causes counting of events for this instruction and all subsequent instructions executed by the processor. Alternatively, the indicator could be an instruction itself which indicates the new mode of counting is to be started. If an instruction with an indicator has been received, a flag is set to start counting events for instructions (step 1102). This flag indicates that counting events for instructions should start.

Next, a determination is made as to whether an instruction with an indicator has been received (step 1104). Alternatively, the indicator could be an instruction itself which indicates the new mode of counting is to be stopped. If an instruction with an indicator is received, the flag is unset to stop counting the events (step 1106) with the process terminating thereafter.

The indicator in step 1100 and step 1104 may be the same indicator in which the indicator toggles the setting and unsetting of the flag. In another implementation, two different indicators may be used in which a first indicator only sets the flag. A second indicator is used to unset the flag. Communication between a cache unit, such as an instruction cache or a data cache, and the performance monitor unit to indicate a mode of counting may be implemented simply with a high signal when counting is to occur and a low signal when counting is no longer enabled.

Figure 12:
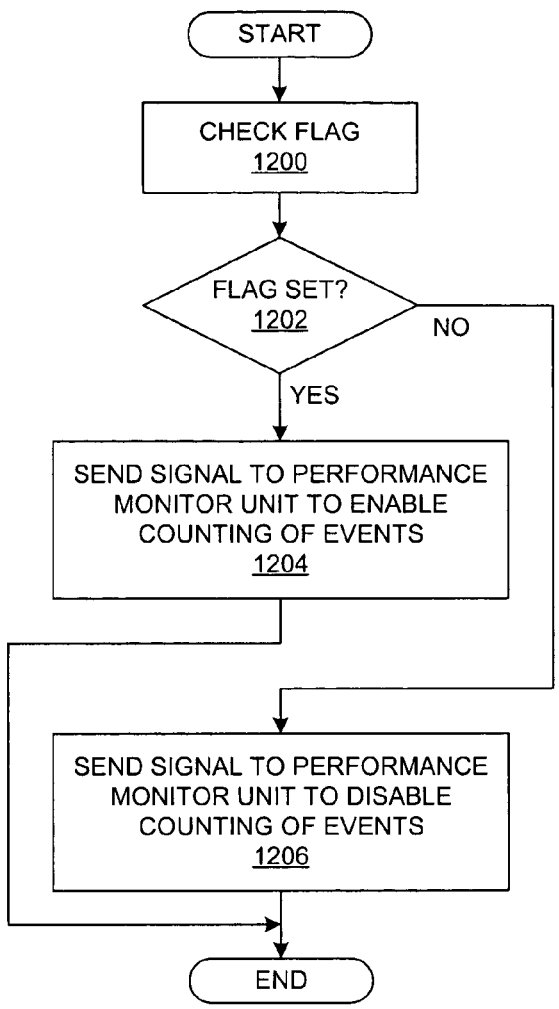
FIG. 12 is a flowchart of a process for selective counting of instructions in accordance with a preferred embodiment of the present invention.

With reference next to FIG. 12, a flowchart of a process for selective counting of instructions is depicted in accordance with a preferred embodiment of the present invention. The process illustrated in FIG. 12 may be implemented in an instruction cache, such as instruction cache 214 in FIG. 2.

The process begins by checking a flag (step 1200). A determination is made as to whether the flag is set (step 1202). If the flag is set, a signal is sent to the performance monitor unit to enable this unit to count events (step 1204) with the process terminating thereafter. Otherwise, a signal is sent to the performance monitor unit to disable the counting of events (step 1206) with the process terminating thereafter.

The processes illustrated in FIGS. 11 and 12 count events for all instructions after an instruction is associated with a performance indicator. In this manner, fewer bits may be used to toggle counting of events. Further, with the counting of all instructions, events associated with calls to external subroutines may be counted.

Figure 13:
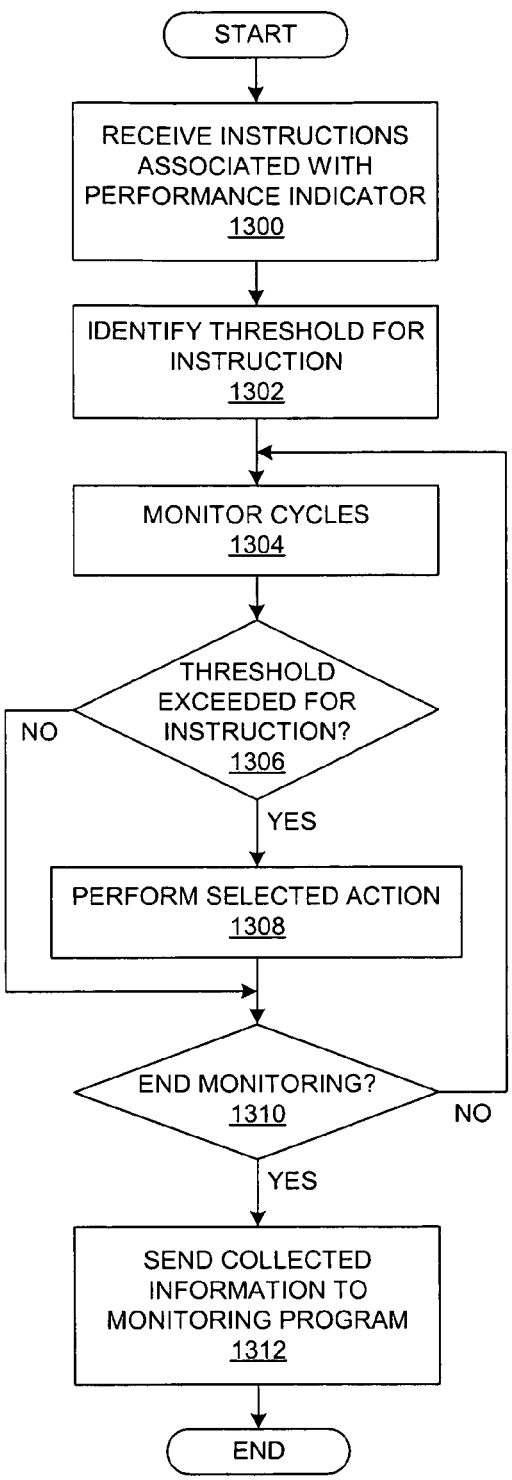
FIG. 13 is a flowchart of a process for identifying instructions exceeding a threshold in accordance with a preferred embodiment of the present invention.

Turning now to FIG. 13, a flowchart of a process for identifying instructions exceeding a threshold is depicted in accordance with a preferred embodiment of the present invention. The process illustrated in FIG. 13 may be implemented in an instruction cache, such as instruction cache 214 in FIG. 2.

The process begins by receiving an instruction associated with a performance indicator (step 1300). A threshold is identified for the instruction (step 1302). In these examples, the threshold relates to a number of processor or clock cycles needed to complete an instruction. If the cache latency or amount of time needed to access the cache exceeds the threshold value, that event is counted. The threshold value is set within the indicator in these examples.

For example, three bits may be used to set eight different values for the threshold. For example, "xx1"=10 cycles, "x1x"=50 cycles, and "1xx"=100 cycles. Some combination of these three bits may be used to set values for the threshold. More or fewer bits may be used and different values may be assigned to the bits depending on the specific implementation. The meaning of the bits may also be controlled through an interface, such as a set of registers that may be used to set the meaning of each of the bits. These registers are ones that are added to the processor architecture for this specific purpose.

Cycles for executing the instruction are monitored (step 1304). A determination is made as to whether the threshold has been exceeded for this instruction (step 1306). If the threshold has been exceeded, then a selected action is performed (step 1308). This selected action may take different forms depending on the particular implementation. For example, a counter may be incremented each time the threshold is exceeded. Alternatively, an interrupt may be generated. The interrupt may pass control to another process to gather data. For example, this data may include a call stack and information about the call stack. A stack is a region of reserved memory in which a program or programs store status data, such as procedure and function call addresses, passed parameters, performance monitor counter values, and sometimes local variables.

A determination is made as to whether monitoring is to end (step 1310). Step 1310 may be implemented one instruction at a time. When an instruction is executed or the threshold is exceeded, a signal is sent. In this example, execution of a single instruction results in one signal being sent. In the case in which multiple instructions may be executed at the same time, multiple signals may be needed to indicate the execution of each instruction. In some embodiments, a sampling approach may be supported, where the threshold is only supported for one instruction at a time. This may be done by only supporting thresholds for those instructions that are in a particular position in the processor's instruction queue. In other embodiments, one signal may be sent if at least one of the marked instructions exceeds the threshold. For each instruction in which a threshold is exceeded, a separate signal is raised or generated for that instruction.

If the monitoring is to end, the collected information is sent to a monitoring program (step 1312), with the process terminating thereafter. Otherwise, the process returns to step 1304 as described above. In step 1306, if the threshold is not exceeded for the instruction, the process proceeds directly to step 1310.

A similar process may be implemented in a data cache, such as data cache 216 in FIG. 2 to monitor accesses to memory locations. The process illustrated in FIG. 13 may be adapted to identify the cycles needed to access data in a memory location. As with the execution of instructions, counting occurs or an interrupt is generated when the amount of time needed to access the data in a memory location exceeds a specified threshold.

As with the other examples, these indicators may be included as part of the instruction or with the data in a memory location. Alternatively, these indicators may be found in a performance instrumentation shadow cache or memory in association with the instruction or data.

Figure 14:
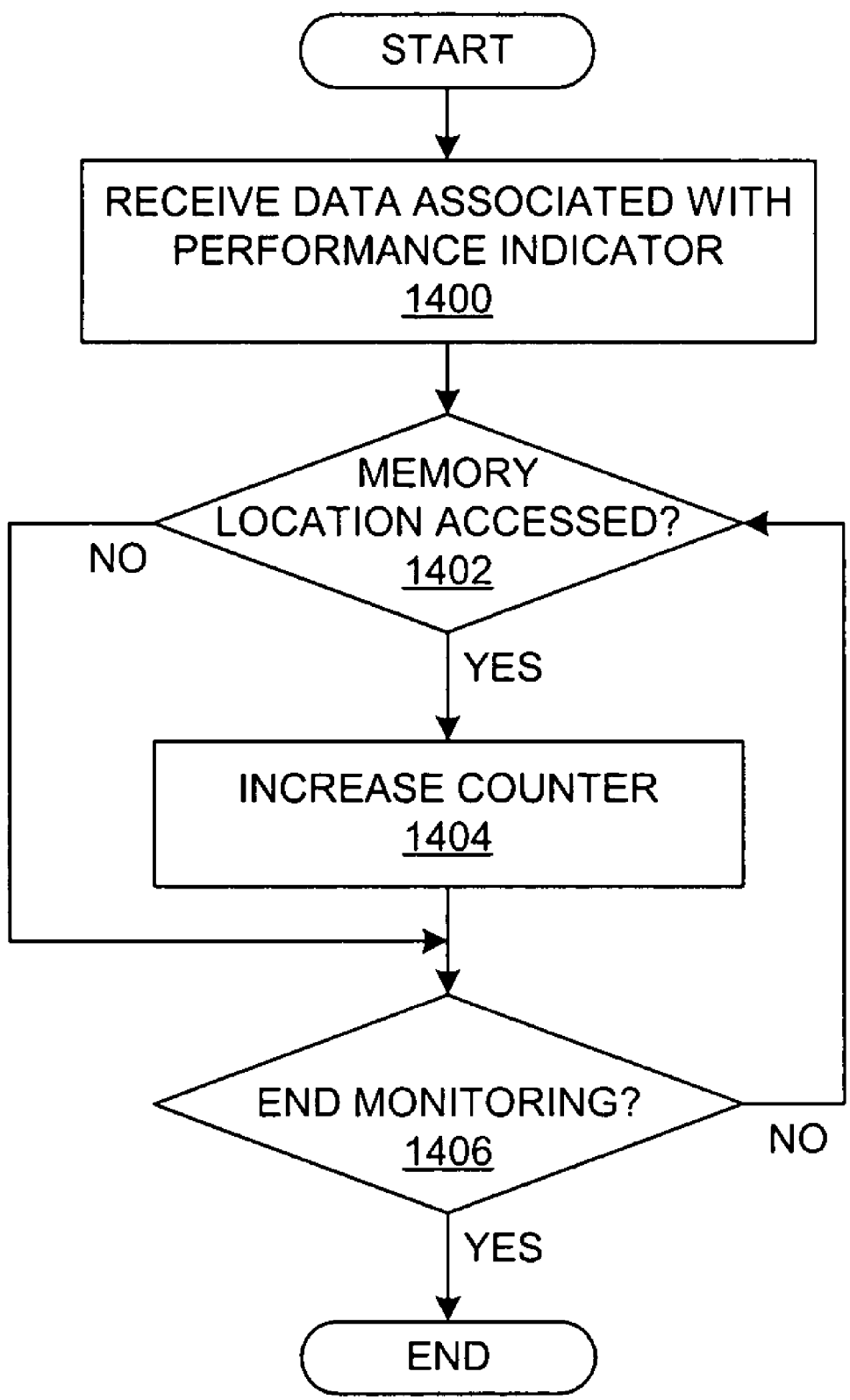
FIG. 14 is a flowchart of a process for accesses to a memory location in accordance with a preferred embodiment of the present invention.

With reference to FIG. 14, a flowchart of a process for monitoring accesses to a memory location is depicted in accordance with a preferred embodiment of the present invention. The process illustrated in FIG. 14 may be implemented in a data cache, such as data cache 216 in FIG. 2. This process is used to count accesses to data in a memory location.

The process begins by receiving data associated with a performance indicator (step 1400). A determination is made as to whether a memory location for the data has been accessed (step 1402). If the memory location has been accessed, then a counter is incremented (step 1404). A determination is made as to whether monitoring is to end (step 1406). If monitoring of the memory location is to end, the process terminates. Otherwise, the process returns to step 1402. In step 1402, if the memory location is not accessed, then the process proceeds to step 1406.

Figure 15:
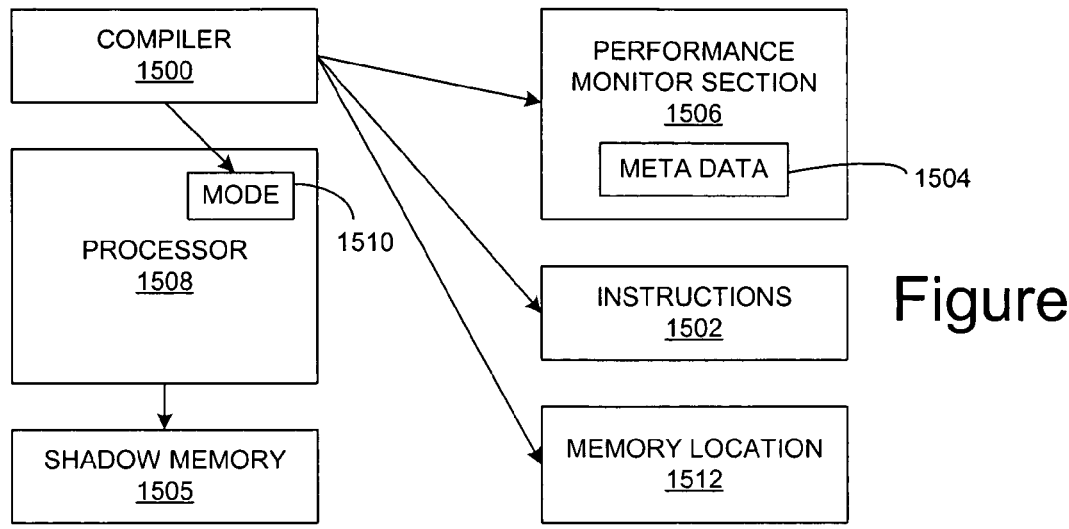
FIG. 15 is a block diagram illustrating components used for generating meta data, such as performance indicators, in accordance with a preferred embodiment of the present invention.

Turning to FIG. 15, a block diagram illustrating components used for generating meta data, such as performance indicators, is depicted in accordance with a preferred embodiment of the present invention. The compiler supports directives embedded in the source that indicate the meta data to be generated. Compiler 1500 may generate instructions 1502 for execution and meta data for monitoring. As instruction or data cache pages are loaded into memory, the operating system program loader/linker and/or the performance monitoring program, reads the meta data generated by compiler 1500 and loads the meta data into memory, such as performance monitor section 1506, in these examples. The section itself is marked as meta data 1504. The processor may accept meta data 1504 in the format of the compiler generated section data in performance monitor section 1506 and populate processor's internal performance instrumentation shadow cache with the data. A block oriented approach is described with reference to FIG. 17 below.

In one embodiment the format simply has a performance instrumentation shadow cache entry for each of its block or sector references and moves meta data 1504 to its corresponding shadow entry or entries. Instead of having a performance instrumentation shadow cache, the internal format of the cache itself may be modified to contain meta data 1504. In embodiments where the instruction stream itself is modified to contain the meta data, then either the loader updates the instruction stream to contain the appropriate indicators and work areas or compiler 1500 has generated the code to contain meta data 1504. In either case, after the code is loaded, the processor receives the meta data 1504.

In addition, meta data 1504 may be placed into performance instrumentation shadow memory 1505 in association with instructions 1502. Compiler 1500 produces information in a table or debug data section. The performance monitoring program loads this information into shadow data areas in performance instrumentation shadow memory 1505. Alternatively, the debug areas may be automatically populated by the operating system and the processor working together.

Instructions 1502 may then be executed by processor 1508. Compiler 1500 may set a register such as mode register 1510 in processor 1508. When this register is set, processor 1508 looks at meta data 1504 in performance instrumentation shadow memory 1505 when executing instructions 1502 to determine whether performance indicators in meta data 1504 are associated with instructions that are being executed in instructions 1502. These performance indicators are handled using processes, such as those described above with reference to FIGS. 2–14. If mode register 1510 is not set, then meta data 1504 is ignored when instructions 1502 are executed.

A similar process may be performed with respect to data in memory location 1512. Depending on the particular implementation, meta data 1504 may be placed within the instruction or within the data, rather than in performance instrumentation shadow memory 1505. However, by placing meta data 1504 in performance instrumentation shadow memory 1505, the generation of meta data 1504 may be performed dynamically when meta data 1504 is placed in performance instrumentation shadow memory 1505.

This feature allows for selection and monitoring of instructions to occur without having to modify the program. In other words, compiler 1500 may generate meta data 1504 after instructions 1502 have been compiled for execution by processor 1508. Setting mode register 1510 causes processor 1508 to look for meta data 1504 in performance instrumentation shadow memory 1505 without having to modify instructions 1502. In these examples, meta data 1504 take the form of performance indicators that tell processor 1508 how to handle the execution of instructions 1502 and/or data accesses to memory location 1512.

Figure 16:
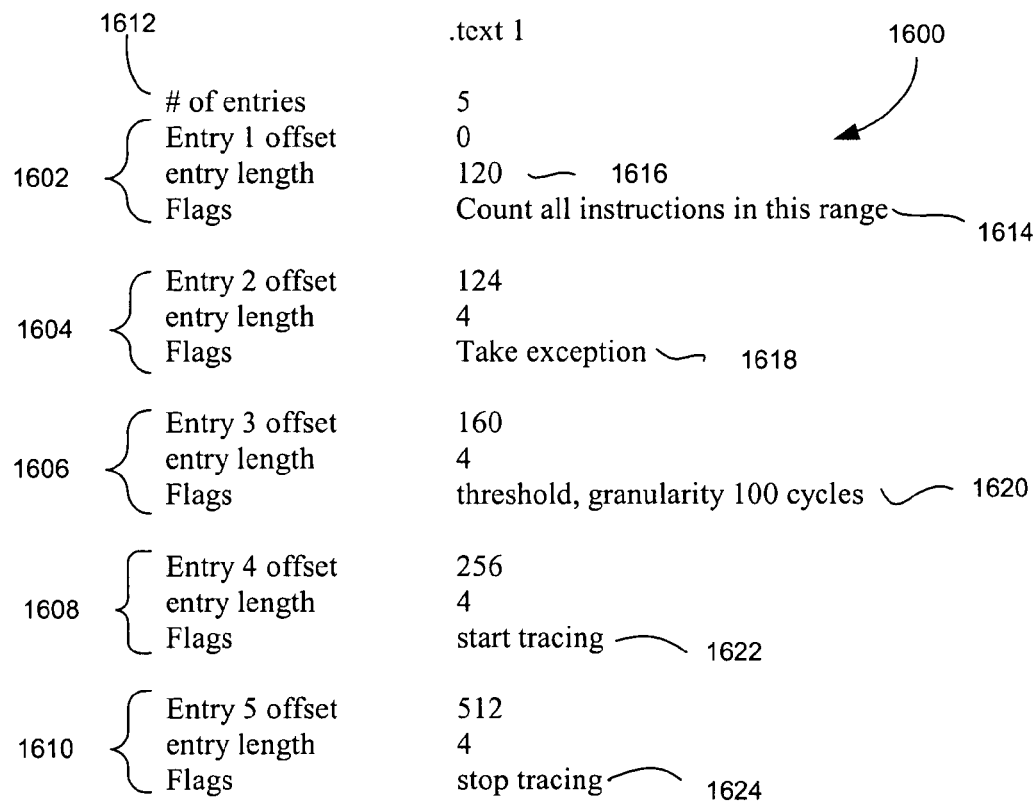
FIG. 16 is a diagram illustrating meta data in accordance with a preferred embodiment of the present invention.

Turning next to FIG. 16, a diagram illustrating meta data is depicted in accordance with a preferred embodiment of the present invention. Meta data 1600 is an example of meta data 1504 in FIG. 15. This meta data is generated by a compiler, such as compiler 1500.

In this example, meta data 1600 includes 5 entries, entry 1602, 1604, 1606, 1608, and 1610 as indicated by line 1612 in meta data 1600. Each of these entries includes an offset, a length, and a flag for describing the instrumentation of code in this example.

Entry 1602 has an offset of 0 with an entry length of 120 bytes. Flag 1614 indicates that all instructions within the range indicated by entry length 1616 need to be counted. In these examples, each instruction has a length of 4 bytes. Entry 1604 has an entry length of 4 bytes, which corresponds to an instruction. Flag 1618 indicates that an exception should be generated upon execution of this instruction.

In entry 1606, an instruction beginning at an offset of 160 bytes is associated with flag 1620. This flag indicates that the instruction should be counted if the threshold, 100 cycles, is exceeded.

Flag 1622 in entry 1608 indicates that tracing should start at the instruction having an offset of 256 bytes. Tracing stops as indicated by flag 1624 in entry 1610, which has a flag for the instruction at an offset of 512 bytes.

These flags are used to generate the performance indicators that are associated with the instructions. The operating system moves this meta data generated by the compiler and processes the meta data into a performance instrumentation shadow memory, such as performance instrumentation shadow memory 1506 in FIG. 15. Alternatively, this meta data may be placed into fields within the instructions depending on the particular implementation.

Figure 17:
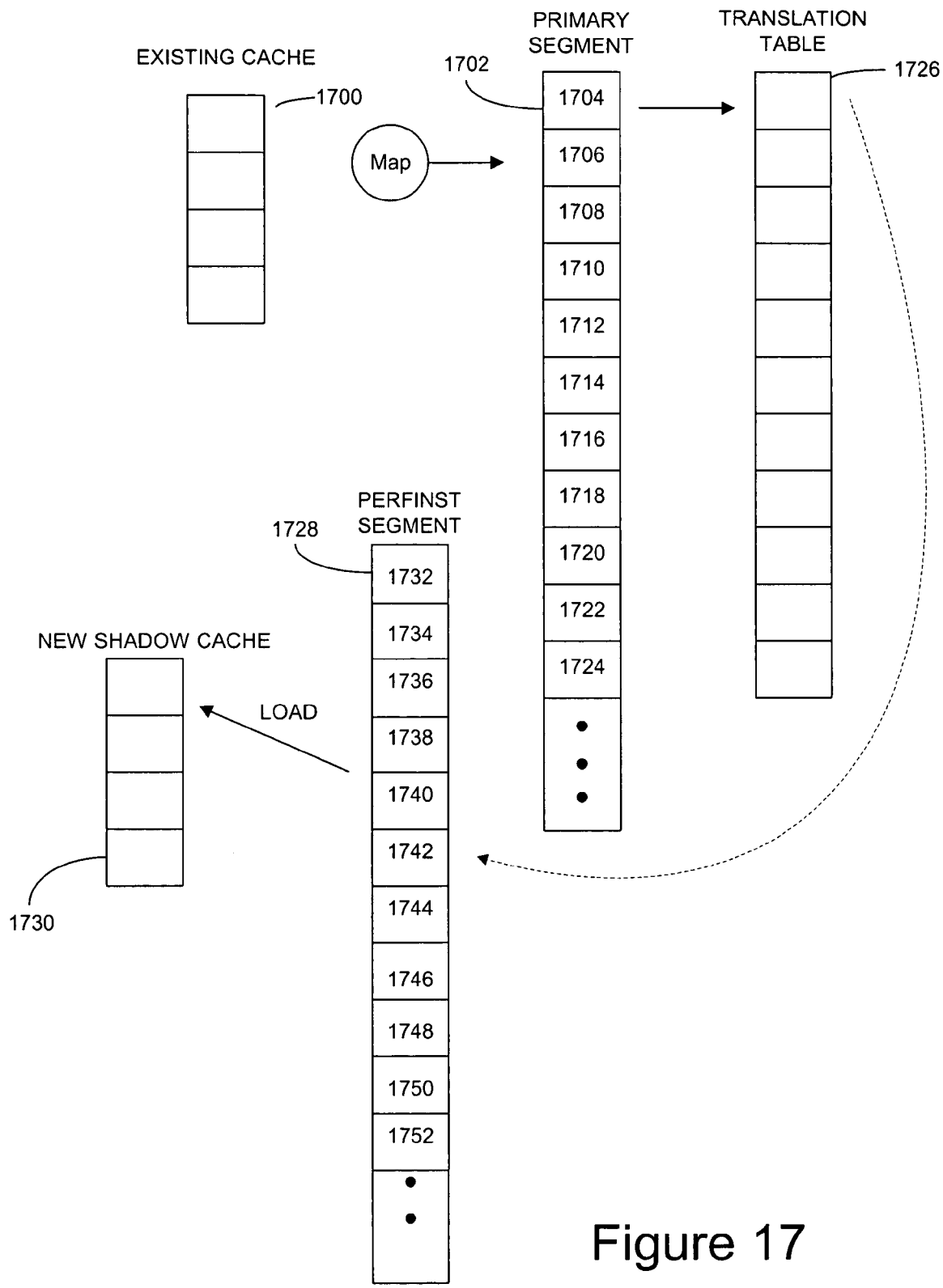
FIG. 17 is a diagram illustrating components involved in loading and maintaining a performance instrumentation shadow cache in accordance with a preferred embodiment of the present invention.

With reference now to FIG. 17, a diagram illustrating components involved in loading and maintaining a performance instrumentation shadow cache are depicted in accordance with a preferred embodiment of the present invention. In this example, existing cache 1700 contains primary segment 1702. Primary segment 1702 includes blocks 1704, 1706, 1708, 1710, 1712, 1714, 1716, 1718, 1720, 1722, and 1724. Translation table 1726 is used to provide a mapping for blocks 1704–1724 in primary segment 1702 to blocks in perfinst segment 1728. The data in this segment is placed into new performance instrumentation shadow cache 1730.

At program compile time, the compiler generates a new performance instrumentation data section as previously described. At program load time, the loader queries the processor to determine cache line size. The loader parses perfinst segment 1728 and constructs a shadow segment, in the format required by the processor, for any text or data segment that the loader loads. This shadow segment is placed into new performance instrumentation shadow cache 1730.

Each block in the shadow segment contains meta data for instructions or data in the corresponding primary cache block. This meta data includes, for example, flags, tag fields, threshold, and count fields for each tagged item in a block in primary segment 1702. This meta data also may include a flag that represents all the instructions or data in the block.

The loader constructs a table mapping, translation table 1726, for each block in primary segment 1702 to a corresponding perfinst block, such as block 1732, 1734, 1736, 1738, 1740, 1742, 1744, 1746, 1748, 1750, and 1752 in perfinst segment 1728. Further, the loader registers the head of this table, translation table 1726, and the location and size of primary segment 1702 with the processor.

At page replacement time, paging software provides a new interface to associate perfinst segment 1728 with the corresponding primary segment, primary segment 1702. When primary segment 1702 pages in or out, perfinst segment 1728 pages in or out as well.

At cache line replacement time, the processor contains new performance instrumentation shadow cache 1730 with cache frames directly associated with the frames in the existing data and instruction caches, such as existing cache 1700. When the processor's instruction or data cache loads a new line, the cache also must load the corresponding perfinst block into the performance instrumentation shadow cache, new performance instrumentation shadow cache 1730. The processor sees (from the registration data given by the loader at program load time) that the processor is bringing a block into its cache that has an associated perfinst segment, perfinst segment 1728. The processor looks in translation table 1726 associated with this segment, finds a reference to the perfinst block corresponding to the block it is about to load and loads the perfinst block into new performance instrumentation shadow cache 1730. In these examples, cache misses associated with meta data are not signaled or are treated differently from cache misses associated data in a primary cache block, such as in primary segment 1702.

Figure 18:
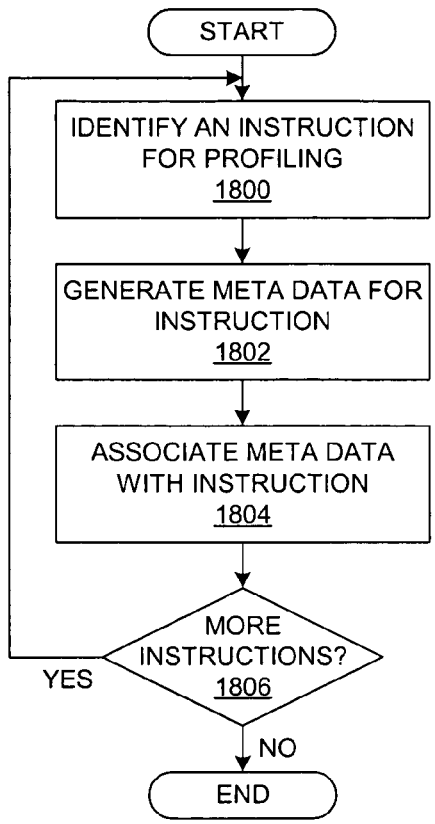
FIG. 18 is a flowchart of a process for generating meta data for instructions in accordance with a preferred embodiment of the present invention.

With reference now to FIG. 18, a flowchart of a process for generating meta data for instructions is depicted in accordance with a preferred embodiment of the present invention. The process illustrated in FIG. 18 may be implemented by a performance monitoring program.

The process begins by identifying an instruction for profiling (step 1800). This instruction may be, for example, one that has been executed more than a selected number of times. Meta data is generated for the identified instruction (step 1802). This meta data takes the form of a performance indicator. The performance indicator may, for example, increment a counter each time the instruction is executed, increment a counter if the number of cycles needed to execute the instruction exceeds a threshold value, toggle counting of events for all instructions for all events after this instruction, or count events occurring in response to executing the instruction. In a preferred embodiment, the counters are in the associated performance instrumentation shadow cache and take some number of bits to allow for a one to one correspondence between the data or instructions in the cache and the bits reserved for counting.

The meta data is then associated with the instruction (step 1804). Next, a determination is made as to whether more instructions are present for processing (step 1806). If additional instructions are present, the process returns to step 1800. Otherwise, the process terminates. A similar process may be used to dynamically generate meta data for data in memory locations.

Figure 19:
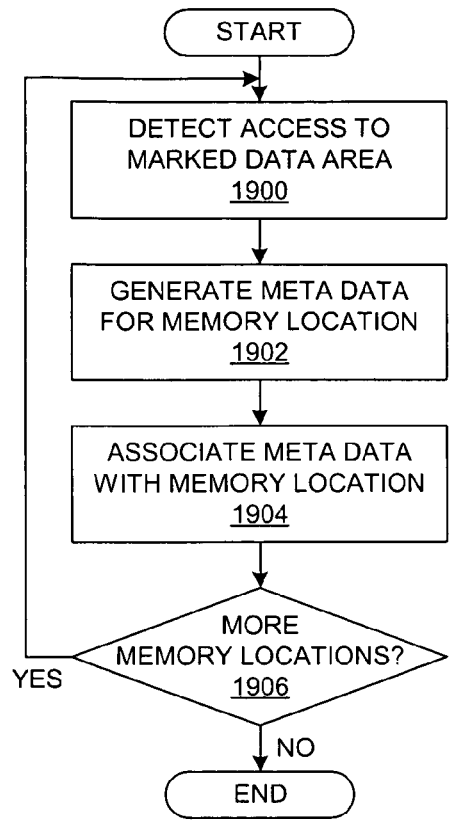
FIG. 19 is a flowchart of a process for generating meta data for memory locations in accordance with a preferred embodiment of the present invention.

With reference now to FIG. 19, a flowchart of a process for generating meta data for memory locations is depicted in accordance with a preferred embodiment of the present invention. The process illustrated in FIG. 19 may be implemented in a compiler such as compiler 1500 in FIG. 15.

The process begins by identifying a memory location for profiling (step 1900). Step 1900 occurs by detecting access to a marked location. Meta data is generated for the identified memory location (step 1902). This meta data takes the form of a performance indicator. The performance indicator may, for example, increment a counter each time the memory location is accessed, increment a counter if the number of cycles needed to access the memory location exceeds a threshold value, or toggle counting of all accesses to memory locations. The meta data is then associated with the memory location (step 1904). Next, a determination is made as to whether more memory locations are present for processing (step 1906). If additional memory locations are present, the process returns to step 1900. Otherwise, the process terminates.

Figure 20:
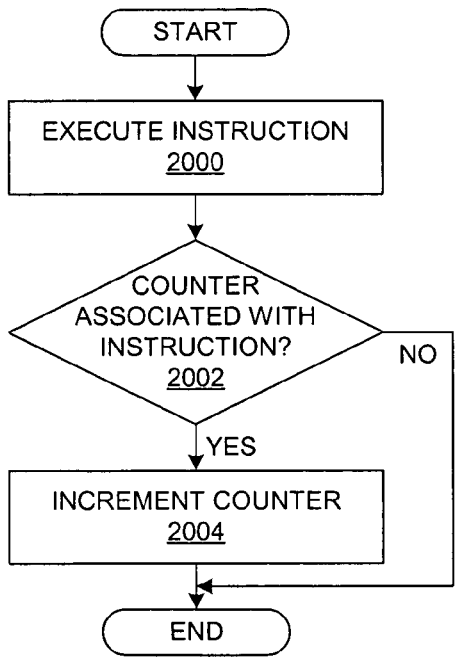
FIG. 20 is a flowchart of a process for counting execution for particular instructions in accordance with a preferred embodiment of the present invention.

Turning now to FIG. 20, a flowchart of a process for counting execution for particular instructions is depicted in accordance with a preferred embodiment of the present invention. The process illustrated in FIG. 20 may be implemented in an instruction cache such as instruction cache 214 in FIG. 2.

The process begins by executing an instruction (step 2000). A determination is made as to whether a counter is associated with the instruction (step 2002). The counter may be included in a field within the instruction or may be in a performance instrumentation shadow memory. If a counter is associated with the instruction, the counter is incremented (step 2004) with the process terminating thereafter. Otherwise, the process terminates without incrementing the counter. The counter may be reset if the counter exceeds a threshold value.

When the counter is implemented as part of the instructions, the counter may be of limited size. In this case, a threshold value for the counter may be set to indicate when the counter is in danger of overflowing. The counter may then be reset after the value has been read. This value may be read by a performance monitor unit or by a program used to analyze data. APIs may be implemented to access this data.

Figure 21:
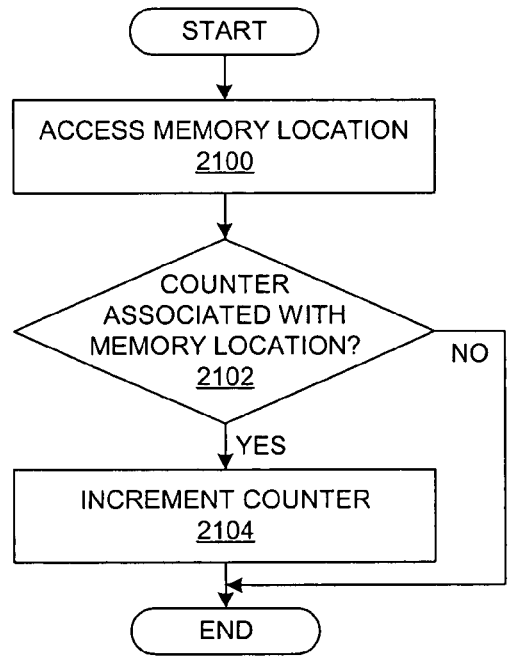
FIG. 21 is a flowchart of a process for counting accesses to a particular memory location in accordance with a preferred embodiment of the present invention.

Turning now to FIG. 21, a flowchart of a process for counting accesses to a particular memory location is depicted in accordance with a preferred embodiment of the present invention. The process illustrated in FIG. 21 may be implemented in a data cache, such as data cache 216 and instruction cache 214 in FIG. 2.

The process begins by detecting access to a memory location (step 2100). A determination is made as to whether a counter is associated with the memory location (step 2102). The counter may be included within the memory location or may be in a performance instrumentation shadow memory. If a counter is associated with the memory location, the counter is incremented (step 2104) with the process terminating thereafter. Otherwise, the process terminates without incrementing the counter.

Figure 22:
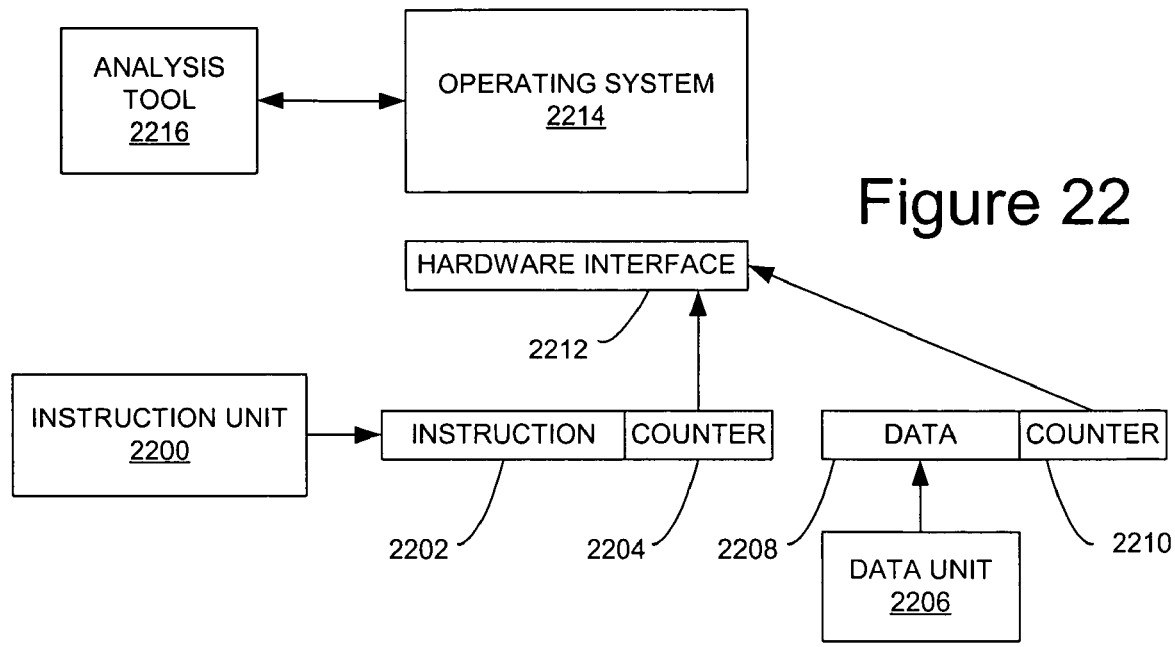
FIG. 22 is a diagram illustrating components used in accessing information collected with respect to the execution of instructions or the access of memory locations in accordance with a preferred embodiment of the present invention.

With reference next to FIG. 22, a diagram illustrating components used in accessing information collected with respect to the execution of instructions or the access of memory locations in accordance with a preferred embodiment of the present invention. In this example, instruction unit 2200 executes instruction 2202 and increments counter 2204. This counter is incremented each time instruction 2202 is executed. In this example, instruction unit 2200 may be implemented as instruction cache 214 in FIG. 2.

When the instruction or data cache pages are loaded into memory, the operating system program loader/linker and/or the performance monitoring program, reads the meta data generated by the compiler and determines that counting is associated with instruction or data access, then the loading process allocates data areas to maintain the counters as part of its perfinst segment. The size of the counters and the granularity of the data access determine the amount of work area to be allocated.

In a simple case, the granularity of the data or instruction access could be word size (so that an access to any byte in the word is considered an access) and the counts could also be a word size. In this case, one to many mapping is present between the primary segment and the perfinst segment (a full word to contain the counts or threshold is not required). The loading process allocates a shadow page or pages and tells the processor to use the shadow page(s) to contain the counts. Details of this mapping are described above with reference to FIG. 17. The cache unit in the processor maintains a shadow block entry to indicate the corresponding page to contain the count information. Different mapping and different levels of support could be provided.

In an alternative embodiment, the compiler allocates the work areas to maintain the counts and indicates the placement of these work areas in its generated data areas. An entry in the meta data could indicate the start of the data, the number of bytes of data, granularity of the data, the start of the count area, and the granularity of each counting unit. In either case, the meta data is loaded into the processor and the processor populates its internal (shadow) cache with the meta data. In illustrative embodiments in which the instruction stream itself is modified to contain the meta data, then either the loader updates the instruction stream to contain the appropriate indicators and work areas or the compiler has generated the code to contain the meta data. In either case, after the code is loaded, the processor receives the meta data.

Data unit 2206 may be implemented as data cache 206 in FIG. 2. In this example, each time data 2208 is accessed, counter 2210 is incremented. Data 2208 and counter 2210 are both located in a particular memory location. In these examples, a new instruction may be employed in which the instruction is called ReadDataAccessCount (RDAC) that takes a data address and a register and puts the count associated with that data address in the register.

Each of these events, instruction execution and data access, results in incrementing of a counter. The mechanism of the present invention provides an interface, hardware interface 2212, to access this collected data. In these examples, hardware interface 2212 takes the form of an application programming interface (API) for operating system 2214. In this way, analysis tool 2216 may obtain data from counter 2204 and counter 2210. Analysis tool 2216 may take many forms, such as for example, Oprofile, which is a known system wide profiler for Linux systems. Although the examples in FIG. 22 illustrate providing an interface to an instruction unit and a data unit, hardware interface 2212 may be implemented to provide access to information from other units in a processor. For example, APIs may be created for hardware interface 2212 that allows for accessing information located in counters in a performance monitor unit, such as counter 241 and 242 in performance monitor unit 240 in FIG. 2.

Figure 23:
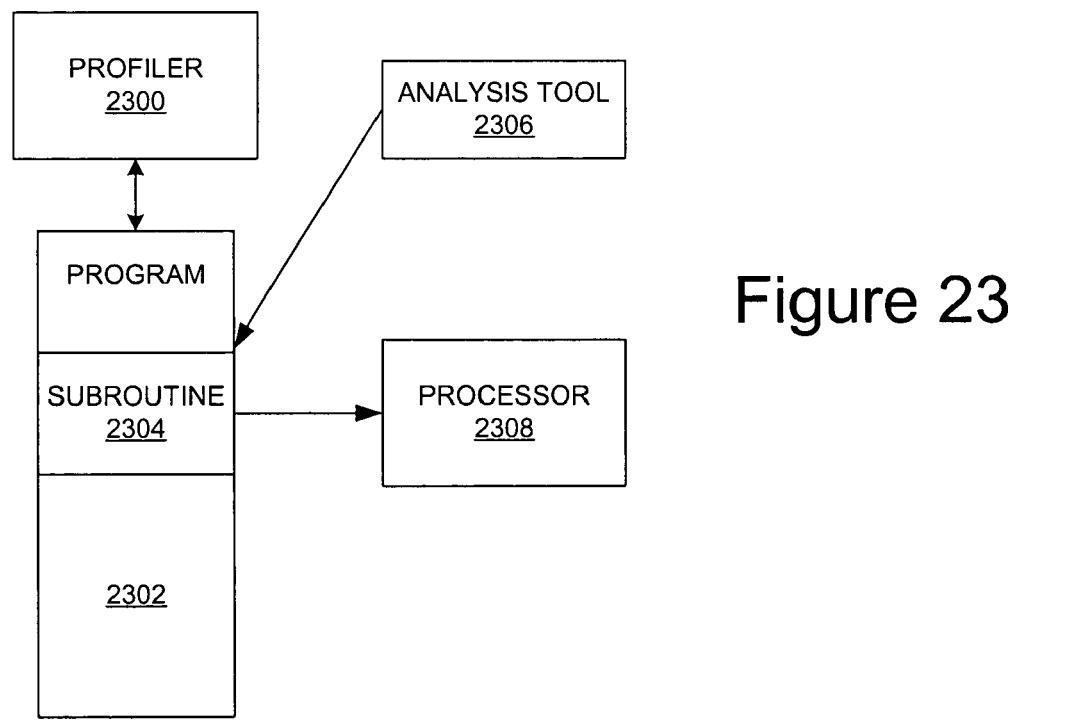
FIG. 23 is a block diagram of components used in autonomically modifying code in a program to allow selective counting or profiling of sections of code in accordance with a preferred embodiment of the present invention.

In FIG. 23, a block diagram of components used in autonomically modifying code in a program to allow selective counting or profiling of sections of code in accordance with a preferred embodiment of the present invention. In this example, profiler 2300 is a program, such as tprof, that may be used to identify routines of high usage in a program, such as program 2302. In these examples, "tprof" is a timer profiler, which ships with the Advanced Interactive Executive (AIX) operating system from International Business Machines (IBM) Corporation. This program takes samples, which are initiated by a timer. Upon expiration of a timer, tprof identifies the instruction executed. Tprof is a CPU profiling tool that can be used for system performance analysis. The tool is an example of an analysis tool and based on the sampling technique which encompasses the following steps: interrupt the system periodically by time or performance monitor counter; determine the address of the interrupted code along with process id (pid) and thread id (tid); record a TPROF hook in the software trace buffer; and return to the interrupted code.

Alternatively, a fixed number of counts of a performance monitor counter may be used instead of a timer. This program profiles subroutines that are used to indicate where time is spent within a program. A program having usage over a certain threshold also is referred to as being "hot". By using information from profiler 2300, routines of interest, such as subroutine 2304 in program 2302 may be identified.

With this information, the instructions in subroutine 2304 may be autonomically modified by analysis tool 2306 to allow counting of the execution of subroutine 2304. Additional routines may be identified for modification by analysis tool 2306. For example, subroutine 2304 also may be identified as a routine of interest with the instructions of this routine being modified to allow counting of the execution of subroutine 2304. The modification of the code in these routines includes associating performance indicators with one or more instructions within each of these subroutines.

After the instructions in these routines have been modified by analysis tool 2306, program 2302 is then executed by processor 2308. Processor 2308 executes program 2302 and provides counts for these routines. For example, the counting of instructions executed and the number of cycles used in executing a routine may be performed by processor 2308 using the mechanisms described above.

Figure 24:
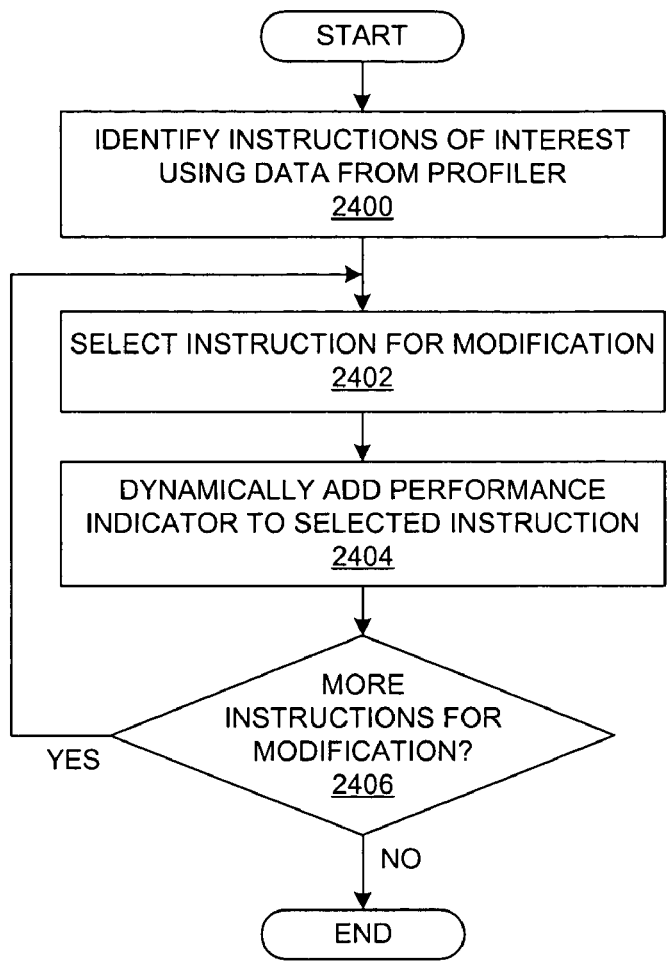
FIG. 24 is a flowchart of a process for dynamically adding or associating performance indicators to an instruction in accordance with a preferred embodiment of the present invention.

With reference to FIG. 24, a flowchart of a process for dynamically adding or associating performance indicators to an instruction is depicted in accordance with a preferred embodiment of the present invention. The process illustrated in FIG. 24 may be implemented in a program, such as analysis tool 2306 in FIG. 23. An analysis tool is a program that is used to obtain metrics about the execution of a program. These metrics may be any measurable parameter, such as execution time, routines executed, particular instructions executed, and memory locations accessed.

The process begins by identifying instructions of interest using data from a profiler (step 2400). This profiler may be, for example, a timer profiler found in AIX. An instruction from the identified instructions is selected for modification (step 2402). Thereafter, a performance indicator is dynamically added to the selected instruction (step 2404).

In step 2404, the instruction may be added in a manner such that the instructions do not need to be modified for execution. A performance instrumentation shadow memory, such as performance instrumentation shadow memory 1506 in FIG. 15, may be employed to hold the performance indicators. In this situation, a register is set in the processor to indicate that the performance instrumentation shadow memory should be checked for performance indicators when executing instructions.

A determination is then made as to whether additional identified instructions are present for modification (step 2406). If additional instructions are present for modification, the process returns to step 2402. Otherwise, the process terminates.

Figure 25:
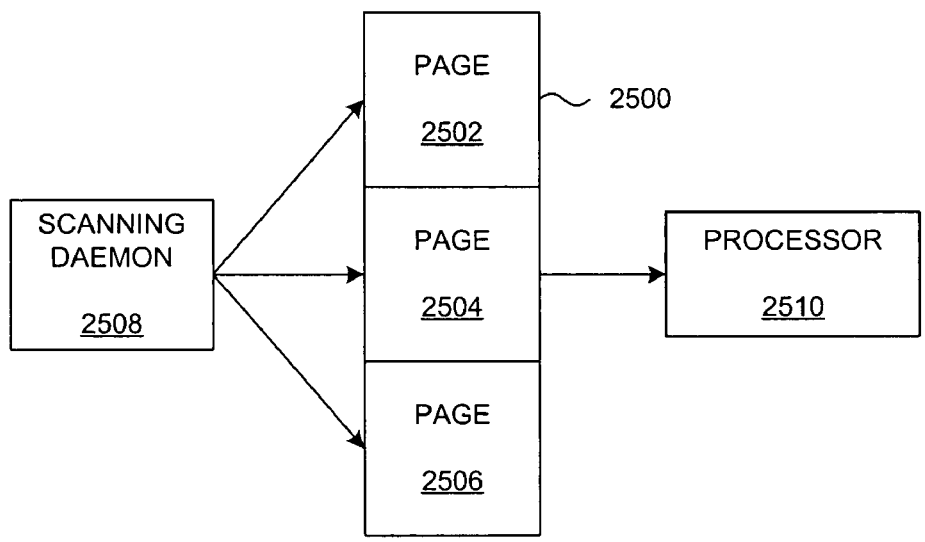
FIG. 25 is a diagram illustrating components used to scan pages through associating performance indicators with instructions in a page in accordance with a preferred embodiment of the present invention.

Turning next to FIG. 25, a diagram illustrating components used to scan pages through associating performance indicators with instructions in a page is depicted in accordance with a preferred embodiment of the present invention. The mechanism of the present invention uses performance indicators to allow instrumenting or modifying of instructions in a program one page at a time.

In this example, program 2500 contains three pages, page 2502, page 2504, and page 2506. Scanning daemon 2508 associates performance indicators with instructions in program 2500 one or more pages at a time. For example, the instructions in page 2502 may be associated with performance indicators by scanning daemon 2508. Program 2500 is then executed by processor 2510. Data from the execution of program 2500 may then be collected. This data includes, for example, counts of events occurring in response to instructions in page 2502, counting the number of times each instruction in page 2502 is executed, and/or identifying the number of visits to page 2502.

Next, scanning daemon may remove the performance indicators from instructions in page 2502 and associate performance indicators with instructions in page 2504. Program 2500 is then executed again by processor 2510, and data from execution of this program is collected. Then, instructions in page 2506 may be modified in program 2500 executed to collect data on that page.

In this manner, usages of routines typically not recorded by programs, such as a timer profiler, may be identified. A timer profiler may not record some usages of routines because interrupts may be inhibited or the timing of samples may cause synchronous non-random behavior. By modifying instructions in program 2500, counting a routine or other modules may be obtained in which the counts are unbiased and the system is unperturbed. In this manner, interrupt driven counting is avoided. Further, although the instrumenting of code is one page at a time, other groupings of instructions may be used in scanning a program, such as modules that form the program. For example, the grouping may be a single executable program, a library, a group of selected functions, and a group of selected pages.

Figure 26:
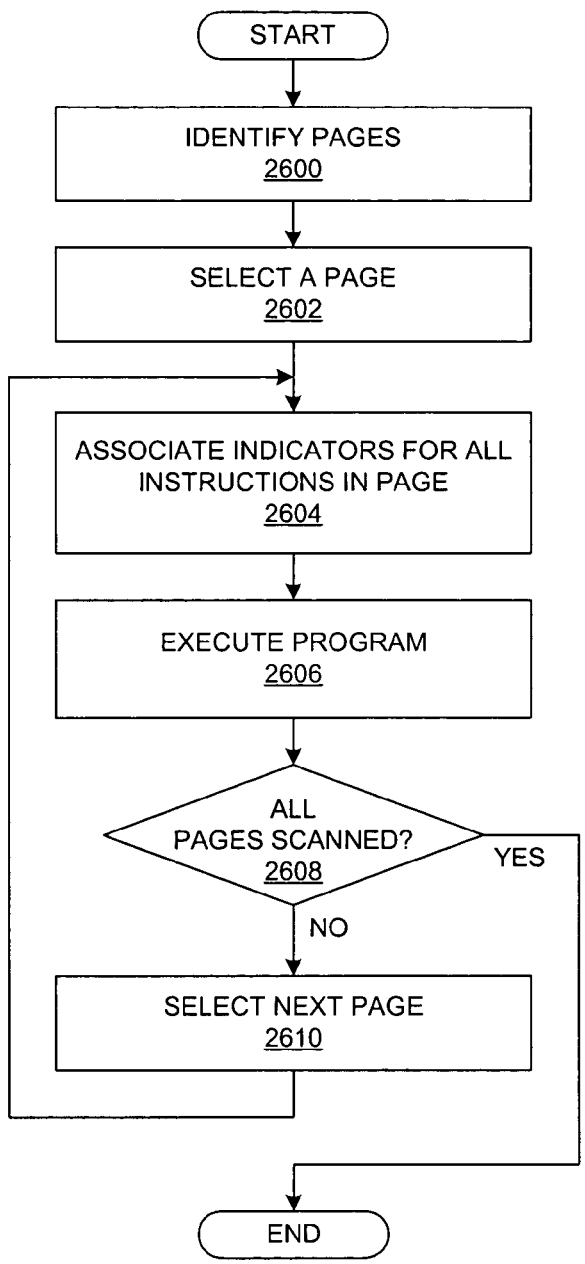
FIG. 26 is a flowchart of a process for associating indicators to instructions in a page in accordance with a preferred embodiment of the present invention.

Turning next to FIG. 26, a flowchart of a process for adding indicators to instructions in a page is depicted in accordance with a preferred embodiment of the present invention. The process illustrated in FIG. 26 may be implemented in a program, such as scanning daemon 2508 in FIG. 25.

First, a selection of pages is identified (step 2600). In this example, the pages are those in the program that are to be scanned or instrumented. Next, a page within the selection of pages is selected for modification (step 2602). Indicators are then associated with all of the instructions in the selected page (step 2604). The program is then executed (step 2606). Next, a determination is made as to whether all the pages with the selection have been scanned (step 2608). If all of the pages have been scanned, the process terminates thereafter. However, if not all pages have been scanned, the next page to be scanned is selected (step 2610), with the process returning to step 2604 as described above.

The process illustrated in FIG. 26 shows scanned groupings of instructions as pages. Depending on the particular implementation, other types of groupings of instructions, such as modules that form a program, may be scanned or instrumented in this manner.

A program is employed to identify a caller from a routine from the information found in a call stack. This program allows for an identification of what has occurred in a routine and provides a summary of what has occurred in a program by identifying function calls that have been made. This program, however, requires instructions inserted in the code to obtain this information.

The mechanism of the present invention allows for identifying calls and returns without having to perform special code instrumentation. In particular, the function of generating an interrupt on a specific set of instructions may be used to gather information about the system and applications. In these examples, instructions for calls and returns are associated with a performance indicator that generates an interrupt.

By walking back up the call stack, a complete call stack can be obtained for analysis. A "stack walk" may also be described as a "stack unwind", and the process of "walking the stack" may also be described as "unwinding the stack." Each of these terms illustrates a different metaphor for the process. The process can be described as "walking" as the process must obtain and process the stack frames step-by-step or frame-by-frame. The process may also be described as "unwinding" as the process must obtain and process the stack frames that point to one another, and these pointers and their information must be "unwound" through many pointer dereferences.

The stack unwind follows the sequence of function/method calls at the time of an interrupt and is generated in response to execution of an instruction associated with a performance indicator. A call stack is an ordered list of routines plus offsets within routines (i.e. modules, functions, methods, etc.) that have been entered during execution of a program. For example, if routine A calls routine B, and then routine B calls routine C, while the processor is executing instructions in routine C, the call stack is ABC. When control returns from routine C back to routine B, the call stack is AB. For more compact presentation and ease of interpretation within a generated report, the names of the routines are presented without any information about offsets. Offsets could be used for more detailed analysis of the execution of a program, however, offsets are not considered further herein.

Thus, during interrupt processing or at post-processing initiated by execution of an instruction associated with a particular performance indicator, the generated sample-based profile information reflects a sampling of call stacks, not just leaves of the possible call stacks, as in some program counter sampling techniques. A leaf is a node at the end of a branch, i.e. a node that has no descendants. A descendant is a child of a parent node, and a leaf is a node that has no children.

Figure 27:
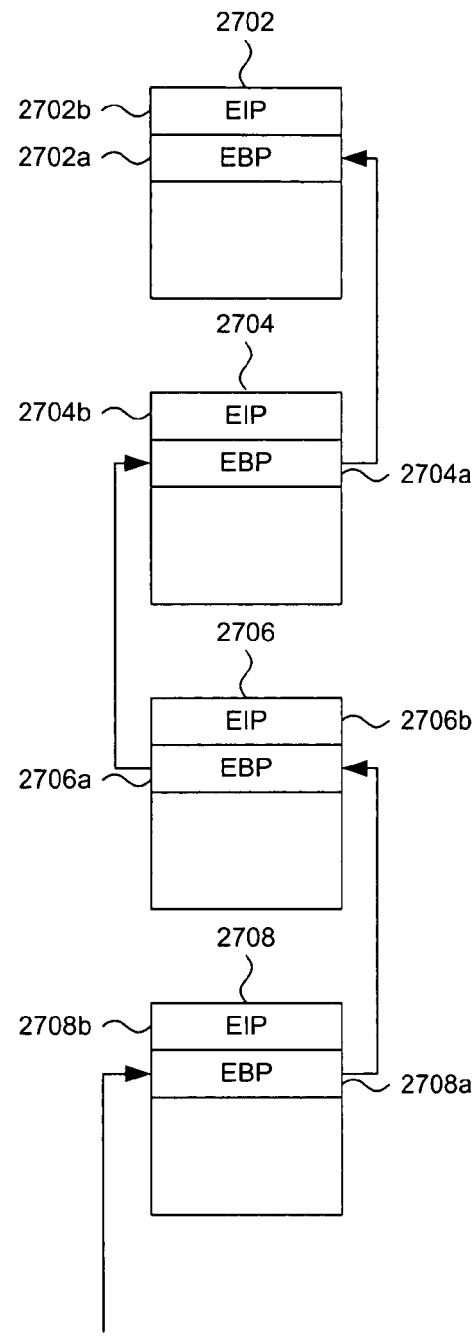
FIG. 27 is a diagram depicting call stack containing stack frames in accordance with a preferred embodiment of the present invention.

With reference now to FIG. 27, a diagram depicting call stack containing stack frames is depicted in accordance with a preferred embodiment of the present invention. A "stack" is a region of reserved memory in which a program or programs store status data, such as procedure and function call addresses, passed parameters, and sometimes local variables. A "stack frame" is a portion of a thread's stack that represents local storage (arguments, return addresses, return values, and local variables) for a single function invocation. Every active thread of execution has a portion of system memory allocated for its stack space. A thread's stack consists of sequences of stack frames. The set of frames on a thread's stack represent the state of execution of that thread at any time. Since stack frames are typically interlinked (e.g., each stack frame points to the previous stack frame), it is often possible to trace back up the sequence of stack frames and develop the "call stack". A call stack represents all not-yet-completed function calls—in other words, it reflects the function invocation sequence at any point in time.

Call stack 2700 includes information identifying the routine that is currently running, the routine that invoked it, and so on, all the way up to the main program. Call stack 2700 includes a number of stack frames 2702, 2704, 2706, and 2708. In the depicted example, stack frame 2702 is at the top of call stack 2700, while stack frame 2708 is located at the bottom of call stack 2700. The top of the call stack is also referred to as the "root". The interrupt (found in most operating systems) is modified to obtain the program counter value (pcv) of the interrupted thread, together with the pointer to the currently active stack frame for that thread. In the Intel architecture, this is typically represented by the contents of registers: EIP (program counter) and EBP (pointer to stack frame).

By accessing the currently active stack frame, it is possible to take advantage of the (typical) stack frame linkage convention in order to chain all of the frames together. Part of the standard linkage convention also dictates that the function return address be placed just above the invoked-function's stack frame; this can be used to ascertain the address for the invoked function. While this discussion employs an Intel-based architecture, this example is not a restriction. Most architectures employ linkage conventions that can be similarly navigated by a modified profiling interrupt handler.

When an interrupt occurs, the first parameter acquired is the program counter value. The next value is the pointer to the top of the current stack frame for the interrupted thread. In the depicted example, this value would point to EBP 2708a in stack frame 2708. In turn, EBP 2708 points to EBP 2706a in stack frame 2706, which in turn points to EBP 2704a in stack frame 2704. In turn, this EBP points to EBP 2702a in stack frame 2702. Within stack frames 2702–2708 are EIPs 2702b–2708b, which identify the calling routine's return address. The routines may be identified from these addresses. Thus, routines are defined by collecting all of the return addresses by walking up or backwards through the stack.

Obtaining a complete call stack may be difficult in some circumstances, because the environment may make tracing difficult, such as when an application having one call stack makes a call to a kernel having a different call stack. The hardware support provided by the mechanism of the present invention avoids some of these problems.

Figure 28:
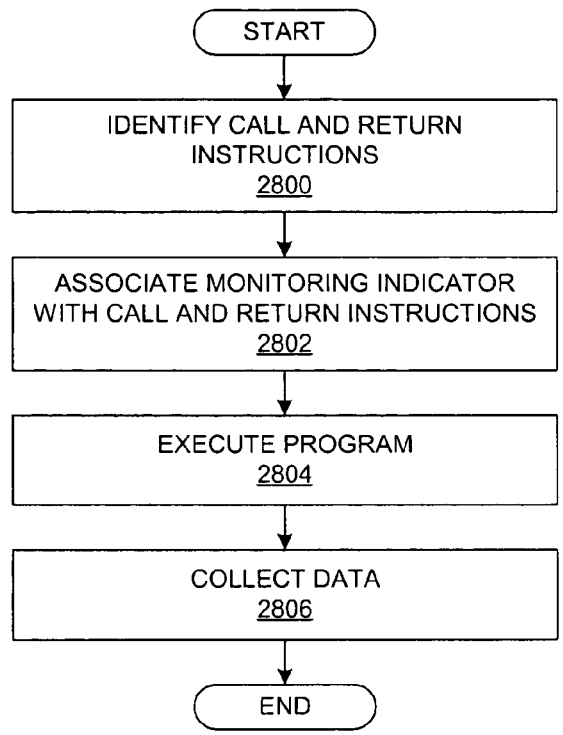
FIG. 28 is a flowchart of a process for identifying events associated with call and return instructions in which data is collected from a performance monitor unit in accordance with a preferred embodiment of the present invention.

Turning next to FIG. 28, a flowchart of a process for identifying events associated with call and return instructions in which data is collected from a performance monitor unit is depicted in accordance with a preferred embodiment of the present invention. The process illustrated in FIG. 28 may also be implemented for an analysis tool, such as analysis tool 2216 in FIG. 22.

The process begins by identifying call and return instructions (step 2800). The instructions for calls and returns are ones of interest for determining when a routine has been called and when a routine completes. This may be accomplished for interrupts, interrupt returns, system calls, and returns from system calls.

Next, performance indicators are associated with the identified call and return instructions (step 2802). The program is then executed (step 2804), and data is collected from the performance monitor unit (step 2806) with the process terminating thereafter. This information may be collected through interfaces, such as hardware interface 2212 illustrated in FIG. 22 in which APIs are employed to obtain data collected by the different functional units in a processor.

With this data, identifications of callers of routines may be made. This information may be used to generate data structures, such as trees to track and present information regarding the execution of the program. This generation of data structures may be implemented using processes similar to those provided in analysis tools.

Figure 29:
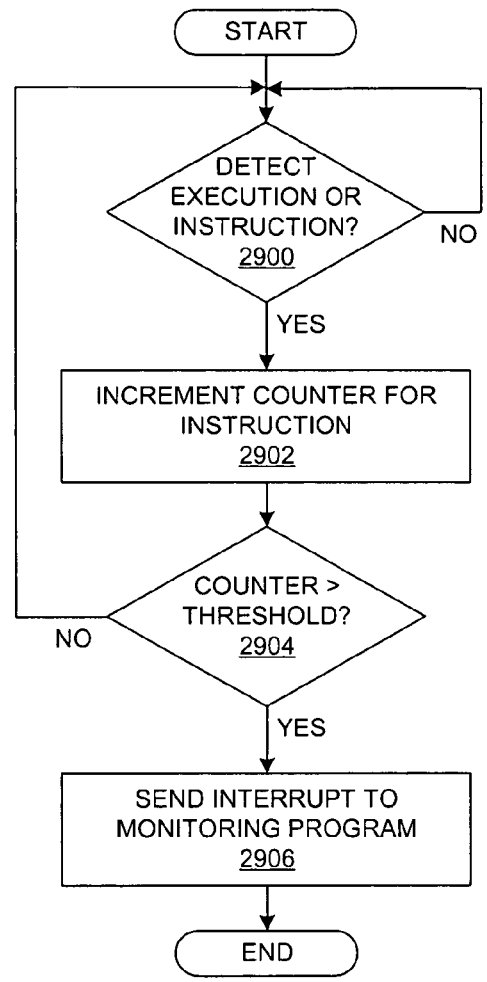
FIG. 29 is a flowchart of a process for identifying instructions that have been executed more than a selected number of times in accordance with a preferred embodiment of the present invention.

Turning next to FIG. 29, a flowchart of a process for identifying routines that have been executed more than a selected number of times is depicted in accordance with a preferred embodiment of the present invention. The process illustrated in FIG. 29 may be implemented in a functional unit within a processor, such as instruction cache 214 in FIG. 2. This process is used to identify counts of instructions that are executed and to generate an interrupt when these instructions have occurred more than some selected number of times.

First, a determination is made as to whether an execution of a selected instruction is detected (step 2900). This determination is made by examining each instruction that is executed to see whether a performance indicator is associated with the instruction. These performance indicators may be associated with the instructions through different tools, such as compiler 1500 in FIG. 15 or analysis tool 2216 in FIG. 22.

If execution of an instruction containing a performance indicator is not identified, the process returns to step 2900 until a selected instruction is detected. If a selected instruction is identified as being executed, a counter with a set threshold is incremented for that selected instruction to count how often that particular instruction is executed (step 2902). In these examples, each instruction identified for monitoring is assigned a counter.

Next, a determination is made as to whether the set threshold has been reached (step 2904). Threshold values are initially determined by using documented cache miss times, for each of the cache levels. However, increasing times are used to determine problems caused by cache interventions (accesses from other processors). Repeated runs with different values may be made to identify the areas with the worst performance.

In these examples, the instruction may be associated with an indicator that includes an indication that execution of the instruction is to be monitored as well as providing a counter. Further, count criteria may be included to identify when an interrupt is to be generated. For example, an interrupt may be generated when the instruction has been executed more than thirteen times.

If the threshold has not been reached, the process returns to step 2900 as described above. If the set threshold has been reached, an interrupt is sent to the monitoring program (step 2906) with the process terminating thereafter. This interrupt may be sent to an interrupt unit, such as interrupt unit 250 in FIG. 2, which passes control to the appropriate procedure or process to handle the interrupt.

This process may be especially useful for routines with many branches. In this case, all branch instructions would be flagged for counting. Information derived by this type of counting may be useful for identifying improvements for compiler and just-in-time (JIT) code generation by minimizing branches or adjusting hint flags, supported in the instruction architecture of the processor that is used.

Figure 30:
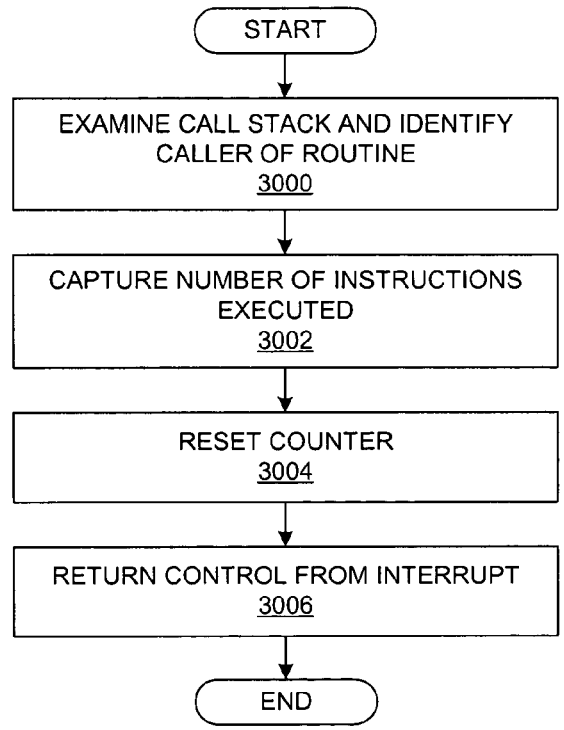
FIG. 30 is a flowchart of a process for examining a call stack and identifying a caller of a routine when a particular instruction is executed more than some selected number of times in accordance with a preferred embodiment of the present invention.

Turning next to FIG. 30, a flowchart of a process for examining a call stack and identifying a caller of a routine when a particular instruction is executed more than some selected number of times is depicted in accordance with a preferred embodiment of the present invention. The process illustrated in FIG. 7 may be initiated by an interrupt unit, such as interrupt unit 250 in FIG. 2. This process is used to identify a call in a routine and may be used to recursively obtain information for callers.

First, a call stack is examined and the caller of a routine is identified (step 3000). Next, a count of the number of instructions executed is captured from the instruction cache (step 3002). The count is for a counter used in step 2902 in FIG. 29. The counter is then reset (step 3004) with control thereafter returned from the interrupt (step 3006). The information obtained in the process in FIG. 30 may be used to identify additional routines for monitoring to recursively identify callers of routines.

Figure 31:
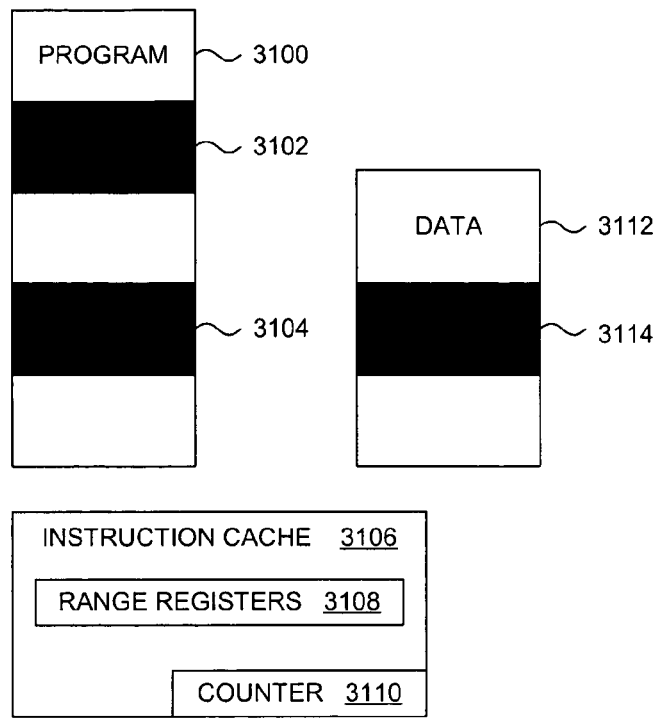
FIG. 31 is a diagram illustrating ranges of instructions and data that has been selected for monitoring in accordance with a preferred embodiment of the present invention.

Turning next to FIG. 31, a diagram illustrating ranges of instructions and data that has been selected for monitoring is depicted in accordance with a preferred embodiment of the present invention. In this example, program 3100 includes instruction range 3102 and 3104. Each of these ranges has been identified as ones of interest for monitoring. Each of these ranges is set within an instruction unit, such as instruction cache 214 in FIG. 2. Each range is used to tell the processor the number of instructions executed in a range, as well as the number of times a range is entered during execution of program 3100.

Instruction cache 3106 uses range registers 3108 to define instruction ranges. These registers may be existing registers or instruction cache 3106 may be modified to include registers to define instruction ranges. These ranges may be based on addresses of instructions. Additionally, range registers 3108 may be updated by various debugger programs and performance tools.

If an instruction is executed in a range, such as instruction range 3102 or instruction range 3104, a counter is incremented in instruction cache 3106. Alternatively, the instruction may be sent to a performance monitor unit, such as performance monitor unit 240 in FIG. 2. The performance monitor unit tracks the count of the number of instructions executed within the range and the number of times the instruction range is entered in these examples.

Data accesses may be monitored in a similar fashion. For example, data 3112 includes data range 3114. Data accesses to data range 3114 may be counted in a similar fashion to execution of instructions within instruction range 3102 or instruction range 3104. These ranges may be defined in registers within a data unit, such as data cache 216 in FIG. 2. These ranges for data may be defined in the register as a range of memory locations for the data.

Figure 32:
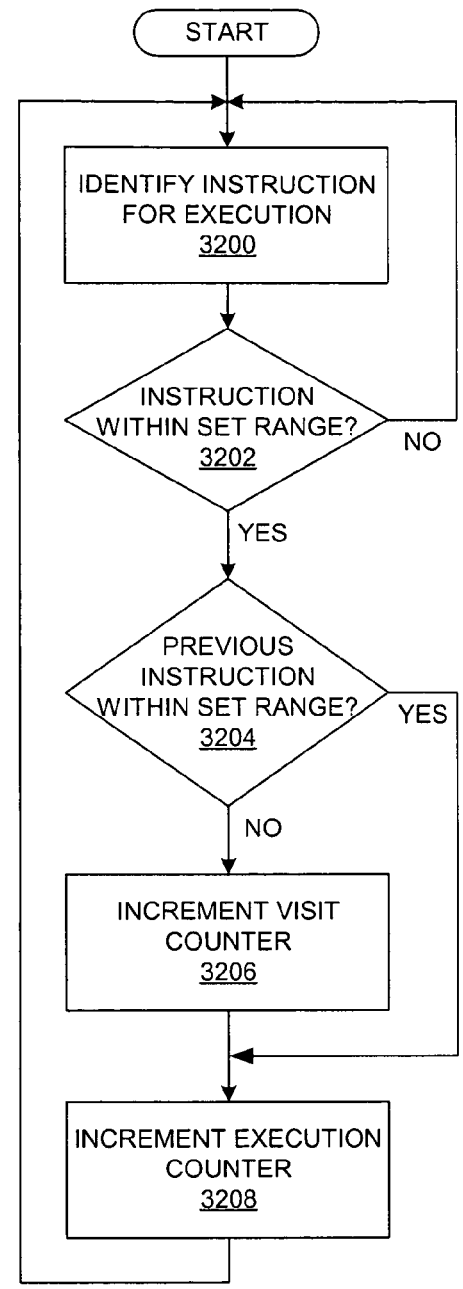
FIG. 32 is a flowchart of a process for counting the number of visits to a set range as well as the number of instructions executed within a set range in accordance with a preferred embodiment of the present invention.

Turning next to FIG. 32, a flowchart of a process for counting the number of visits to a set range as well as the number of instructions executed within a set range is depicted in accordance with a preferred embodiment of the present invention. The process illustrated in FIG. 32 may be implemented in an instruction unit, such as instruction cache 214 in FIG. 2.

First, an instruction is identified for execution (step 3200). Next, a determination is made as to whether the instruction is within a set range of instructions (step 3202). The range may be identified by examining registers defining one or more instruction ranges. If the instruction is not within a set range of instructions, the process returns to step 3200 as described above. If the instruction is within a set range of instructions, a determination is made as to whether the previous instruction was within the set range of instructions (step 3204). If the previous instruction was not within the set range of instructions, a visit counter is incremented to tell the processor how many times the instruction range is entered (step 3206). Additionally, an execution counter is incremented to count the number of instructions executed within the set range of instructions (step 3208) with the process returning to step 3200 thereafter.

With reference again to step 3204, if the previous instruction was within the set range of instructions, the process proceeds to step 3208 as described above.

A similar process to the one illustrated in FIG. 32 may be implemented for access to data. In this case, the process would typically be implemented in a data unit, rather than in an instruction unit.

The previous figures have primarily illustrated various ways in which performance indicators may be implemented to enable the counting of events within a processor when instructions that are associated with the performance indicators are executed or when data accesses that are associated with performance indicators are made. It would be particularly advantageous to employ this real-time performance information at the application-level because it is often difficult to acquire accurate production runtime models for the workloads that are experienced by a particular piece of software. Typically, a software developer tunes an application for an expected workload and then reconfigures the application as its computational environment changes.

For example, a software module may contain a cache. A common tuning exercise is to determine the amount of memory to allocate to the cache. Making the cache too large may take memory from other data structures, thereby inhibiting their ability to perform their tasks. On the other hand, making the cache too small may render the cache ineffective, thereby degrading overall performance by imposing cache maintenance overhead and then evicting cached elements before they are used due to space limitations. Many applications are quite sensitive to their cache efficiency because a cache hit is many times faster than a cache miss. Using the performance indicators as described above, an application can obtain information that enables it to monitor its own state and then dynamically adjust its behavior in real-time based upon runtime experience. Because the overhead of the performance monitor counters is so low, an application would be able to take advantage of a full spectrum of tracing and sampling tools, which themselves may be adjusted by the application as execution progresses.

Figure 47:
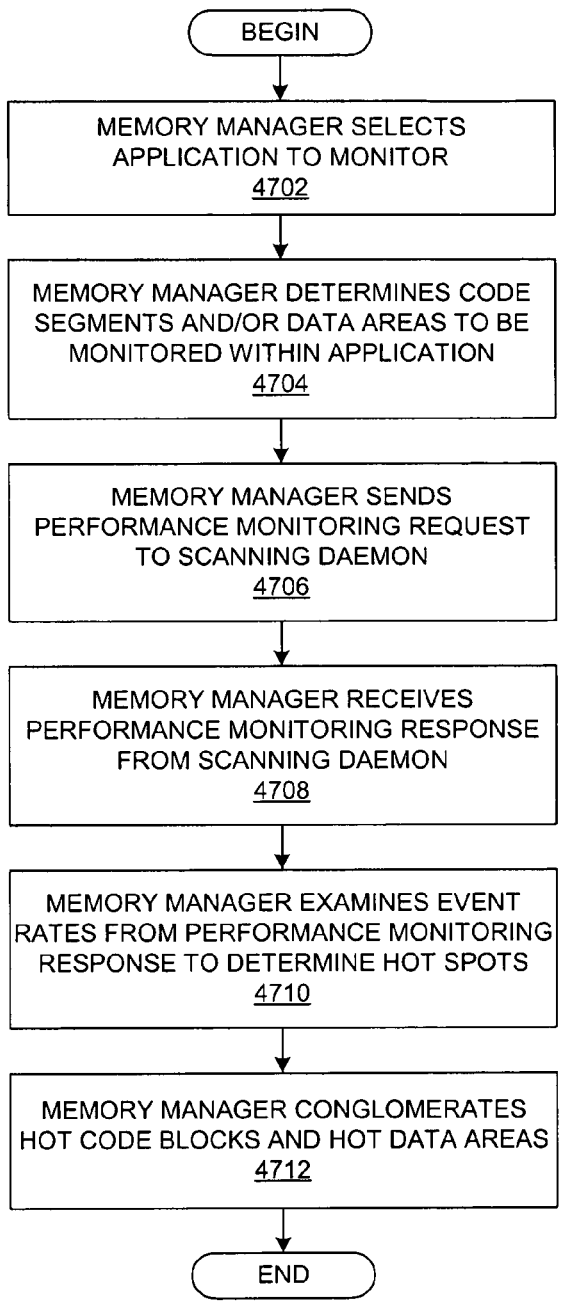
FIG. 47 depicts a flowchart that shows a process by which a memory manager determines hot spots using performance indicators in accordance with an embodiment of the present invention.
Figure 48:
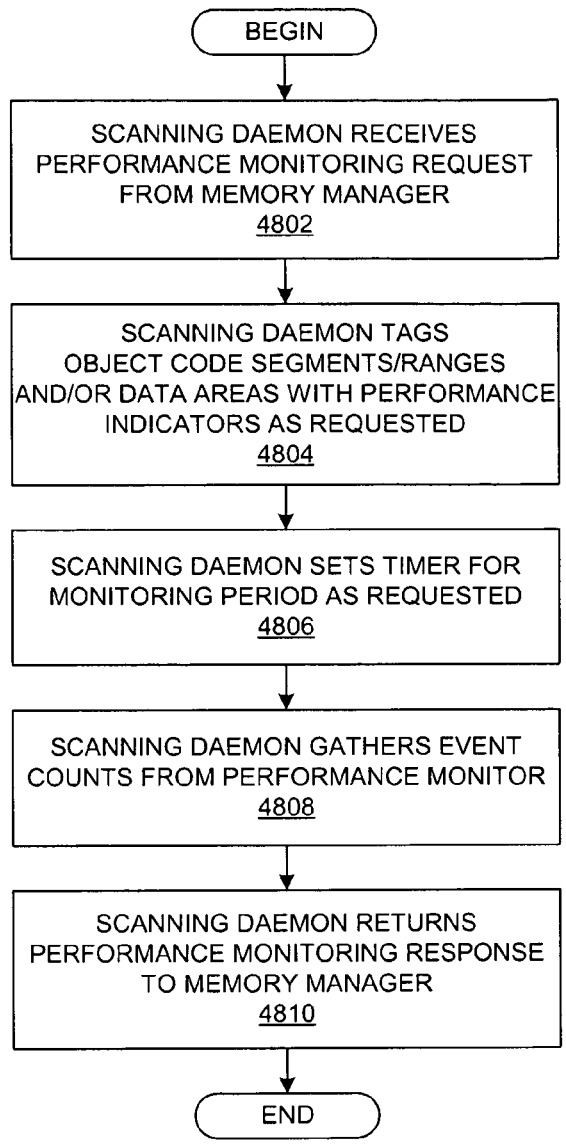
FIG. 48 depicts a flowchart that shows a process by which a scanning daemon assists in the determination of hot spots within an application by placing performance indicators at particular locations as requested by a memory manager.
Figure 49:
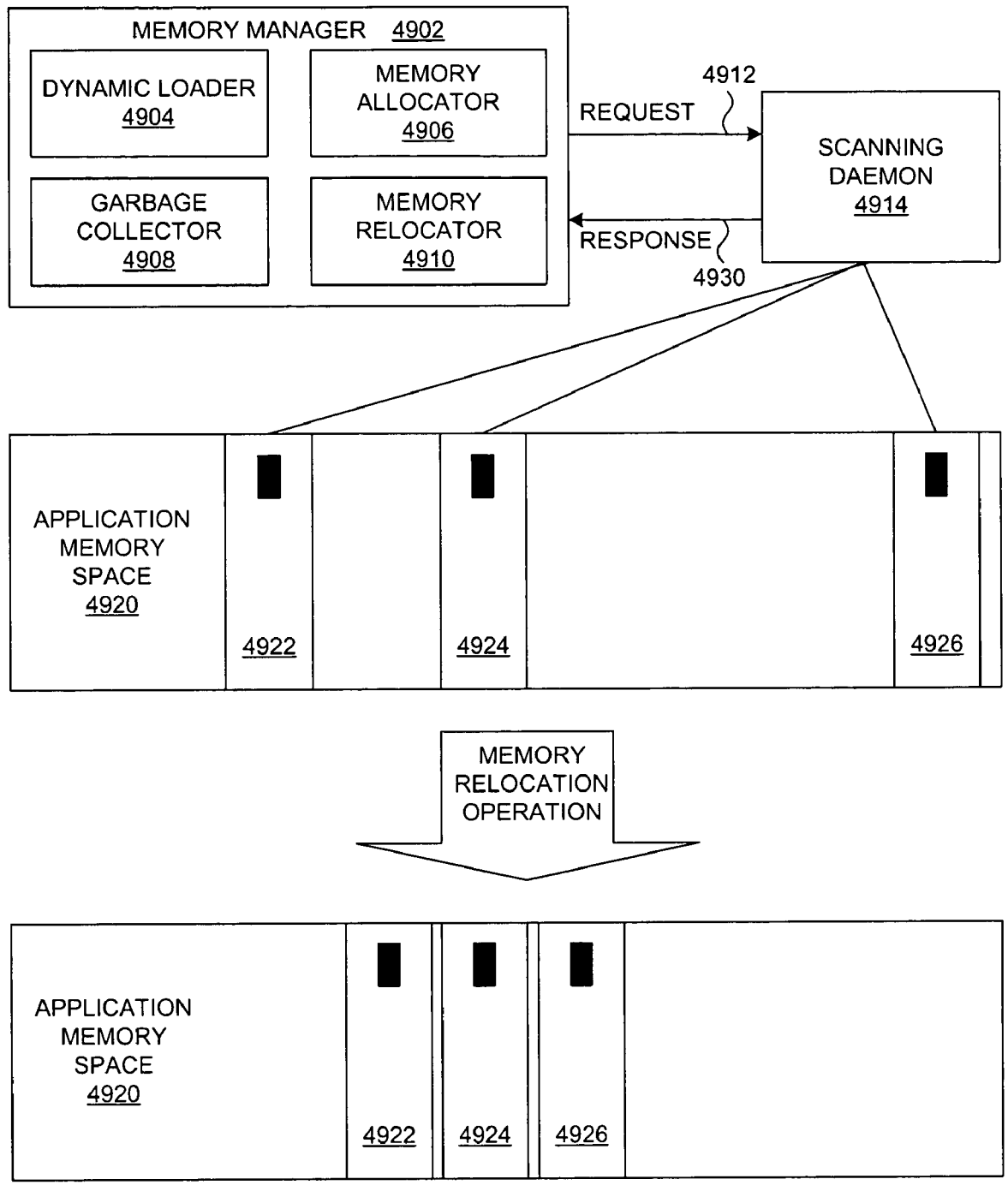
FIG. 49 depicts a block diagram that shows the modification of an application through memory relocation during runtime in accordance with information that has been gathered through the use of performance indicators.

The remaining figures primarily illustrate various ways in which these performance indicators may be used to dynamically gather performance information from the hardware such that the performance information is then available during runtime at the software level. Moreover, the performance information may be made available to the application whose performance is being monitored. In this manner, the software can autonomically change its behavior, particularly to enhance its performance. FIGS. 33–41 are figures that are directed to autonomic execution-path selection. FIGS. 42–46 are figures that are directed to collecting statistical information about the ability of a software application to successfully acquire a semaphore. FIGS. 47–49 are figures that are directed to improving the performance of the execution of an application by relocating code segments and data areas.

Figure 33:
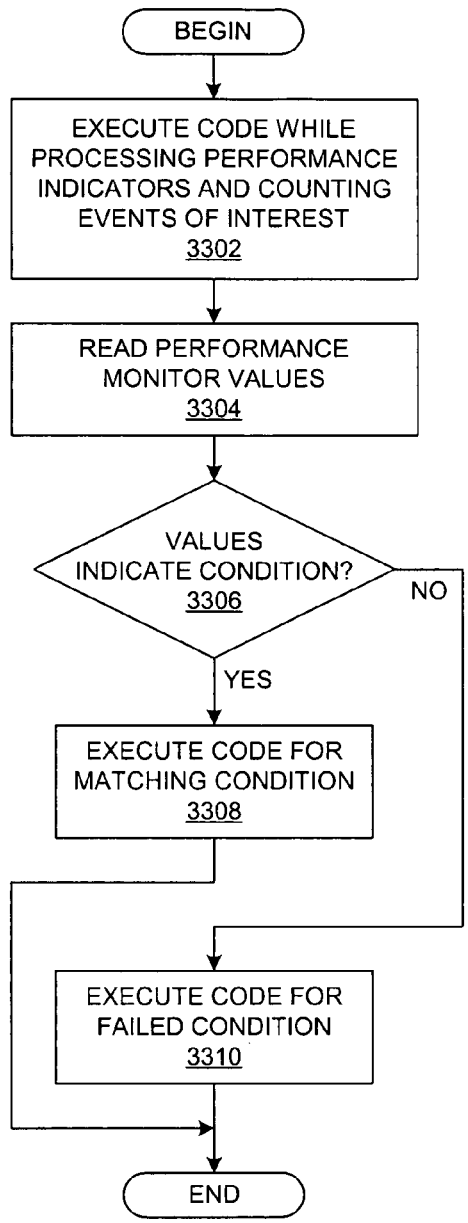
FIG. 33 depicts a flowchart that shows a process by which an execution path within software is autonomically selected based on the detection of hardware events, wherein the events have been enabled through performance indicators as described above.

With reference now to FIG. 33, a flowchart depicts a process by which an execution path within software is autonomically selected based on the detection of hardware events, wherein the events have been enabled through performance indicators as described above. The process begins with the execution of instructions within software code, wherein the instructions are associated with performance indicators, and/or wherein the instructions access data areas that have been associated with performance indicators (step 3302). At some point in time, the performance monitor within the CPU of a data processing system may have counted one or more events, and the software obtains or reads the event counts from the appropriate registers within the performance monitor (step 3304). A determination is then made as to whether the value or values from the performance monitor counters satisfy a predetermined condition (3306). If so, then the data processing system executes a set of instructions that have been associated with a positive determination of the condition (step 3308), and the process is concluded. If the value or values from the performance monitor counters do not satisfy a predetermined condition, then the data processing system executes a set of instructions that have been associated with a negative determination of the condition (step 3310), and the process is concluded.

Figure 34:
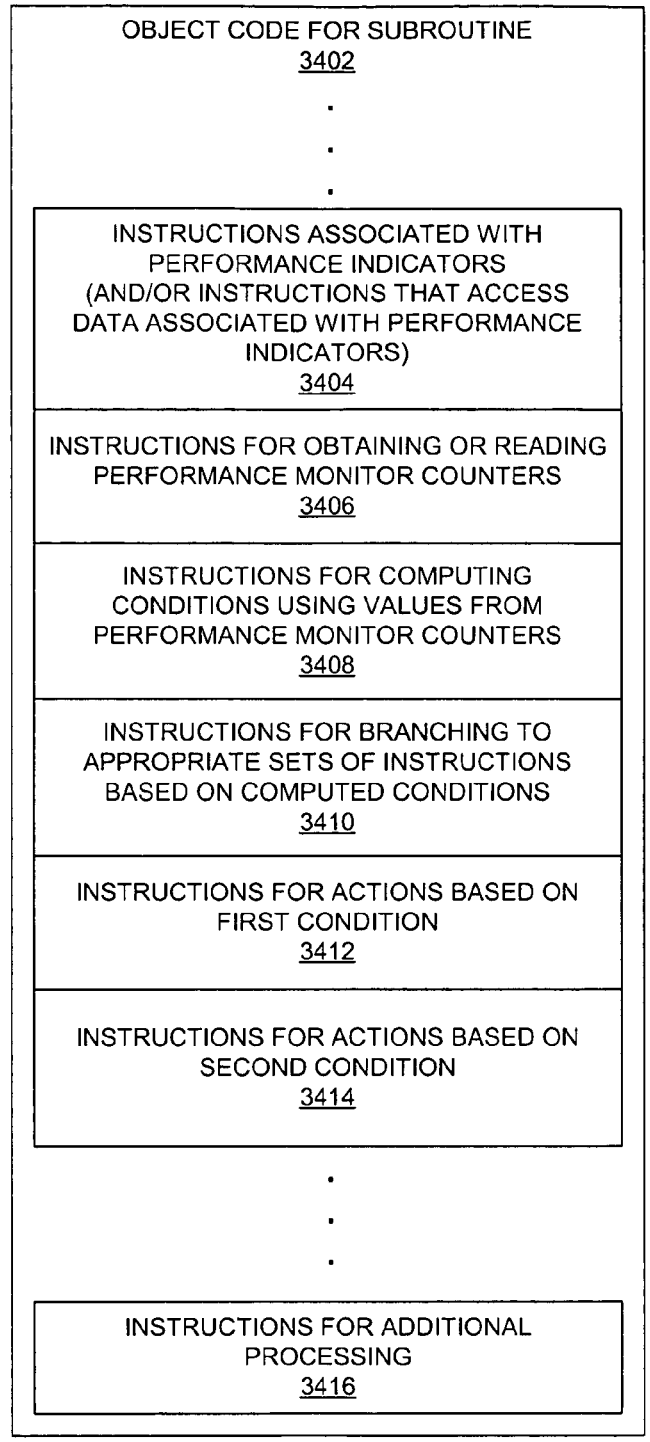
FIG. 34 depicts a block diagram that shows a representation of object code for a subroutine that implements a process, such as that shown in FIG. 33, by which an execution path within software is autonomically selected based on the detection of hardware events, wherein the events have been enabled through performance indicators as described above.

With reference now to FIG. 34, a block diagram depicts a representation of object code for a subroutine that implements a process, such as that shown in FIG. 33, by which an execution path within software is autonomically selected based on the detection of hardware events, wherein the events have been enabled through performance indicators as described above. Object code block 3402 is a representation of object code for a particular subroutine; the object code would have been generated by compiling the source code for the subroutine. The blocks that are shown within FIG. 34 may represent memory areas that have been loaded with the object code for a particular subroutine.

Object code block 3404 contains instructions that are associated with performance indicators and/or instructions that access data areas that are associated with performance indicators. The execution of the instructions in object code block 3404 performs one or more actions that correspond to step 3302 in FIG. 33; these instructions are similar to instructions that are described with respect to various implementations of performance indicators as explained above with respect to FIGS. 3–32, e.g., instructions 602 as shown in FIG. 6A, or instructions that would access marked data, such as data 612 as shown in FIG. 6B.

Object code block 3406 contains instructions that obtain or read values from performance monitor registers that have been configured to count events in accordance with the performance indicators that are associated with object code block 3404 or related marked data. The execution of the instructions in object code block 3406 performs one or more actions that correspond to step 3304 in FIG. 33; these instructions are similar to instructions that are described with respect to hardware interface 2212 in FIG. 22, which may be implemented as a software application programming interface. For example, the API for reading counters within a performance monitor of a CPU may include privileged instructions, i.e., instructions that may only be executed by a process that has been designated as privileged by the operating system; in that case, object code block 3406 may include a system call to a subroutine that returns the values from the performance monitor registers.

Object code block 3408 contains instructions that determine whether the event counts that have been retrieved from the performance monitor satisfy logical conditions. The execution of the instructions in object code block 3408 performs one or more actions that correspond to step 3306 in FIG. 33. The logical conditions that are checked by these instructions may be "hard-coded" into the logic of the original source code, or the logical conditions may be configurable. One exemplary logical condition may be a comparison between the values in two different performance monitor counters; another exemplary logical condition may be a comparison between a value from a performance monitor counter and a pre-determined value that has been retrieved from a configuration file. The logical condition or conditions may comprise multiple counters and other variables in a variety of Boolean expressions.

After the conditional expressions are evaluated, object code block 3410 contains instructions for executional branching to other sets of instructions based on the outcomes of those evaluations. For example, object code block 3412 contains instructions that are to be executed when a first condition is satisfied; the execution of the instructions in object code block 3412 performs one or more actions that correspond to step 3308 in FIG. 33. Object code block 3414 contains instructions that are to be executed when a second condition is satisfied; the execution of the instructions in object code block 3414 performs one or more actions that correspond to step 3310 in FIG. 33. After a conditional block of instructions has been executed, the control flow causes additional sets of instructions to be executed, such as those represented by object code block 3416.

With reference now to FIG. 35, a diagram represents a set of pseudocode statements that autonomically alter the behavior of a software application through the use of the performance indicators that have previously been described. The set of pseudocode statements that are shown in FIG. 35 perform a process that is analogous to the process that is illustrated in FIG. 33. From a different perspective, FIG. 35 depicts a specific example of pseudocode statements that would be similar to source code statements in a particular programming language that could be compiled into object code that is analogous to the object code that is illustrated in FIG. 34.

Statement 3502 declares a definition of a subroutine. Statement 3504 obtains data from an input datastream and places the data items from the datastream into a data structure while counting the number of data items that have been inputted. At some point in time, object code for statement 3504 would have been generated to include instructions, wherein those instructions (or the data areas that are accessed by those instructions) have been associated with performance indicators; the performance indicators may have been generated statically by a compiler, e.g., as described above with respect to FIG. 15, or the performance indicators may have been generated dynamically, e.g., as described above with respect to FIG. 24. In this example, immediately preceding and including the subroutine call in statement 3504, the instructions would be associated with performance indicators such that the performance monitor should count the number of data cache hits and data cache misses that are generated.

Statement 3506 calls a function within an API to read values from two counters within the performance monitor. It may be assumed that variable names 3508 and 3510 are constant values that are resolved by the compiler to values or appropriate indicators that identify the counters/registers within the performance monitor from which the requested values are to be retrieved; the retrieved values are then returned to the calling subroutine via the other subroutine arguments, i.e., variables 3512 and 3514.

Statement 3516 is an if-then type of statement that evaluates a logical expression and then causes the execution control to pass through the statement or to flow around the statement, depending upon whether the outcome of the evaluation is a logical true value or a logical false value. In this example, if the logical expression is true, i.e., the counted number of cache misses is greater than the counted number of cache hits, then statement 3518 calls a subroutine that will modify the data structure. Constant value 3520 indicates that the subroutine is merely to adjust or to tweak the data structure in some programmatic manner to make the use of the data structure slightly more efficient in an effort to reduce the number of cache misses that are generated while using the data structure, which would depend upon the particular data structure and other factors in the computational environment.

Statement 3522 is a continuation of the if-then type of statement. If the logical expression is true, which in this case means that the counted number of cache misses is greater than some number that is the product of a constant and the number of data items that were stored into the data structure, then statement 3524 calls a subroutine that will modify the data structure. Constant value 3526 indicates that the subroutine should rebuild the data structure in some programmatic manner. It may be assumed that the subroutine acts to modify the configuration of the data structure in which the newly added data items were stored in order to greatly reduce the number of cache misses. After the data structure has been modified in some manner, statement 3528 then calls a subroutine that will sort the new data items in the data structure in some manner.

In this example, the data structure might be a hybrid of two different types of common data structures. Each of the two parts of the data structure may be used to obtain the advantages of their different characteristics. The data structure may be frequently searched for information about the data items, but the data items may be removed at any time. For example, data items that have been newly added might be much more likely to be removed; hence, it may not be efficient to store the newly added data items in a sorted, semi-permanent manner with the other data items that have been present within the data structure for a relatively long period of time. In order to handle the data items in an efficient manner, one part of the data structure may store data items that have been present within the data structure for a relatively long period of time, and another part of the data structure may store data items that have been newly added to the data structure and might be deleted relatively quickly. The call to the subroutine in statement 3524 to rebuild the data structure may be an operation that restructures the part of the data structure that contains the newly added data items.

The example in FIG. 35 illustrates the advantages of using autonomic execution-path selection based on hardware event counts that are gathered by a performance monitor in accordance with performance indicators that are associated with instructions and/or data areas. When a software developer is attempting to implement a data structure similar to that described with respect to FIG. 35 within a typical software application, the software developer would need to embed logic within the software application such that the logic monitors some selected characteristics of the data structure. The software developer would typically make an estimation as to when to rebuild the portion of the data structure with the newly added data items; the estimation would probably depend on the number of newly added data items, e.g., when the number of newly added data items reaches a certain threshold.

However, the selected characteristics might not be substantially related to the efficiency of the use of the data structure. If the chosen threshold is too small, then the data structure might be rebuilt too often, yet if the chosen threshold is too high, the data structure might not be rebuilt often enough. In other words, for this second case, if too many data items are added to the data structure before it is rebuilt or restructured, then the data structure might grow so large that the cache is not used efficiently, thereby incurring many cache misses when the data structure is used.

In contrast, using the embodiments of the present invention that are illustrated in FIGS. 33–35, a software developer can shift decisions from manual configuration of an application by an application's administrator to dynamic decisions that are made by the application itself. An application can use knowledge about itself to affect its behavior. The application can obtain real-time information about the performance of the software application within the low-level hardware, and the software application can dynamically change its behavior based on this real-time performance information. Moreover, this real-time performance information can be gathered at a very fine granularity, e.g., within a single subroutine, over the span of a few source code statements, or simply based on hardware events that are detected during the execution of a single instruction. Furthermore, the gathering of this information does not necessarily require any intrusive instrumentation, particularly interrupts or jumps to instrumentation modules which would affect the real-time performance information that is being gathered.

In the description of FIG. 35 above, it was mentioned that object code for statement 3504 would have been generated to include instructions, wherein those instructions (or the data areas that are accessed by those instructions) have been associated with performance indicators; the performance indicators may have been generated statically by a compiler, e.g., as described above with respect to FIG. 15. However, it would be particularly advantageous to provide a software developer with the ability to control the generation of performance indicators from within the source code of an application.

Referring again to the pseudocode in FIG. 35, compiler directive 3530 instructs the compiler to generate code to configure the performance monitor to begin counting events from the relative point in the object code at which the compiler directive appears in the source code. In this example, when a compiler identifies the compiler directive, the compiler would associate the appropriate performance indicators with the immediately following instructions, i.e., the next set of instructions that the compiler would generate, whichever instructions are appropriate for the particular circumstance. The execution of the instructions along with the processing of the performance indicators would configure the performance monitor to start counting events, which in this case includes hardware data cache miss events and hardware data cache hit events.

Compiler directive 3530 is merely an example of a possible format for allowing a software developer to embed information into the source code of an application such that a compiler generates the appropriate object code that includes the performance indicators that are being requested by the software developer. In the example that is shown in FIG. 35, compiler directive 3530 uses the same constant values 3508 and 3510; these can be resolved by the compiler to identify the types of events that the software developer is requesting to be counted. The compiler may generate inline assembly language statements in support of the processing of the compiler directives.

The performance monitor would continue to count events until it was configured to do otherwise, e.g., by the processing of performance indicators that are associated with instructions that are executed at some later point in time that configure the performance monitor to stop counting those events. In other words, in the example that is shown in FIG. 35, the performance indicators are able to configure the performance monitor to count events in a manner like a toggle switch, e.g., a single performance indicator is able to turn on the counting of events rather than requiring a performance indicator to be associated with each and every instruction to count an event associated with the execution of that instruction. In the example shown in FIG. 35, the pseudocode statements do not include a subsequent compiler directive to stop the counting of cache misses and cache hits. However, after the events of interest have been counted and those count values have been used at statements 3516 and 3522, there is no adverse impact in allowing the counting of the events to continue.

With reference now to FIG. 36, a diagram represents a set of pseudocode statements that autonomically alter the behavior of a software application through the use of performance indicators that are generated in accordance with compiler directives that are placed into the source code of the software application. FIG. 36 is similar to FIG. 35; statements 3602, 3604, 3606, and 3608 are similar to statements 3504, 3518, 3524, and 3528, respectively, and compiler directive 3610 is similar to compiler directive 3530. Compiler directive 3610 would cause the generation of appropriate performance indicators to be associated with subsequent instructions or data areas. Compiler directives 3614 and 3616 would cause the generation of appropriate instructions for obtaining and comparing event counts as necessary for the requested logic.

FIG. 36 differs from FIG. 35 in that compiler directives 3612, 3614, and 3616 include some characteristics of source code logic. In FIG. 35, the source code statements explicitly recite the manner in which the performance monitor counter values should be retrieved and used; the manner in which the performance monitor is employed becomes embedded or hard-coded in the source code logic. In FIG. 36, via compiler directives, the source code file indicates the hardware events that are of interest to the software application and the manner in which the software application needs to use the counts that are gathered for those hardware events. Rather than embedding logic for the performance information gathering operations within the source code logic, the compiler directives allow a software developer to indicate to the compiler which operations are desired by the software developer, and the compiler then has the responsibility for generating the appropriate object code for those desired operations. In other words, the compiler directives allow the source code file to contain additional information about the performance information gathering operations without embedding the logic for those operations within the source code statements. In this manner, the software developer is not required to know the details about the manner in which the performance information gathering operations are controlled. Since every compiler generates code that is directed to a specific class of CPU, the compiler would also be configured to generate the instructions for the performance information gathering operations that are appropriate for the intended class of CPU; the generation of this code may include accessing the appropriate software library or modules that provide an API to the performance monitor.

For the above-noted embodiment, compiler directives are necessary because the source code language does not include support for performance information gathering operations; compiler directives are external to the source code language, yet compiler directives assist a compiler in generating object code from source code statements. In an alternative embodiment, the source code language may be extended to provide support for performance information gathering operations, e.g., by including reserved words similar to other reserved words in the source code language.

FIG. 36 illustrates that a software developer can direct the use of the performance indicators of the present invention to autonomically change the executional behavior of a software application. The event counts that result from the processing of the performance indicators are determined by the object code that has been executed over a period of time and the executional environment during that period of time. However, the object code of a software application is not solely determined by its source code. The behavior of a software application is also influenced by the manner in which a compiler processes the source code of the software application to generate the object code of a software application.

As mentioned above, a compiler generates object code that is intended to be executed on a specific class of CPU, notwithstanding the generation of bytecode by certain types of compilers, wherein the bytecode is intended to be interpreted within a standardized virtual machine such that the bytecode is eventually runnable on many different classes of CPUs. When a compiler generates object code, the compiler may have several choices for generating certain aspects of the object code; different compilers will generate different object code modules from an identical source code file because they make different choices in the manner in which certain aspects of the software are implemented. For example, a compiler can allocate data areas for different types of variables in different memory locations; the compiler can also determine whether those data areas should be allocated statically at compile-time or dynamically at runtime. The choice of memory locations and their relative arrangement will influence the performance of the instructions that access those data areas, e.g., creating fewer or more cache hits to the CPU's on-chip cache. Similarly, groups of instructions are implicitly generated for certain types of source code logic, e.g., iterative loops, and the compiler has the ability to place groups of instructions in different areas through the use of branch instructions or jump instructions. Assuming that a particular CPU has an on-chip instruction cache, the compiler can influence the performance of groups of instructions based on their relative location; for example, two groups of instructions that are juxtaposed in memory and executed sequentially might generate zero instruction cache misses if both groups of instructions will easily fit into the instruction cache.

Although a compiler generates object code for a particular class of CPUs, the capabilities of a particular CPU, though, may vary widely within a class of CPUs that adhere to a similar architecture. For example, a particular CPU may have a larger on-chip data cache than a similar CPU that executes the same instruction set at the same processor clock speed. At compile-time, the compiler does generally not have any information about the capabilities or configuration of a particular CPU that will eventually execute the object code that is being generated by the compiler, so the compiler generates object code with certain characteristics that seem appropriate for any instance within that class of CPUs.

However, using the present invention, a compiler can shift compile-time decisions to runtime decisions. Rather than statically determining certain characteristics of the object code when the object code is generated, which thereby also inherently determines the performance of the execution of the object code to some degree, certain characteristics of the object code can be determined when the object code is executed by allowing the application to use knowledge about itself to affect its behavior. The compiler configures the software application to obtain real-time information about the performance of the software application within the low-level hardware, and the compiler configures the software application to dynamically change its behavior based on this real-time performance information, which is illustrated with respect to FIGS. 37–41 hereinbelow. The following examples differ from the examples that were illustrated with respect to FIGS. 35–36; FIGS. 37–41 depict operations that may be performed primarily in accordance with direction from a compiler, whereas the examples in FIGS. 35–36 depict operations that may be performed primarily in accordance with direction from a software developer.

Figure 37:
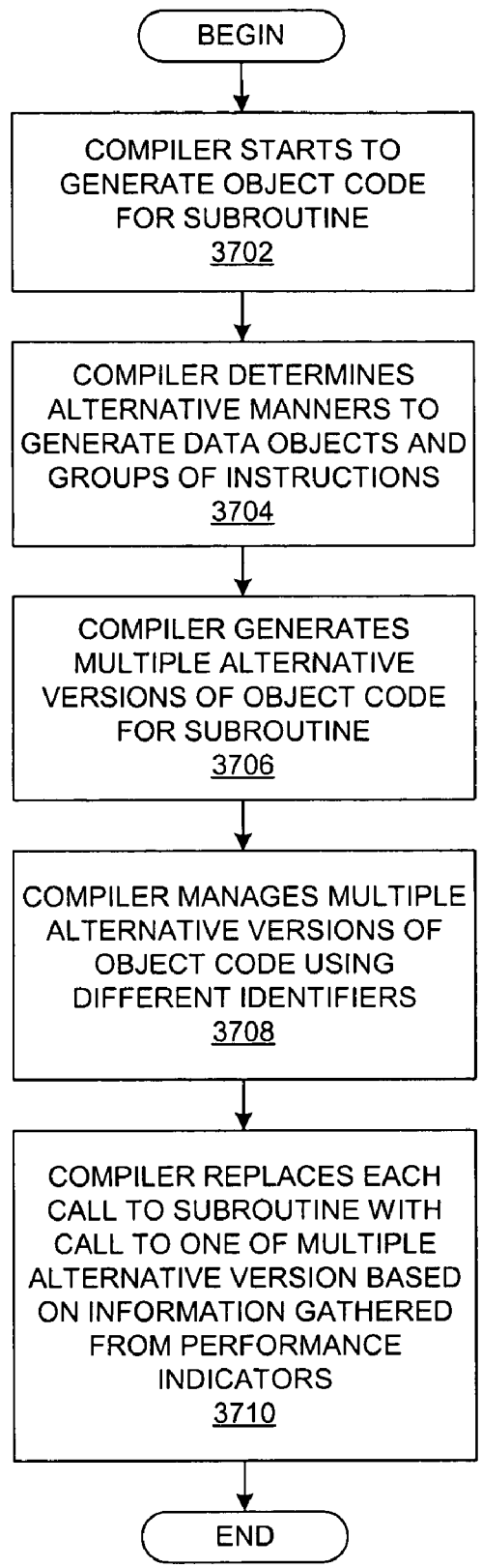
FIG. 37 depicts a flowchart that shows a process within a compiler by which the compiler configures the software application to dynamically change its behavior based on real-time performance information through the use of multiple alternative versions of object code for subroutines.

With reference now to FIG. 37, a flowchart depicts a process within a compiler by which the compiler configures the software application to dynamically change its behavior based on real-time performance information through the use of multiple alternative versions of object code for subroutines. The process begins with the compiler starting to generate object code for a particular subroutine (step 3702). It may be assumed that the compiler has already retrieved and started processing a source code file, which may contain other subroutines.

At some point during the generation of object code for the subroutine, the compiler determines that it may generate the object code in different ways or forms, possible using different techniques (step 3704); e.g., as mentioned above, the compiler might determine that it has multiple options for selection locations of data objects, locations of groups of instructions, manners of branching or jumping between groups of instructions, etc. Rather than selecting one choice among each option that occurs, the compiler generates multiple alternative versions of object code for the subroutine (step 3706). A software developer may control the ability of the compiler to perform such operations through special compiler directives. The software developer might insert a compiler directive within the source code of a subroutine that explicitly allows the compiler to generate multiple alternative versions of object code for the subroutine. Similarly, the software developer might insert a compiler directive within the source code of a subroutine that explicitly disallows the compiler from generating multiple alternative versions of object code for the subroutine. As another alternative, the software developer might be required to place a special compiler directive at the start of a source code file in order to explicitly permit the compiler to generate multiple alternative versions of object code for any subroutine within the source code file.

The compiler manages the multiple alternative versions of object code for the subroutine by assigning different identifiers to the different versions of the subroutine (step 3708). In other words, the compiler can manage each version of the subroutine's object code as if the object code had originated from different subroutines. However, the compiler must adjust the remainder of the software application to account for the multiple versions; for each call to the subroutine within the software application, the compiler must ensure that a call is made to one of the multiple alternative versions of object code for the subroutine.

The manner in which the compiler adjusts the original calls to the subroutine is linked to the differences that the compiler has introduced to the multiple alternative versions of object code for the subroutine. The compiler has generated multiple versions of object code for the subroutine because the compiler has determined that each version may have certain performance-enhancing characteristics; e.g., as noted above, the locations of instructions and data objects may reduce the number of instruction cache misses or data cache misses. Hence, the compiler replaces each call to the original subroutine with a call to one of the multiple alternative versions based upon a dynamically determined characteristic that is appropriate for the call that is being replaced or for the version of the subroutine that is to be selected to be called. More specifically, the compiler replaces each call to the subroutine with a selective or condition call to one of the multiple alternative versions based on information gathered from performance indicators (step 3710). In other words, during the execution of the object code, event counts would be gathered through the use of performance indicators just prior to a call to one of the multiple versions of object code for the subroutine; depending on those event counts, a determination is made as to which subroutine should be called, as illustrated in more detail further below.

Figure 38:
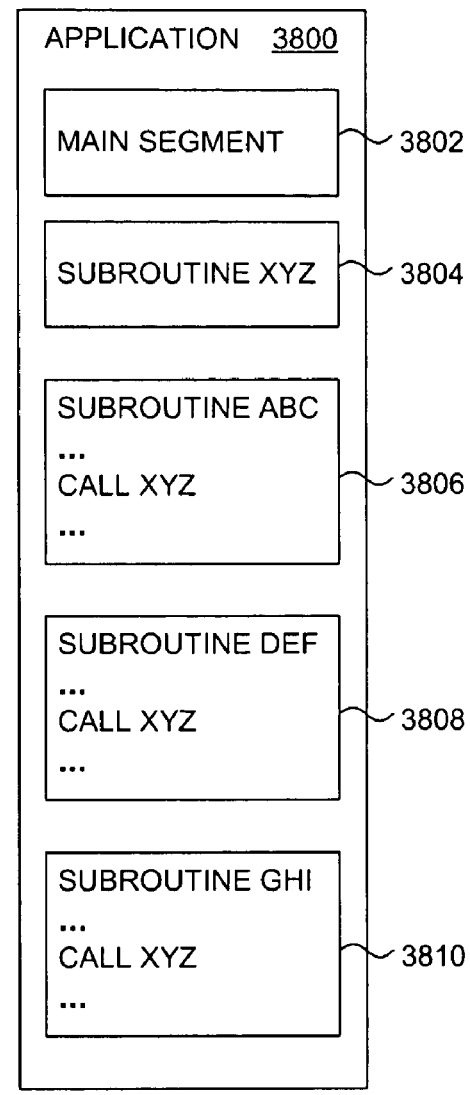
FIG. 38 depicts a block diagram that shows an application with multiple subroutines that call a given subroutine.

With reference now to FIG. 38, a block diagram depicts an application with multiple subroutines that call a given subroutine. Application 3800 comprises many subroutines and main program segment 3802. Subroutine 3804 is called by each of subroutines 3806, 3808, and 3810.

Figure 39:
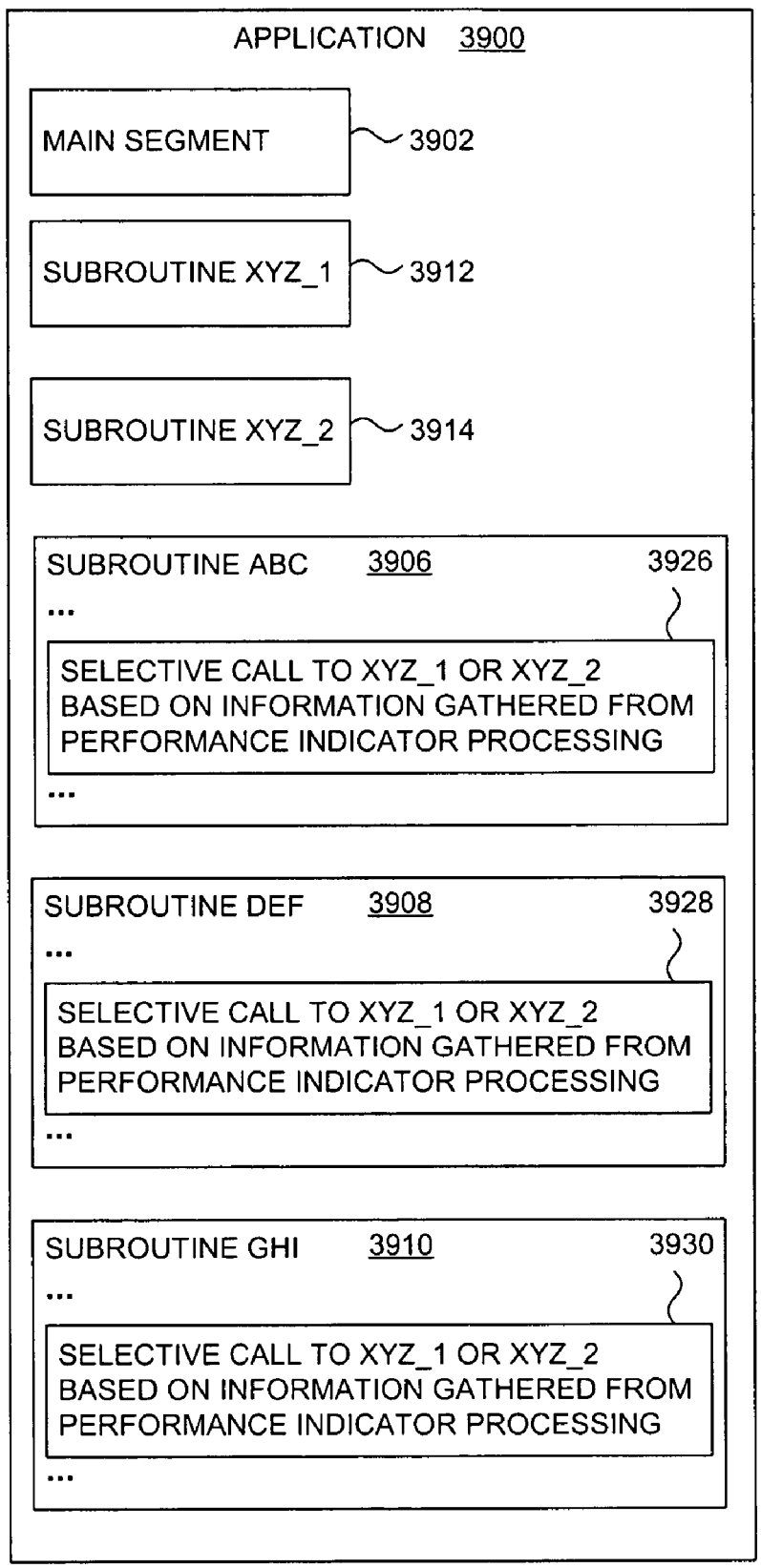
FIG. 39 depicts a block diagram that shows an application with multiple subroutines that selectively call one of the multiple alternative versions of object code of a subroutine that have been generated by a compiler.

With reference now to FIG. 39, a block diagram depicts an application with multiple subroutines that selectively call one of the multiple alternative versions of object code of a subroutine that have been generated by a compiler. FIG. 39 is similar to FIG. 38; application 3900 and application 3800 represent the same software program that originated from the same source code; application 3900 comprises main program segment 3902 and subroutines 3906, 3908, and 3910 in a manner similar to application 3800 comprising main program segment 3802 and subroutines 3806, 3808, and 3810. However, although applications 3800 and 3900 are derived from the same source code, they represent different instances of the same software program because they contain different object code after having been compiled differently. Rather than a single instance of given subroutine 3804 in application 3800, application 3900 contains two versions of object code for the same subroutine, shown as object code segments 3912 and 3914 in application 3900, as would be generated by a compiler during step 3708 in FIG. 37. Moreover, each call to the given subroutine has been modified to include a selective or conditional call to one of the versions of the given subroutine, i.e., object code blocks 3912 or 3914, as would be generated by a compiler during step 3710 in FIG. 37; these conditional calls are shown in application 3900 as calls 3926, 3928, and 3930 in object code segments 3906, 3908, and 3910, respectively. The selection or condition is based upon information on hardware event counts that will be gathered in accordance with performance indicator processing that occurs during the execution of the application prior to the calls to the versions of the given subroutine, as illustrated in more detail below.

With reference now to FIG. 40, a block diagram depicts a representation of object code for a selective or conditional call of one of multiple alternative versions of object code for a given subroutine. FIG. 40 represents object code section 4002 that would be generated by a compiler during step 3710 in FIG. 37 in place of a typical subroutine call; when the compiler determines to generate multiple alternative versions of object code for a subroutine, then the compiler replaces each original call to that subroutine with object code section 4002.

FIG. 40 is similar to FIG. 34 in that both figures depict an execution path within software that is autonomically selected based on the detection of events, wherein the events have been enabled through performance indicators as described above. More specifically, both figures depict sequentially located object code blocks that contain instructions: for counting events in accordance with performance indicators; for obtaining the values of those counts from registers within a performance monitor; for computing a condition based on those values; and selecting an execution path based on a satisfied condition. Whereas FIG. 34 illustrated a generalized execution path, FIG. 40 specifically illustrates a call to one of multiple alternative versions of object code for a subroutine.

The first object code subsection 4004 within object code section 4002 contains instructions that are associated with performance indicators and/or instructions that access data associated with performance indicators; these performance indicators configure the performance monitor to begin counting hardware events associated with the execution of those instructions. The second object code subsection 4006 within object code section 4002 contains instructions that obtain or read the performance monitor counters that have been counting the hardware events. The third object code subsection 4008 within object code section 4002 contains instructions that compute conditional expressions based on the values from the performance monitor counters. The fourth object code subsection 4010 within object code section 4002 contains instructions for calling or jumping to an appropriate version of the given subroutine based on the computed conditional expressions.

With reference to FIG. 41, a diagram represents an example of a set of pseudocode statements that may be used by a compiler to generate the appropriate autonomic alteration in the behavior of a software application for selecting one of multiple alternative versions of object code for a subroutine. After a compiler determines that it may generate the object code for a given subroutine in different forms, e.g., as at step 3704 in FIG. 37, the compiler may directly generate the object code that is necessary for the selective or conditional calling of the different versions. Alternatively, a compiler may generate source code statements or inline assembly language statements for the functionality that the compiler uses to replace each call to the original subroutine, e.g., as shown by object code subsections 3926–3930 as shown in FIG. 39, after which the compiler generates object code for those newly developed source code statements or inline assembly language statements, e.g., as illustrated by object code section 4002 in FIG. 40, and then inserts the object code at the appropriate locations. The set of pseudocode statements that are shown in FIG. 41 may represent source code statements or inline assembly language statements that could be generated by the compiler to be inserted into the source code of a subroutine that calls the given subroutine; alternatively, the set of pseudocode statements that are shown in FIG. 41 may merely represent the logic of the object code subsections that are eventually generated.

Compiler directive 4102 causes performance indicators to be associated with data accesses to a particular array, which may be implemented using marked data in a variety of manners as previously described above. In this example, compiler directive 4102 indicates that particular hardware events, i.e., data cache misses, are to be counted when accessing the identified array, e.g., each time an instruction accesses a memory location in a range of memory addresses that is reserved for the array. Statement 4104 reads the last element from the identified array, thereby potentially causing a cache miss event to occur. In this example, the compiler has generated object code that contains a simple test to check whether accessing an element of the array generates a cache miss event.

As mentioned previously, the compiler replaces each call to the original subroutine with a call to one of the multiple alternative versions based upon a dynamically determined characteristic that is appropriate for the call that is being replaced or for the version of the subroutine that is to be selected during runtime to be called. In the example that is shown in FIG. 41, the compiler may have determined that it could compile the original subroutine in two ways which would differ in the use of the identified array. Hence, it has placed a test, i.e., related to statement 4104, in the object code such that it can dynamically determine at runtime whether the use of the array will have exhibit certain characteristics. Statements 4106 and 4108 represent a check of the counter in the performance monitor to determine if the execution of instructions for statement 4104 generated a data cache miss event; if so, then instructions for statement 4110 would be executed, otherwise instructions for statement 4112 would be executed. Based on the observation, the software application can then autonomically alter its behavior by calling one or the other version of the object code for the subroutine that accesses that array; statements 4110 and 4112 represent calls to one or the other version, which may be implemented as jump instructions to the respective location of the object code for one of those versions.

As mentioned above, different sets of the remaining figures illustrate different uses at the software level for information gathered at the hardware level while employing performance indicators. Turning now to FIGS. 42–46, a set of figures illustrate processes for collecting statistical information about the ability of a software application to successfully acquire a mutex, or more generally, a semaphore.

An operating system allocates time slices to threads in accordance with their needs and their competition for shared resources, and an operating system typically provides multiple mechanisms for coordinating the use of shared resources by multiple threads. A common mechanism for serializing access to a shared resource is a mutex, or mutual exclusion lock, which is a simple lock having two states: locked and unlocked. The lock is typically implemented as a simple data value that is stored in memory. A mutex can be logically associated with a shared resource such that a thread that successfully locks the mutex is said to be the current owner of the mutex; only the thread that possesses a particular mutex should proceed to access the shared resource that is associated with that particular mutex, and only the thread that possesses a particular mutex should unlock that particular mutex. Thus, a critical section of code within a thread that accesses a shared resource is bounded by a call to lock a mutex and a call to unlock the same mutex. If a thread attempts to lock a mutex and fails, then it must wait until it is able to lock the mutex before proceeding to execute its critical section of code in which it accesses the shared resource. A mutex can be used to synchronize threads within a single process or across multiple processes if the mutex is allocated within memory that is shared by the coordinating processes.

The manner in which a thread waits for a mutex after failing to acquire the mutex depends on the manner in which the mutex mechanism is implemented. Three types of locks are encountered: a blocking lock, a spin lock, and some type of combination of a blocking lock and a spin lock. If a mutex has already been acquired and another thread requests to lock the mutex, then a mutex that is implemented as a blocking lock causes the waiting thread to cease being executable or to be suspended, i.e., to go to "sleep". In contrast, spin locks do not put waiting threads to sleep. Instead, a waiting thread executes a loop, thereby repeatedly requesting the lock until it is freed by the thread that currently owns the mutex; the loop may contain an empty, iterative loop, i.e., "busy loop" or "busy wait", that increments or decrements a variable such that the thread does not immediately re-request the mutex but waits for a period of time that depends on the length of the iterative loop.

A semaphore is another locking mechanism for restricting access to shared resources, but in contrast to a mutex, a typical semaphore allows one or more threads to access a shared resource simultaneously. Even though a first thread may already be accessing a shared resource, additional threads are allowed to access the shared resource, up to a maximum number. A semaphore acts as a specialized counter, whereas a mutex acts as a toggle switch. Hence, a semaphore can be regarded as a more generalized locking mechanism, and a mutex is sometimes described as a mutex semaphore or a binary semaphore; hereinbelow, the present invention is operable with generalized semaphores, so it is assumed that a semaphore may act as a mutex.

Figure 42:
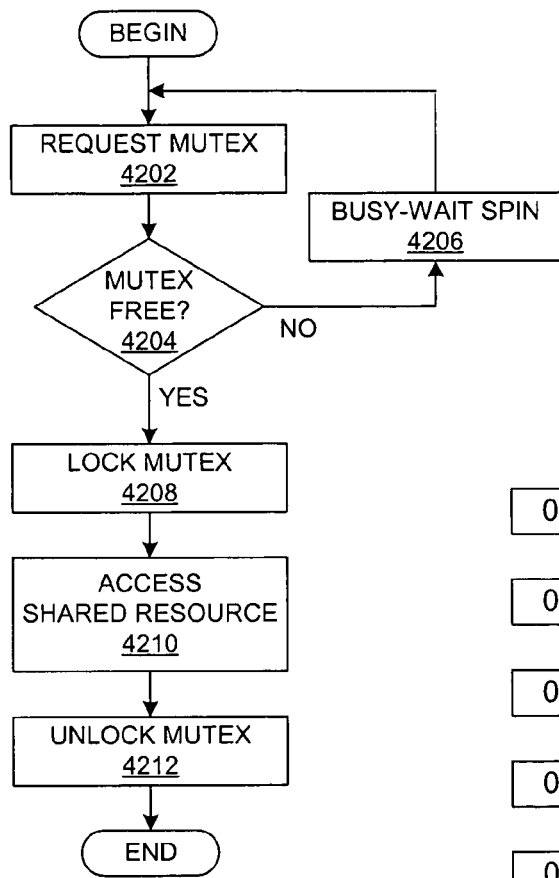
FIG. 42 depicts a typical implementation of a spin lock mutex.

With reference now to FIG. 42, a typical implementation of a spin lock mutex is depicted. The process begins when a thread requests to lock a mutex in an attempt to acquire or to possess the mutex (step 4202). A determination is made as to whether the mutex is free and unlocked (step 4204), and if not, then the thread performs a busy-wait loop (step 4206), i.e., spins, as it waits for the mutex to become available. After spinning for some period of time, the thread then repeats step 4202. If the mutex is free at step 4204, then the mutex is locked (step 4208), and the thread may proceed to access a shared resource (step 4210) without the possibility of colliding with another thread and compromising the integrity of the data that is associated with the shared resource. After the thread has performed its operations with respect to the shared resource, then the thread requests that the mutex should be released, and the mutex is unlocked (step 4212), thereby concluding the process. After the mutex has been unlocked, the mutex can be used by other threads.

Figure 43:
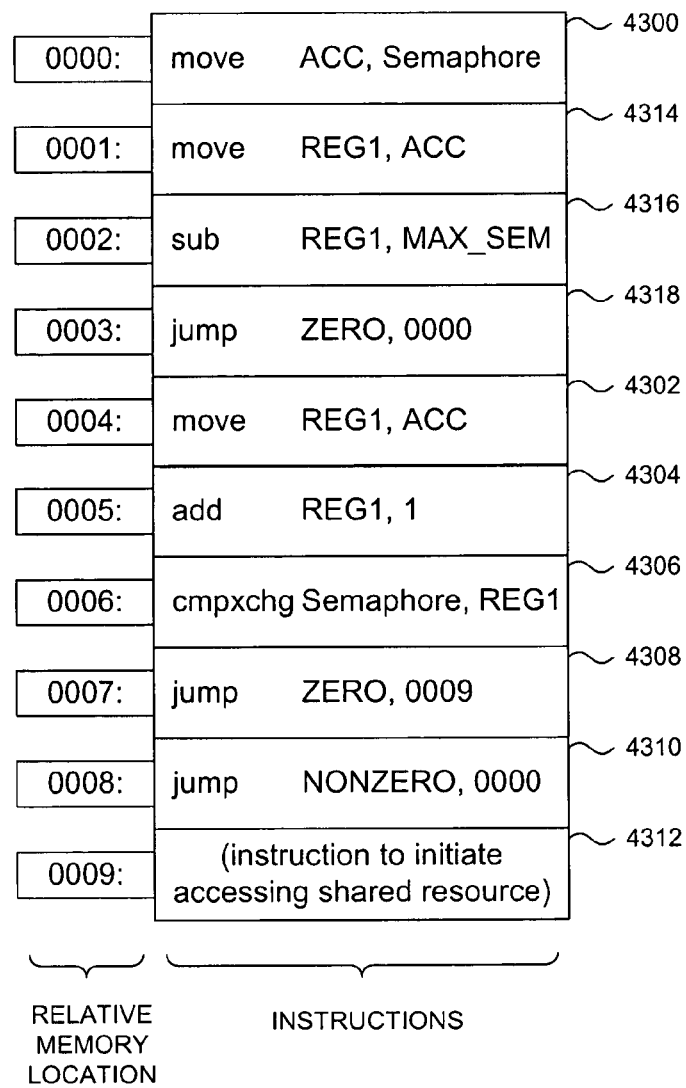
FIG. 43 depicts a set of pseudocode instructions that represents typical logic for acquiring a semaphore.

With reference now to FIG. 43, a set of pseudocode instructions represents typical logic for acquiring a semaphore. When a thread or a process is attempting to acquire a semaphore, it is essential to protect the integrity of the operation that might modify the semaphore; preferably, this operation is completed as an atomic operation, i.e., an operation that cannot be interrupted in any manner. While some processors provide a pair of instructions that enable the implementation of a semaphore, there are many processors that are commercially available that provide a single instruction that can be used to support an atomic operation on a semaphore. For example, the "CMPXCHG" instruction in the Intel™ Pentium™ family of processors can be used to implement a semaphore. The pseudocode instructions that are shown in FIG. 43 approximate the logic that would be used with a "CMPXCHG" instruction. In this example, instructions 4300–4312 are shown at relative memory locations, although the length of the instructions may vary.

Instruction 4300 copies the value of the semaphore from a memory address to the accumulator within the CPU; the memory address is provided by a variable name that can be resolved by a compiler or an assembler to a memory address. Instruction 4302 copies the value from the accumulator to a register, and instruction 4304 increments the value in the register.

Instruction 4306 is a type of compare-and-exchange instruction that requires a source operand and a destination operand. This instruction executes as follows. If the value in the accumulator equals the value at the identified memory address, then the value in the register (source operand) is copied to the identified memory address (destination operand), and the "zero" processor status flag is set; the memory address is again provided by a variable name that represents the semaphore. If the value in the accumulator does not equal the value at the identified memory address, then the value at the identified memory address is loaded into the accumulator, and the "zero" processor status flag is cleared; this case may occur if another thread has modified the semaphore between the execution of instruction 4300 and the execution of instruction 4306, e.g., the thread with instructions 4300–4306 was swapped out at some point in time, which allowed another thread to execute and change the value of the semaphore.

Instruction 4308 jumps to the identified address if the "zero" processor status flag is set, i.e., the program counter is changed to the identified address so that the next instruction is retrieved from that address. Instruction 4310 jumps to the identified address if the "zero" processor status flag is cleared, i.e., not set. If the thread has successfully acquired the semaphore, then instruction 4312 is executed, which represents the beginning of an execution path during which the thread will access a shared, restricted resource. Hence, instruction 4312 represents an instruction that is executed if the semaphore is successfully acquired, and instruction 4310 represents an instruction that is executed if the thread fails to acquire the semaphore.

If the semaphore has been successfully acquired, its value has been incremented. The value of the semaphore is protected from exceeded its maximum value by instructions 4314–4318. Instruction 4314 copies the value of the semaphore from the accumulator to a register, and instruction 4316 subtracts a constant value from the register; the constant value is identified by a name that can be resolved by a compiler or an assembler to a pre-determined value. Instruction 4318 jumps to the identified address if the "zero" processor status flag is set, which in this case indicates that the semaphore has reached is maximum value. The thread remains in a tight initial loop until the value of the semaphore is no longer at its maximum.

Figure 44:
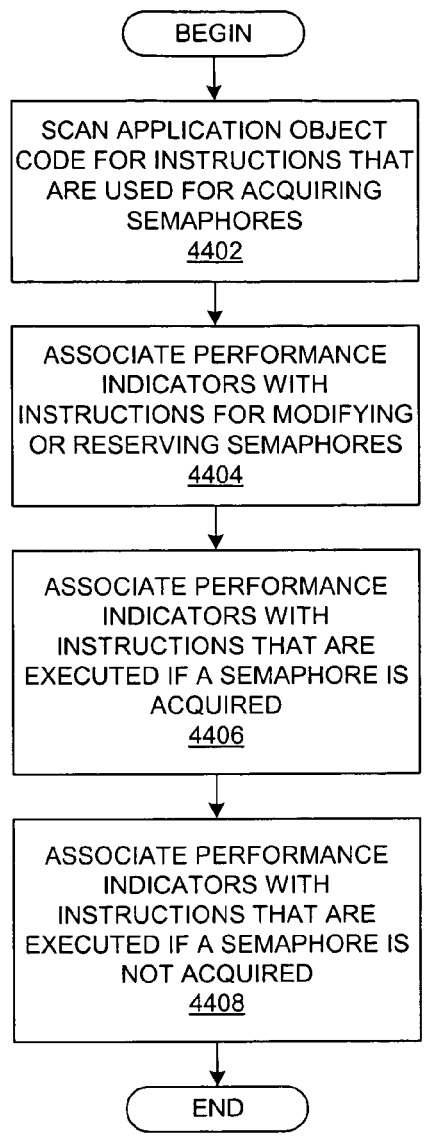
FIG. 44 depicts a flowchart that shows a process for associating performance indicators with semaphores in accordance with an embodiment of the present invention.

With reference now to FIG. 44, a flowchart depicts a process for associating performance indicators with semaphores in accordance with an embodiment of the present invention. The process commences with a scanning daemon examining the application object code for instructions that are used for acquiring semaphores (step 4402); depending upon the application code that is being examined, the scanning daemon may be configurable to scan for different types of instructions. The scanning daemon then associates performance indicators with instructions that are related to acquiring the semaphores but at three different points for three different purposes: instructions that reserve or modify a semaphore (step 4404); instructions that are executed if a semaphore is acquired (step 4406); and instructions that are executed if a semaphore is not acquired (step 4408), thereby concluding the process. Although these examples show that the performance indicators are associated with instructions through the operations of a scanning daemon, in alternative embodiments, the performance indicators may be associated with instructions through different types of operations, as discussed further above.

Figure 45:
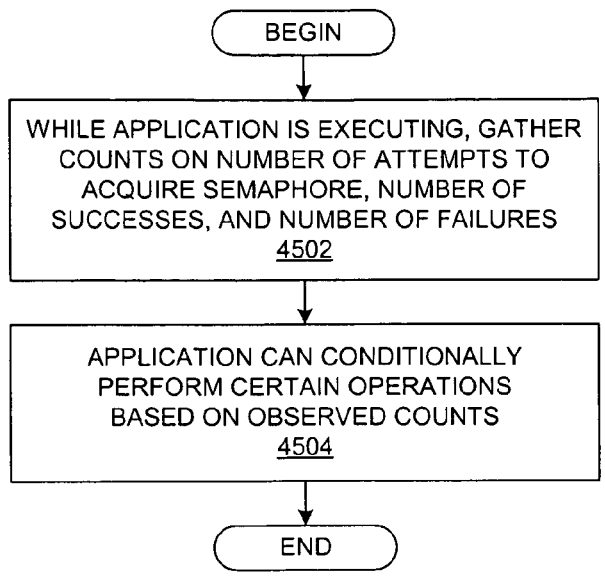
FIG. 45 depicts a flowchart that shows a process during which performance indicators are used to gather statistical information about the use of semaphores in accordance with an embodiment of the present invention.

With reference now to FIG. 45, a flowchart depicts a process during which performance indicators are used to gather statistical information about the use of semaphores in accordance with an embodiment of the present invention. After the performance indicators have been associated with the instructions that are related to semaphore processing, e.g., through a process similar to that shown in FIG. 44, the application code will be executed at some point in time. While the application code is executing, those performance indicators will cause the performance monitor to count the execution of the marked instructions. Referring to FIG. 45, during the execution of the application code, counts are gathered for the number of attempts to acquire a semaphore, the number of successful reservations on the semaphore, and the number of failed reservations on the semaphore (step 4502). As the application is running, those counts are then available at the software level, e.g., to the application itself, to the scanning daemon, to a trace utility, to an application profiling tool, or to some other type of software application or module. For example, the application can perform certain operations based on conditions that might be satisfied against the observed counts (step 4504), thereby concluding the process shown in FIG. 45.

Figure 46:
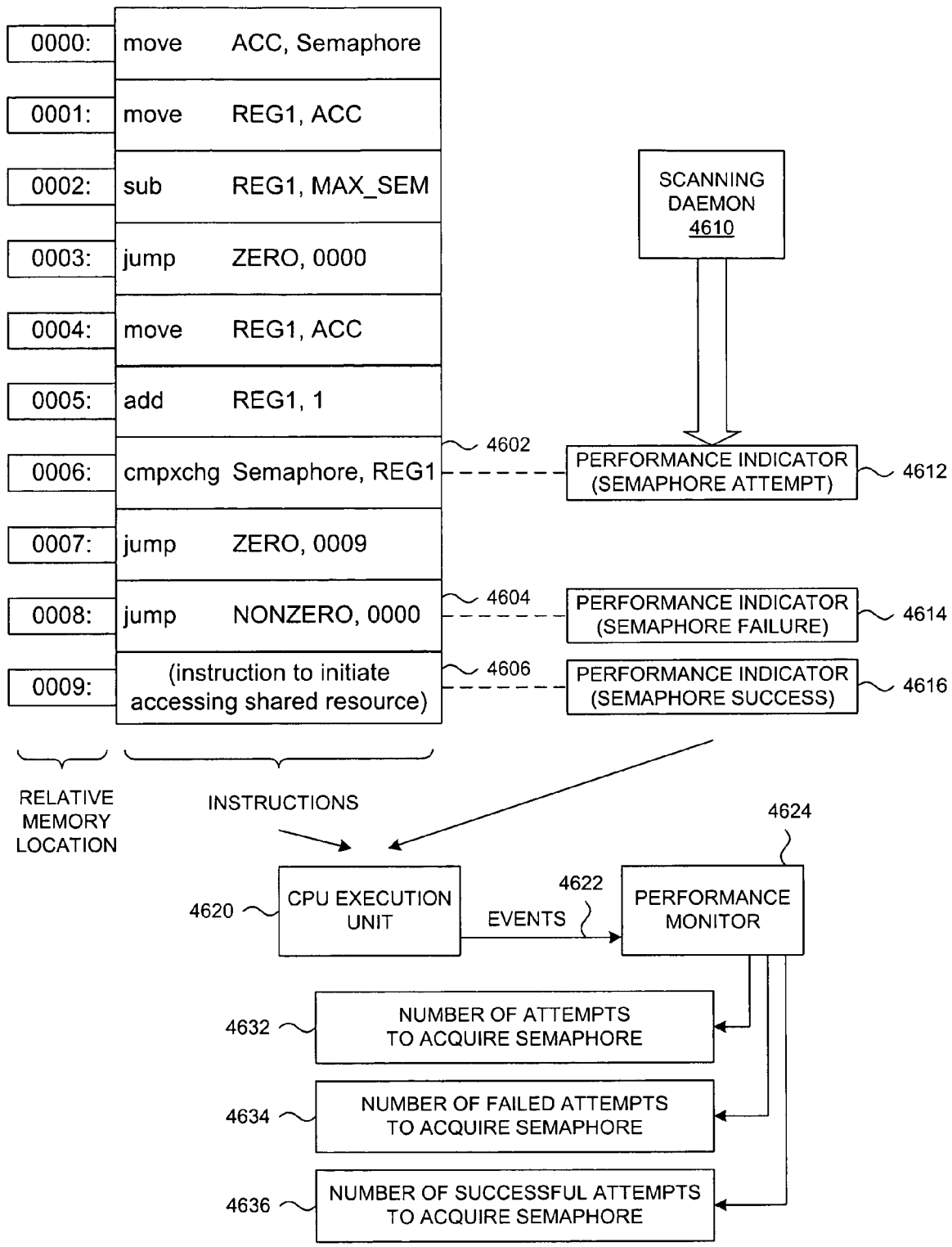
FIG. 46 depicts a set of performance indicators that is associated with a set of pseudocode instructions that represents logic for acquiring a semaphore.

With reference now to FIG. 46, a set of performance indicators is associated with a set of pseudocode instructions that represents logic for acquiring a semaphore. FIG. 46 is similar to FIG. 45; FIG. 46 includes a set of instructions that are used to acquire a semaphore. In particular, instruction 4602 attempts to reserve or modify the data value that represents the semaphore; instruction 4604 is executed if the semaphore is not acquired; and instruction 4606 is executed if the semaphore is acquired.

In contrast to FIG. 45, FIG. 46 shows that scanning daemon 4610 has associated performance indicators 4612–4616 with instructions 4602–4606, respectively. When instructions 4602–4606 that are involved in the semaphore operation are executed, e.g., by CPU execution unit 4620, the processing of performance indicators 4612–4616 generates events that are counted by performance monitor 4624. More specifically, performance indicator 4612 is associated with instruction 4602, thereby allowing a count of each attempt to reserve or modify the semaphore. Performance indicator 4614 is associated with instruction 4604, thereby allowing a count of each failed attempt to acquire the semaphore. Likewise, performance indicator 4616 is associated with instruction 4606, thereby allowing a count of each successful attempt to acquire the semaphore.

Eventually, count values 4632, 4634, and 4636 can be obtained from performance monitor 4624 to represent the number of attempts to acquire the semaphore, the number of failed attempts, and the number of successful attempts, respectively. It is possible for an application to count the number of attempts, successes, and failures, but if a software entity other than the application wanted these counts, an interface would be required to request and transfer the counts. With the present invention, the counts may be gathered through the use of the performance indicators. These count values represent statistical information about the performance of the operations on the semaphore, and these count values may be used by various software entities, particularly for improving the performance of operations associated with the semaphore. Reports on semaphore utilization may be used by an analyst to change the algorithms related to the semaphores; for example, multiple semaphores might be deployed in place of a single semaphore to protect different portions of data in order to reduce contention. Moreover, the statistical information can be gathered in an efficient, non-intrusive manner such that the application does not need to explicitly generate these counts.

As mentioned above, different sets of the remaining figures illustrate different uses at the software level for information gathered at the hardware level while employing performance indicators. Turning now to FIGS. 47–49, a set of figures illustrate a technique for improving the performance of the execution of an application by relocating code segments and data areas based on information that is gathered about hot spots through the use of performance indicators.

The performance of an application is affected by the spatial locality that is exhibited by the application during its execution. By conglomerating the application's hot code blocks and hot data areas together, there is a higher likelihood that those hot code blocks and hot data areas will be located in a cache when they are needed. In other words, aggregating hot spots improves the performance of an application by reducing the number of instruction cache misses, data cache misses, translation lookaside buffer (TLB) misses, etc.

There are many techniques in the prior art for enhancing application performance by improving spatial locality to achieve these types of characteristics, such as better utilization of hardware caches, instruction pipelines, etc. For example, the movement of application blocks in various ways is described in Pettis et al., U.S. Pat. No. 5,212,794, issued May 18, 1993, entitled "Method for Optimizing Computer Code to Provide More Efficient Execution on Computers Having Cache Memories", hereby incorporated by reference, and the optimization of memory references in various ways is described in Heisch, U.S. Pat. No. 5,689,712, issued Nov. 18, 1997, entitled "Profile-Based Optimizing Postprocessors for Data References", hereby incorporated by reference.

However, these prior art techniques do not allow the optimization to occur while the application is running. The prior art uses instrumentation and trace techniques to collect data about the application during runtime, and the collected data is analyzed during a post-processing phase; any optimizations are applied while the application is not running, and the enhanced performance in the application can only be realized during the next time that the application is run. In contrast, in the present invention, the memory manager may improve the spatial locality of an application during a runtime phase by collecting performance information during runtime, analyzing the information during runtime, and modifying the application's memory space during runtime, thereby dynamically providing enhanced performance.

With reference now to FIG. 47, a flowchart depicts a process by which a memory manager determines hot spots using performance indicators in accordance with an embodiment of the present invention. The process commences with the memory manager selecting an application that is to be monitored in order to gather performance information about its execution (step 4702). The memory manager determines code segments and/or data areas to be monitored within the application (step 4704) by examining various memory management data structures that contain information about the manner in which memory has been allocated to the application, information about the manner in which the application has been loaded into memory, and various other memory-related aspects of the application.

The memory manager then generates and sends a performance monitoring request to a performance scanning daemon that is similar to that described in FIG. 25 (step 4706). The performance monitoring request may be transferred in a variety of ways that does not limit the scope of the present invention, e.g., a subroutine call or the transmittal of a message. The performance monitoring request contains addresses and/or address ranges that the memory manager wants to monitor over a specified period of time; these locations were determined by the memory manager in step 4704. The request may also contain addition information for each location that is to be monitored, e.g., the type of instruction or data that is stored at a particular location, thereby providing information about the type of performance indicator that should be associated with that particular location.

At some later point in time, the memory manager receives a performance monitoring response from the scanning daemon (step 4708). The performance monitoring response may be transferred in a variety of ways that is appropriate for the interface between the memory manager and the scanning daemon. If the performance monitoring request was made by a subroutine call, then the memory manager may have registered, during the initial call, a callback subroutine that the scanning daemon may call to return the performance monitoring response. If the performance monitoring request was passed as a message, then the performance monitoring response may be passed as a message. It may be assumed that the request and the response are transmitted in an asynchronous manner such that the memory manager may perform other operations while waiting for the performance monitoring response.

After receiving the performance monitoring response, the memory manager examines the information within the response to determine hot spots within the monitored application (step 4710). While the performance monitoring request was being processed by the scanning daemon, the scanning daemon was collecting events counts for data accesses, instruction accesses, instruction executions, or other types of events as requested by the memory manager. In addition, these events have been counted over a particular period of time, so the information that is generated and returned to the memory manager reflect events per period of time, or event rates. By comparing event rates to other concurrent event rates, historical event rates, configurable threshold values, configurable conditional rules, etc., the memory manager is able to determine which code segments and data areas within an application are hot or cold, i.e., executed or accessed frequently or infrequently. After determining the hot spots, the memory manager conglomerates the hot code blocks and hot data areas (step 4712), thereby concluding the process. The memory manager may repeat this process for other applications or for the same application after a period of time.

With reference now to FIG. 48, a flowchart depicts a process by which a scanning daemon assists in the determination of hot spots within an application by placing performance indicators at particular locations as requested by a memory manager. In this manner, the flowchart that is shown in FIG. 48 is a counterpart process to the process that is shown in the flowchart in FIG. 47.

The process commences when the scanning daemon receives a performance monitoring request from a memory manager (step 4802). Using the memory locations of object code blocks and data areas as indicated in the performance monitoring request, the scanning daemon associates performance indicators with those memory locations as requested (step 4804); the performance indicators may be stored in memory, shadow memory, cache, etc., as is appropriate for the hardware architecture that supports the present invention. In addition, as requested by the memory manager, the scanning daemon limits the amount of time during which the performance indicators allow for the counting of events, e.g., by setting software timers for a requested period of time (step 4806).

At the end of that time period, the scanning daemon then retrieves the counts that have been gathered for the events that were generated in accordance with the performance indicators (step 4808); for example, the scanning daemon reads the counts from registers within a performance monitor in the CPU. It may be assumed that the scanning daemon set the timers in an asynchronous manner such that the scanning daemon is able to perform other operations during that time period. In addition, the scanning daemon is able to handle multiple concurrent requests; the requests may initiate the monitoring of different locations within an application space or the monitoring of different application memory spaces. Alternatively, the scanning daemon may determine the length of the time period and then return that value to the requester as part of the response. The scanning daemon then returns the counts that have been gathered in a performance monitoring response to the memory manager (step 4810), and the process is concluded.

With reference now to FIG. 49, a block diagram depicts the modification of an application through memory relocation during runtime in accordance with information that has been gathered through the use of performance indicators. Memory manager 4902 performs memory management operations as part of the operating system of a data processing system. Memory manager 4902 may have access to various operating system data structures, and memory manager may interact with other operating system entities, such as a process scheduler or thread dispatcher (not shown), to perform operations for multiple applications that are concurrently running under the management of the operating system.

In this example, memory manager 4902 comprises multiple entities as a convenience for illustrating various functional units that may be present within a data processing system; memory manager may include fewer or more functional units, depending on the operating system, or the functionality may be organized in some other manner. Dynamic loader 4904 loads application modules into memory. Memory allocator 4906 allocates memory to an application upon request. Garbage collector 4908 gathers memory blocks that were previously allocated to an application but that are no longer being used.

In this embodiment of the present invention, memory relocator 4910 moves object code blocks and data blocks in order to improve the performance of the application in a manner similar to that described above with respect to FIG. 47. In this example, when memory relocator 4910 determines that the performance of an application might be improved by changing the memory configuration of the application, memory relocator 4910 sends performance indicator request 4912 to scanning daemon 4914. The performance indicator request contains locations of code blocks and/or data areas that memory relocator 4910 has determined may be moved if they are deemed to be hot code blocks that are executed often or hot data areas that are accessed often. In a manner similar to that described above with respect to FIG. 48, scanning daemon 4914 uses those locations within application memory space 4920 to create tagged or marked locations or blocks 4922, 4924, and 4926 by associating performance indicators with those location or blocks in some manner as described further above.

After some period of time, scanning daemon 4914 gathers the counts that represent the number of hardware events that occurred in accordance with the processing of the performance indicators that indicate the hardware events that should be counted. These counts, possibly along with other information, are placed into performance monitoring response 4930 by scanning daemon 4914 and returned to memory relocator 4910.

Memory relocator 4910 analyzes the execution rates or access rates of the previously chosen memory locations or memory areas to determine if any of the code blocks or data areas should be moved in an attempt to improve the performance of the application. FIG. 49 shows application memory space 4920 after a memory relocation operation. In this example, memory locations or memory areas 4922–4926 have been determined to be hot code blocks that are executed often or hot data areas that are accessed often; hence, these locations or areas have been aggregated, i.e., moved closer together, using various possible techniques, as mentioned above.

However, it is not necessary that the code blocks or data areas should moved as a whole. Depending on the granularity of the information that was gathered via the performance indicators, in some cases, the code blocks and data areas might be split, thereby allowing the conglomeration of hot areas and the conglomeration of cold areas. It should also be noted that the memory relocation operation may act in accordance with many different configurable conditions and rule sets. For example, it is possible that the memory relocator determines that many code blocks appear to execute with the same relative frequency with a few code blocks that are rarely executed; in that case, the memory relocation operation may be performed in order to move those relatively cold blocks away from the other code blocks rather than attempting to aggregate hot blocks.

Thus, the present invention provides an improved method, apparatus, and computer instructions for providing assistance in monitoring execution of programs. The mechanism of the present invention includes employing an indicator that is recognized by the processor to enable counting events that are associated with the execution of an instruction or events that are associated with accessing a particular memory location. Various types of counting as described above are enabled through this mechanism. Further, with the information provided through the use of associating indicators with particular instructions, the mechanism of the present invention also provides for various types of adjustments to programs in monitoring and analyzing performance of programs. Further, as described above, programs may be automatically adjusted to allow for monitoring of selected instructions and even routines and modules without having to modify the program.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, instead of using a field in an instruction or in a bundle, a new instruction or operation code may be used to indicate that a subsequent instruction, or a subsequent set of instructions are marked instructions. Also, the architecture of a processor may be changed to include additional bits if spare fields for performance indicators are unavailable in the case in which it is desirable to include performance indicators within fields in the instructions. Also, although examples of events, such as execution of the instruction, time, such as clock or processor cycles, needed to execute an instruction, time to access data, entry into a section of code, have been given, these examples are not meant to limit the present invention to the types of events that can be counted. Any event relating to execution of an instruction or access to a memory location may be counted using the mechanisms of the present invention.

The illustrative embodiments were chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for executing instructions, the method comprising:
    executing instructions in a processor in the data processing system;
    detecting indicators during execution of the instructions, wherein the indicators are data values in memory that specify counting of events that are associated with execution of the instructions or are data values in memory that specify counting of events that are associated with accesses to memory locations;
    counting events that occur within the data processing system as specified by the indicators;
    retrieving a count value that represents counted events; and
    relocating one or more memory blocks that include the instructions or that include the memory locations based on the count value.

2. The method of claim 1 wherein the step of relocating one or more memory blocks further comprises:
    moving one or more memory blocks to be closer to other memory blocks that are relatively frequently accessed.

3. The method of claim 1 wherein the step of relocating one or more memory blocks further comprises:
    moving one or more memory blocks to be closer to other memory blocks that are relatively infrequently accessed.

4. The method of claim 1 wherein the events are counted for a specified period of time.

5. The method of claim 1 further comprising:
    splitting a memory block prior to relocating the memory block.

6. The method of claim 1 further comprising:
    marking instructions or memory locations with indicators within a memory space for a running application.

7. A computer program product on a computer readable recordable-type medium for use in a data processing system that executes instructions, the computer readable recordable-type medium storing computer instructions, the instructions which when executed by a processor in the data processing system perform a method comprising:
    detecting indicators during execution of the instructions, wherein the indicators are data values in memory that specify counting of events that are associated with execution of the instructions or are data values in memory that specify counting of events that are associated with accesses to memory locations;
    counting events that occur within the data processing system as specified by the indicators;
    retrieving a count value that represents counted events; and
    relocating one or more memory blocks that include the instructions or that include the memory locations based on the count value.

8. The computer program product of claim 7 wherein the step of relocating one or more memory blocks further comprises:
    moving one or more memory blocks to be closer to other memory blocks that are relatively frequently accessed.

9. The computer program product of claim 7 wherein the step of relocating one or more memory blocks further comprises:
    moving one or more memory blocks to be closer to other memory blocks that are relatively infrequently accessed.

10. The computer program product of claim 7 wherein the events are counted for a specified period of time.

11. The computer program product of claim 7, wherein the method further comprising:
    splitting a memory block prior to relocating the memory block.

12. The computer program product of claim 7, wherein the method further comprising:
    marking instructions or memory locations with indicators within a memory space for a running application.

13. An apparatus in a data processing system that executes instructions, the apparatus comprising:
    means for executing instructions in a processor in the data processing system;
    means for detecting indicators during execution of the instructions, wherein the indicators are data values in memory that specify counting of events that are associated with execution of the instructions or are data values in memory that specify counting of events that are associated with accesses to memory locations;

means for counting events that occur within the data processing system as specified by the indicators;

means for retrieving a count value that represents counted events; and means for relocating one or more memory blocks that include the instructions or that include the memory locations based on the count value.

14. The apparatus of claim 13 wherein the means for relocating one or more memory blocks further comprises:

means for moving one or more memory blocks to be closer to other memory blocks that are relatively frequently accessed.

15. The apparatus of claim 13 wherein the means for relocating one or more memory blocks further comprises:

means for moving one or more memory blocks to be closer to other memory blocks that are relatively infrequently accessed.

16. The apparatus of claim 13 wherein the events are counted for a specified period of time.

17. The apparatus of claim 13 further comprising:

means for splitting a memory block prior to relocating the memory block.

18. The apparatus of claim 13 further comprising:

means for marking instructions or memory locations with indicators within a memory space for a running application.

* * * * *